United States Patent
Freitas, Jr.

(10) Patent No.: US 7,687,146 B1
(45) Date of Patent: Mar. 30, 2010

(54) SIMPLE TOOL FOR POSITIONAL DIAMOND MECHANOSYNTHESIS, AND ITS METHOD OF MANUFACTURE

(75) Inventor: Robert A. Freitas, Jr., Pilot Hill, CA (US)

(73) Assignee: Zyvex Labs, LLC, Richardson, TX (US)

( * ) Notice: Subject to any disclaimer, the term of this patent is extended or adjusted under 35 U.S.C. 154(b) by 1387 days.

(21) Appl. No.: 11/056,567

(22) Filed: Feb. 11, 2005

Related U.S. Application Data

(60) Provisional application No. 60/543,802, filed on Feb. 11, 2004.

(51) Int. Cl.
*B32B 9/00* (2006.01)
(52) U.S. Cl. .................................... 428/408; 423/447.1
(58) Field of Classification Search .................. 428/408; 977/742; 423/447.1, 447.2, 447.3, 445 B; 264/29.1
See application file for complete search history.

(56) References Cited

U.S. PATENT DOCUMENTS

| | | |
|---|---|---|
| 4,377,565 A | 3/1983 | Setaka |
| 4,434,188 A | 2/1984 | Kamo et al. |
| 4,559,901 A | 12/1985 | Morimoto et al. |
| 4,743,522 A | 5/1988 | Iino et al. |
| 4,767,608 A | 8/1988 | Matsumoto et al. |
| 4,816,291 A | 3/1989 | Desphandey et al. |
| 4,822,466 A | 4/1989 | Rabalais et al. |
| 4,863,529 A | 9/1989 | Imai et al. |
| 4,869,924 A | 9/1989 | Ito |
| 4,919,974 A | 4/1990 | McCune et al. |
| 4,925,701 A | 5/1990 | Jansen et al. |
| 4,948,629 A | 8/1990 | Hacker et al. |
| 4,954,365 A | 9/1990 | Neifeld |
| 5,071,677 A | 12/1991 | Patterson et al. |

(Continued)

FOREIGN PATENT DOCUMENTS

JP 62-138395 6/1987

OTHER PUBLICATIONS

Argonne National Laboratory, "Diamond Films for Microelectromechanical Systems (MEMS)"; http://www.techtransfer.anl.gov/techtour/diamondmems.html.

(Continued)

*Primary Examiner*—David R Sample
*Assistant Examiner*—Daniel Miller
(74) *Attorney, Agent, or Firm*—Haynes and Boone, LLP

(57) ABSTRACT

A method is described for building a mechanosynthesis tool intended to be used for the molecularly precise fabrication of physical structures—as for example, diamond structures. An exemplar tool consists of a bulk-synthesized dimer-capped triadamantane tooltip molecule which is initially attached to a deposition surface in tip-down orientation, whereupon CVD or equivalent bulk diamond deposition processes are used to grow a large crystalline handle structure around the tooltip molecule. The large handle with its attached tooltip can then be mechanically separated from the deposition surface, yielding an integral finished tool that can subsequently be used to perform diamond mechanosynthesis in vacuo. The present disclosure is the first description of a complete tool for positional diamond mechanosynthesis, along with its method of manufacture. The same toolbuilding process may be extended to other classes of tooltip molecules, other handle materials, and to mechanosynthetic processes and structures other than those involving diamond.

36 Claims, 23 Drawing Sheets

U.S. PATENT DOCUMENTS

Figure 1:
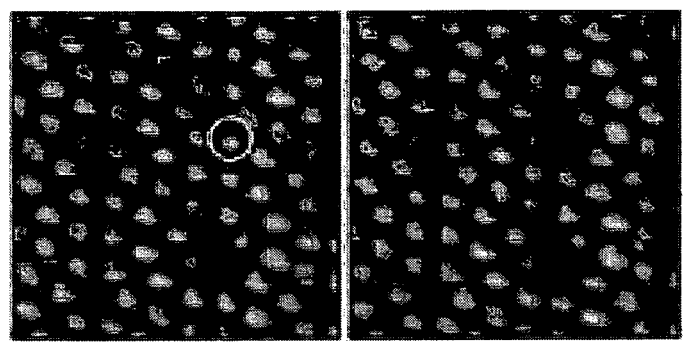

| | | | |
|---|---|---|---|
| 5,082,359 | A | 1/1992 | Kirkpatrick |
| 5,209,916 | A | 5/1993 | Gruen |
| 5,273,788 | A | 12/1993 | Yu |
| 5,302,231 | A | 4/1994 | Bovenkerk et al. |
| 5,308,661 | A | 5/1994 | Feng et al. |
| 5,328,676 | A | 7/1994 | Gruen |
| 5,360,477 | A | 11/1994 | Inoue et al. |
| 5,370,855 | A | 12/1994 | Gruen |
| 5,387,310 | A | 2/1995 | Shiomi et al. |
| 5,449,531 | A | 9/1995 | Zhu et al. |
| 5,455,072 | A * | 10/1995 | Bension et al. .......... 427/255.7 |
| 5,462,776 | A | 10/1995 | Gruen |
| 5,523,121 | A | 6/1996 | Anthony et al. |
| 5,620,512 | A | 4/1997 | Gruen et al. |
| 5,772,760 | A | 6/1998 | Gruen et al. |
| 5,849,079 | A | 12/1998 | Gruen et al. |
| 5,897,924 | A | 4/1999 | Ulczynski et al. |
| 5,989,511 | A | 11/1999 | Gruen et al. |
| 6,422,077 | B1 | 7/2002 | Krauss et al. |
| 6,592,839 | B2 | 7/2003 | Gruen et al. |
| 2002/0130407 | A1 | 9/2002 | Dahl et al. |

OTHER PUBLICATIONS

Atakan et al., "Diamond deposition in acetylene-oxygen: nucleation and early growth on molybdenum substrates for different pretreatment procedures," Phys. Chem. Chem. Phys. 1, 1999, pp. 3151-3156.
Bahr et al., "Functionalization of carbon nanotubes by electrochemical reduction of aryl diazonium salts: A bucky paper electrode," J. Am. Chem. Soc. 123, 2001, pp. 6536-6542.
Brenner et al., "Simulated engineering of nanostructures," Nanotechnology 7, 1996, pp. 161-167.
Chart of COE's Coefficient of Thermal Expansion, http://www.lucasmilhaupt.com/htmdocs/brazing_support/everything_about_brazing/materials_comp_chart.html.
Cheung et al., "Carbon nanotube atomic force microscopy tips: Direct growth by chemical vapor deposition and application to high-resolution imaging," Proc. Natl. Acad. Sci. (USA) 97:8, 2000, pp. 3809-3813.
Chickos et al., "Sublimation enthalpies at 298.15 K using correlation gas chromatography and differential scanning calorimetry measurements," Thermochimica Acta 313, 1998, pp. 101-110.
Crystalline Quartz, http://www.impex-hightech.de/Quartz.html.
Dawnkaski, "Time dependent Monte Carlo simulations of H reactions on the diamond (001)(2x1) surface under chemical vapor deposition conditions," J. Chem. Phys. 102, Jun. 15, 1995, pp. 9401-9411.
"Directed Energy Interactions with Surfaces: Fullerenes As Precursors for Diamond Film Growth," Chemistry Division, Argonne National Laboratory, accessed Dec. 29, 2003, http://chemistry.anl.gov/surfaces/fullerenes.html.
Freitas Jr. et al., *Diamond Surfaces and Diamond Mechanosynthesis*, Landes Bioscience, Georgetown, TX, 2005; http://www.MolecularAssembler.com/DSDM.htm.
Freitas Jr., *Nanomedicine, vol. 1: Basic Capabilities*, Landes Bioscience, Georgetown, TX, 1999, Appendix A.
Freitas Jr., "Pathway to Diamond Molecular Manufacturing", Transcript of Invited Lecture delivered by the author during the First Symposium on Molecular Machine Systems at the First Foresight Conference on Advanced Nanotechnology, Washington, DC., Oct. 22, 2004, pp. 1-53.
Hafner et al., "Growth of nanotubes for probe microscopy tips," Nature 398, 1999, pp. 761-762.
Hamers et al., "Cycloaddition chemistry of organic molecules with semiconductor surfaces," Acc. Chem. Res. 33, Sep. 2000, pp. 617-624.
Hla et al., "Inducing all steps of a chemical reaction with the scanning tunneling microscop tip: Towards single molecule engineering," Physical Review Letters 85:13, 2000, pp. 2777-2780.
Hla et al., "Inducing single-molecule chemical reactions with a UHV-STM: A new dimension for nano-science and technology," Chem. Phys. Chem. 2, 2001, pp. 361-366.
Hla et al., "STM control of chemical reactions: single-molecule synthesis," Annu. Rev. Phys. Chem, 54, Jun. 2003, pp. 307-330.
Jaffe et al., "Formation of Carbon Nanotube Based Gears: Quantum Chemistry and Molecular Mechanics Study of the Electrophilic Addition of o-Benzyne to Fullerenes, Graphene, and Nanotubes," First Electronic Molecular Modeling & Graphics Society Conference, 1996.
Kim et al., "Band Gap Modulation of a Carbon Nanotube by Hydrogen Functionalization," J. Korean Phys. Soc. 42, Feb. 2003, pp. S137-S142.
Klein-Douwel et al., "Spatial distributions of atomic hydrogen and $C_2$ in an oxyacetylene flame in relation to diamond growth," Journal of Applied Physics 83:9, May 1, 1998, pp. 4734-4745.
Klocke Nanotechnik, "Processing Material in Electron Microscopes: Nanomanipulation With Several D.O.F." http://www.nanomotor.de/aa_processing.htm.
Klocke Nanotechnik, "Manipulators: Univeral Tools with 1 Nanometer Resolution," http://www.nanomotor.de/p_nanomanipulator.htm.
Klocke Nanotechnik, "SEM-Manipulators—Comparison of Different Systems," http://www.nanomotor.de/pdf/Compare_e_lo.PDF.
Lee et al., "Single-bond formation and characterization with a scanning tunneling microscope," Science 286, Nov. 26, 1999, pp. 1719-1722.
Li et al., "A reduction-pyrolysis-catalysis synthesis of diamond," Science 281, Jul. 10, 1998, pp. 246-247.
Liu et al., "Studies on nucleation process in diamond CVD: An overview of recent development," Diam. Relat. Mater. 4, 1995, pp. 1173-1188.
Mann et al., "Theoretical Analysis of Diamond Mechanosynthesis. Part II. $C_2$ Mediated Growth of Diamond C(110) Surface via Si/Ge-Triadamantane Dimer Placement Tools," J. Comput. Theor. Nanosci. 1, 2004.
May, "Diamond thin films: a 21st-century material," Phil. Trans. R. Soc. Lond. A 358, 2000, pp. 473-495.
Mehl, "Tight binding parameters for the elements," U.S. Naval Research Laboratory (NRL), Jul. 25, 2002.
Mercandelli et al., "Molecular mechanics in crystalline media," Inorg. Chem. 37, 1998, pp. 2563-2569.
Merkle et al., "Theoretical analysis of a carbon-carbon dimer placement tool for diamond mechanosynthesis," J. Nanosci. Nanotechnology 3:03, Aug. 2003, pp. 319-324.
Ni et al., "Chemical functionalization of carbon nanotubes through energetic radical collisions," Phys. Rev. B 61:24, 2000, pp. R16343-R16346.
Page et al., "Hydrogen abstraction from a diamond surface: Ab initio quantum chemical study with constrained isobutane as a model," J. Am. Chem. Soc. 113, 1991, pp. 3270-3274.
Papaconstantopoulos et al., "First-principles study of superconductivity in high-pressure boron," Jul. 9, 2004.
Peng et al., "Theoretical Analysis of Diamond Mechanosynthesis. Part I. Stability of $C_2$ Mediated Growth of Nanocrystalline Diamond C(110) Surface," J. Comput. Theor. Nanosci. 1:1, Mar. 2004.
Postnikov et al., "Ab initio molecular dynamics and elastic properties of TiC and TiN nanoparticles," University of Duisburg, 2003.
Qin et al., The 3D Parameters of a (Nano)Crystal from Lattice Images at Two Tilts, Physics & Astronomy Department and CME, University of Missouri, http://www.umsl.edu/~fraundor/rworld/msa99.pdf.
Quartz Materials Data, http://www.argusinternational.com/quartz.html.
"Sapphire Properties Table," MarkeTech International Inc., Port Townsend, WA, Feb. 21, 2002, http://www.mkt-intl.com/sapphires/sapphphotos.htm.
Silicon Nitride, $Si_3N_4$, http://www.accuratus.com/silinit.html.
Zhigilei et al., "Intermediate metastable structure of the C{111}/(1x1)H-C{111}/(2x1) surface phase transition," Phys. Rev. B 55:3, 1997, pp. 1838-1843.
"Zyvex Microgrippers," http://www.zyvex.com/Products/Grippers_Features.html.
"Zyvex's S100 Nanomanipulator System," http://www.zyvex.com/Products/S100_Faq.html.

Aisenberg et al., "Ion-Beam Deposition of Thin Films of Diamond-like Carbon", Journal of Applied Physics, vol. 42, No. 7, Jun. 1971, pp. 2953-2958.

Albin et al., "Microwave Plasma Chemical Vapor Deposited Diamond Tips for Scanning Tunneling Microscopy", Appl. Phys. Lett 71 (19), Nov. 10, 1997, pp. 2848-2850.

Angus et al., "Low-Pressure, Metastable Growth of Diamond and "Diamondlike" Phases", Articles, Science, vol. 241, Aug. 19, 1988, pp. 913-921.

Ausman et al., "Nanostressing and Mechanochemistry", Nanotechnology 10, (1999), pp. 258-262.

Bachlechner et al., "Multimillion-Atom Molecular Dynamics Simulation of Atomic Level Stresses in $Si(111)/Si_3n_4(0001)$ Nanopixels", American Institute of Physics, Applied Physics Letters, vol. 72, No. 16, Apr. 20, 1998, pp. 1969-1971.

Badziag et al., "Diamond and Graphite Precursors", Scientific Correspondence, Nature, vol. 346, Aug. 9, 1990, pp. 517.

Badziag et al., "Nanometre-Sized Diamonds are More Stable than Graphite", Nature, vol. 343, Jan. 18, 1990, pp. 244-245.

Banerjee et al., "Functionalization of Carbon Nanotubes with a Metal-Containing Molecular Complex", American Chemical Society, Nano Letters, vol. 2, No. 1, 2002, pp. 49-53.

Bhargava et al., "Diamond Polytypes in the Chemical Vapor Deposited Diamond Films", Appl. Phys. Lett. 67, 12, Sep. 18, 1995, pp. 1706-1708.

Brandes et al., "Work Function and Affinity Changes Associated with the Structure of Hydrogen-Terminated Diamond (100) Surfaces", The American Physical Society, Physical Review B, vol. 58, No. 8, Aug. 15, 1998-II, pp. 4952-4962.

Burns et al., "A New Approach to the Construction of Diamondoid Hydrocarbons. Synthesis of *Anti-* Tetramantane", Journal of the American Chemical Society, 100:3, Feb. 1, 1978, pp. 906-911.

Chang et al., "Theoretical Studies of Hydrogen-Abstraction Reactions from Diamond and Diamond-like Surfaces", J. Chem. Phys. 99 (6), Sep. 15, 1993., pp. 4748-4758.

Chu et al., "Growth Kinetics of (100), and (111) Homoepitaxial Diamond Films", Appl. Phys. Lett., 61, 12, Sep. 21, 1992, pp. 1393-1395.

Chu et al., "Mechanism of Diamond Growth by Chemical Vapor Deposition on Diamond (100), (111), and (110) Surfaces: Carbon-13 Studies", Journal of Applied Physics, 70, 3, Aug. 1, 1991, pp. 1695-1705.

Cupas et al., "Congressane", Communications to the Editor, Journal of the American Chemical Society, 87:4, Feb. 20, 1965, pp. 917-918.

Cupas et al., "Iceane", Communications to the Editor, Journal of the American Chemical Society, 96:14, Jul. 10, 1974, pp. 4668-4669.

Diederich et al., "Covalent Fullerene Chemistry", Science, vol. 271, Jan. 19, 1996, pp. 317-323.

Dzegilenko, et al., "Simulations of Carbon Nanotube Tip Assisted Mechano-Chemical Reactions on a Diamond Surface", Nanotechnology 9 (1998), pp. 325-330.

Fahy et al., "High-Pressure Structural and Electronic Properties of Carbon", The American Physical Society, Physical Review B, vol. 36, No. 6, Aug. 15, 1987-II, pp. 3373-3385.

Germann et al., "Atomic Scale Friction of a Diamond Tip on Diamond (100) and (111) Surfaces", J. Appl. Phys. 73(1), Jan. 1, 1993, pp. 163-167.

Giraud et al., "Chemical Nucleation for CVD Diamond Growth", Journal of the American Chemical Society, 123, 2001, pp. 2271-2274.

Graham et al., "[2] Diadamantane, the First Member of a New Class of Diamondoid Hydrocarbons", Communications to the Editor, Journal of the American Chemical Society, 95:17, Aug. 22, 1973, pp. 5785-5786.

Gruen et al., "Fullerenes as Precursors for Diamond Film Growth without Hydrogen or Oxygen Additions", Appl. Phys. Lett. 64(12), Mar. 21, 1994, pp. 1502-1504.

Hanneman et al., "Hexagonal Diamonds in Meteorites: Implications", Reports, Science, vol. 155, Feb. 24, 1967, pp. 995-997.

He et al., "Direct Transformation of Cubic Diamond to Hexagonal Diamond", American Institute of Physics, Applied Physics Letters, vol. 81, No. 4, Jul. 22, 2002, pp. 610-612.

Herman, "Towards Mechanosynthesis of Diamondoid Structures: I. Quantum-Chemical Molecular Dynamics Simulations of Sila-Adamantane Synthesis on Hydrogenated Si(111) Surface with the STM", Nanotechnology 8 (1997) 132-144.

Hirabayashi et al., "Selective Deposition of Diamond Crystals by Chemical Vapor Deposition Using a Tungsten-Filament Method", Appl. Phys. Lett. 53, 19, Nov. 7, 1988, pp. 1815-1817.

Janssen et al., "On the Occurrence of {113} Facets on CVD-Grown Diamond", Journal of Crystal Growth, 125, 1992, pp. 42-50.

Kobayashi et al., "Effect of Ion Implantation and Surface Structure of Silicon on Diamond Film Nucleation", Journal of Crystal Growth, 128, 1993, pp. 408-412.

Laqua et al., "Force Field Calculations (MM2) of Carbon Lattices", Journal of the American Chemical Society, 1990, 112, pp. 7391-7392.

Lee et al., "Growth of Diamond from Atomic Hydrogen and a Supersonic Free Jet of Methyl Radicals", Science, vol. 263, Mar. 18, 1994, pp. 1596-1598.

Leroy et al., "Chemical Vapor Deposition of Diamond Growth Using a Chemical Precursor", Applied Physics Letters, vol. 73, No. 8, Aug. 24, 1998, pp. 1050-1052.

Lin et al., "Effects of Local Facet and Lattice Damage on Nucleation of Diamond Grown by Microwave Plasma Chemical Vapor Deposition", Appl. Phys. Lett. 60, 13, Mar. 30, 1992, pp. 1559-1561.

Lurie et al., "The Diamond Surface" Surface Science, 65, 1977, pp. 453-475.

Marti et al., "Atomic Force Microscopy of Liquid-Covered Surfaces: Atomic Resolution Images", Appl. Phys. Lett. 51 (7), Aug. 17, 1987, pp. 484-486.

Mehandru et al., "Adsorption of H, $CH_3$, $CH_2$ and $C_2H_2$ on 2×1 Restructured Diamond (100)", Surface Science, 248, 1991, pp. 369-381.

Meier et al., "Benzyne Adds Across a Closed 5-6 Ring Fusion in $C_{70}$: Evidence for Bond Delocalization in Fullerenes", Journal of the American Chemical Society 120, 1998, pp. 2337-2342.

Merkle, "A Proposed 'Metabolism' for a Hydrocarbon Assembler", Nanotechnology 8 (1997) pp. 149-162.

Morrish et al., "Effects of Surface Pretreatments on Nucleation and Growth of Diamond Firms on a Variety of Substrates", Appl. Phys. Lett. 59(4), Jul. 22, 1991, pp. 417-419.

Musgrave et al., "Theoretical Studies of a Hydrogen Abstraction Tool for Nanotechnology", Nanotechnology 2 (1991) pp. 187-195.

Namba et al., "Attempt to Grow Diamond Phase Carbon Films From an Organic Solution", J. Vac. Sci. Technol. A, 10(5), Sep./Oct. 1992, pp. 3368-3370.

Namba et al., "Large Grain Size Thin Films of Carbon with Diamond Structure", J. Vac. Sci. Technol. A7, 1, Jan./Feb. 1989, pp. 36-39.

Nomura et al., "Alkyladamantanes by Rearrangement from Diverse Starting Materials", Communications to the Editor, Journal of the American Chemical Society, 89:14, Jul. 5, 1967, pp. 3657-3659.

Oesterschulze et a., "Fabrication of Small Diamond Tips for Scanning Probe Microscopy Application", Appl. Phys. Lett 70 (4), Jan. 27, 1997, pp. 435-437.

Oyabu et al., "Mechanical Vertical Manipulation of Selected Single Atoms by Soft Nanoidentation Using Near Contact Atomic Force Microscopy", Physical Review Letters, vol. 90, No. 17, May 2, 2003, pp. 176102-1-17102-4.

Park et al., "Observation of Conformation -Specific Pathways in the Photodissociation of 1-Iodopropane Ions", Letters to Nature, Nature, vol. 415, Jan. 17, 2002, pp. 306-208.

Pate, "The Diamond Surface: Atomic and Electronic Structure", Surface Science, 165, 1986, pp. 83-142.

Ricca et al., "Hydrogen Abstraction from a Diamond (111) Surface in a Uniform Electric Field", Surface Science 429 (1999), pp. 199-205.

Richard et al., "Remote Plasma Enhanced CVD Deposition of Silicon Nitride and Oxide for Gate Insulators in (In, Ga)As FED Devices", J. Vac. Sci. Technol. A 3(3), May/Jun. 1985, pp. 867-872.

Shen et al., "Finite $T_d$ Symmetry Models for Diamond: From Adamantane to Superadamantane $(C_{35}H_{36})$", Journal of the American Chemical Society, 1992, 114, pp. 497-505.

Sinnott et al., "Surface Patterning by Atomically-Controlled Chemical Forces: Molecular Dynamics Simulations", Surface Science 316 (1994) pp. L1055-L1060.

Snail et al., "Confirmation of {113} Facets on Diamond Grown by Chemical Vapor Deposition", Journal of Crystal Growth, 137, 1994, pp. 676-679.

Sommer et al., "Peroxide-Catalyzed Addition of Trichlor-silane to 1-Octene", Communications to the Editor, Journal of the American Chemical Society, vol. 69, p. 188.

Tamao et al., "Stereocontrol in Intramolecular Hydrosilation of Allyl and Homoallyl Alchohols: A New Approach to the Stereoselective Synthesis of 1,3-Diol Skeletons", Journal of the American Chemical Society, 108, 1986, pp. 6090-6093.

Tanasa et al., "Diamond Deposition on Modified Silicon Substrates: Making Diamond Atomic Force Microscopy Tips for Nanofriction Experiments", Journal of Applied Physics, vol. 94, No. 3, Aug. 1, 2003, pp. 1699-1704.

Taylor et al., "The Chemistry of Fullerenes", Review Article, Nature, vol. 363, Jun. 24, 1993, pp. 685-693.

Tschauner et al., "New Transformations of $CO_2$ at High Pressures and Temperatures", The American Physical Society, Physical Review Letters, vol. 87, No. 7, Aug. 13, 2001, pp. 075701-1-075701-4.

Visser et al., "Tip for Scanning Tunneling Microscopy Made of Monocrystalline, Semiconducting, Chemical Vapor Deposited Diamond", Appl. Phys. Lett. 60 (26), Jun. 29, 1992, pp. 3232-3234.

Walch et al., "Theoretical Studies of Diamond Mechanosynthesis Reactions", Nanotechnology 9 (1998), pp. 285-296.

Williams Jr. et al., "Triamantane", Communications to the Editor, Journal of the American Chemical Society, 88:16, Aug. 20, 1966, pp. 3862-3863.

Angus, John C. et al., "Chemical Vapour Deposition of Diamond", Philosophical Transactions: Physical Sciences and Engineering, vol. 342, No. 1664, Thin Film Diamond (Feb. 15, 1993), The Royal Society, pp. 195-208.

Asmann, Marcus et al., "A Review of Diamond CVD Utilizing Halogenated Precursors", Diamond and Related Materials, 8, 1999, pp. 1-16.

Aublanc, P. et al., "Diamond Synthesis by Electrolysis of Acetates", Diamond and Related Materials, 10, 2001, pp. 942-946.

Badzian, Andrzej et al., "Diamond Homoepitaxy by Chemical Vapor Deposition", Diamond and Related Materials, 2, 1993, pp. 147-157.

Banerjee, Sarbajit et al., "Rational Chemical Strategies for Carbon Nanotube Functionalization", Chem. Eur. J., 2003, 9, pp. 1898-1908.

Battaile, C. C. et al., "Etching Effects During the Chemical Vapor Deposition of (100) Diamond", Journal of Chemical Physics, vol. 111, No. 9, Sep. 1, 1999, pp. 4291-4299.

Bobrov, K. et al., "Thermal-Programmed Desorption (TPD) of Deuterium from Di(111) Surface: Presence of Two Adsorption States", Diamond and Related Materials, 6, 1997, pp. 736-742.

Bundy, F. P. et al., "Hexagonal Diamond—A New Form of Carbon", The Journal of Chemical Physics, vol. 46, No. 9, May 1, 1967, pp. 3437-3446.

Burgos, E. et al., "A Semi-Empirical Potential for the Statics and Dynamics of Covalent Carbon Systems", Chemical Physics Letters, 298, 1998, Dec. 18, 1998, pp. 273-278.

Burns, William et al., "Gas-Phase Reactions on Platinum. Synthesis and Crystal Structure of Anti-Tetramantane, a Large Diamondoid Fragment", J.C.S. Chem. Comm., 1976, pp. 893-895.

Chatgilialoglu, Chryssostomos, "Organosilanes as Radical-Based Reducing Agents in Synthesis", Acc. Chem. Res., 1992, 25, pp. 188-194.

Devries, R. C., "Synthesis of Diamond Under Metastable Conditions", Annual Reviews Mater. Sci., 1987, 17, pp. 161-187.

Fayette, L. et al., "Analysis of the Fine Structure of the Raman Line and of X-Ray Reflection Profiles for Textured CVD Diamond Films", Diamond and Related Materials, 4, 1995, pp. 1243-1250.

Fedoseev, D. V. et al., "Transition of Graphite into Diamond in a Solid Phase Under the Atmospheric Pressure", Carbon, vol. 21, No. 3, 1983, pp. 237-241.

Frenklach, Michael et al., "Surface Migration in Diamond Growth", J. Phys. Chem. B, 1997, 101, pp. 3025-3036.

Hirabaysashi, Keiji et al., "Size Dependence of Morphology of Diamond Surfaces Prepared by DC Arc Plasma Jet Chemical Vapor Deposition", Jpn. J. Appl. Phys., vol. 31, Part 1, No. 2A, Feb. 1992, pp. 355-360.

Knight, Diane S., "Characterization of Diamond Films by Raman Spectroscopy", J. Mater. Res., vol. 4, No. 2, Mar./Apr. 1989, pp. 385-393.

Kopping, B. et al., "$(Me_3Si)_3$ SiH: An Efficient Hydrosilylating Agent of Alkenes and Alkynes", J. Org. Chem., 1992, 57, pp. 3994-4000.

Lewis, Larry N. et al., "The Chemistry of Fumarate and Maleate Inhibitors with Platinum Hydrosilylation Catalysts", Journal of Organometallic Chemistry, 521, 1996, pp. 221-227.

Matsui, Yasuji et al., "Flame Structure and Diamond Growth Mechanism of Acetylene Torch", Japanese Journal of Applied Physics, vol. 28, No. 9, Sep. 1989, pp. 1718-1724.

Matsumoto, Seiichiro et al., "Electron Microscopic Observation of Diamond Particles Grown from the Vapour Phase", Journal of Materials Science, 18, 1983, pp. 1785-1793.

Mokbel, Ilham et al., "Vapor Pressures and Thermal Data for Three High-Boiling Compounds of Petroleum Interest: 1-Phenyldodecane, $(5\alpha)$-cholestane, Adamantane", Fluid Phase Equilibria, 169, 2000, pp. 191-207.

Roul, B. K. et al., "Diamond and Diamond-like-Carbon Growth on Si (100) by Hot Filament-Assisted RF Plasma CVD", Journal of Materials Synthesis and Processing, vol. 7, No. 5, 1999.

Sowa, H. et al., "A Proposal for a Transition Mechanism from the Diamond to the Lonsdaleite Type", Acta Crystallographica Section A, 2001, A57, pp. 406-413.

Tomellini, Massimo, "Evidence for Nonclassical Nucleation at Solid Surfaces in Diamond Deposition from the Gas Phase", J. Mater. Res., vol. 8, No. 7, Jul. 1993, pp. 1596-1604.

Vogl, O. et al., "Synthesis of Hexaoxadiamantanes", The Journal of Organic Chemistry, vol. 34, No. 1, Jan. 1969, pp. 204-207.

Wild, C. et al., "Oriented CVD Diamond Films: Twin Formation, Structure and Morphology", Diamond and Related Materials, 3, 1994, pp. 373-381.

Wild, C. et al., "Chemical Vapour Deposition and Characterization of Smooth {100}-Faceted Diamond Films", Diamond and Related Materials, 2, 1993, pp. 158-168.

\* cited by examiner

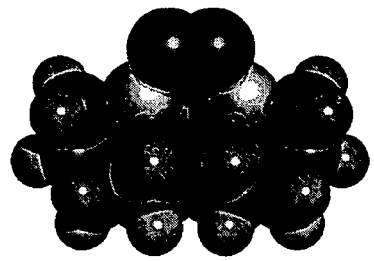 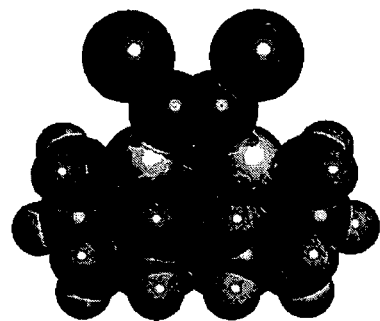
FIG. 3A　　　　　　　　　　　　FIG. 3B
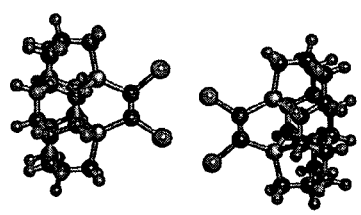 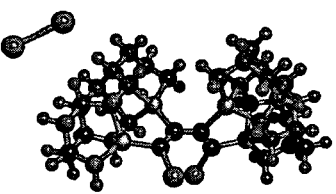 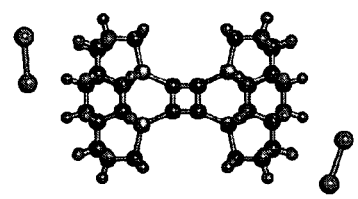
FIG. 4A　　　　　　　　FIG. 4B　　　　　　　　FIG. 4C
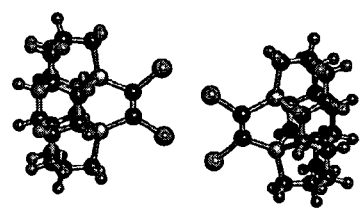 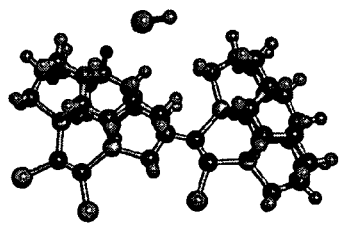 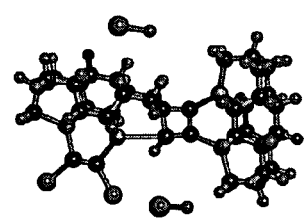
FIG. 5A　　　　　　　　FIG. 5B　　　　　　　　FIG. 5C

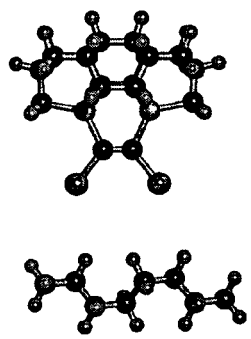
FIG. 6A
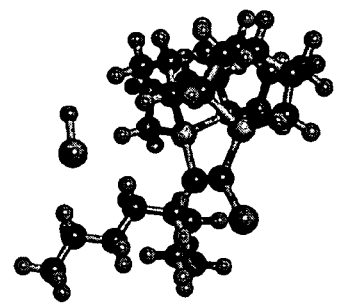
FIG. 6B
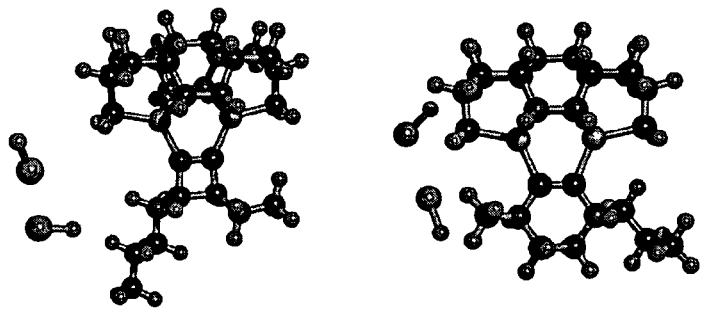
FIG. 6CFIG. 6D

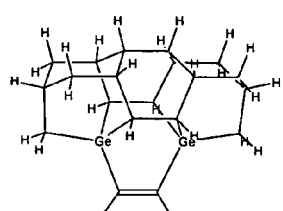
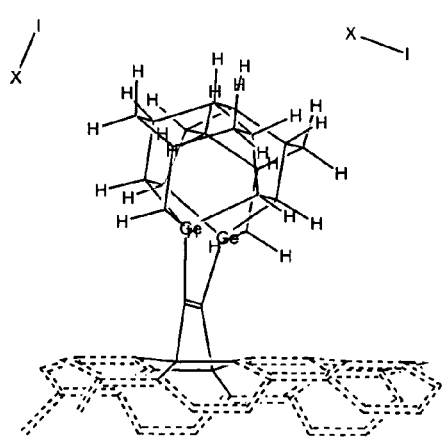
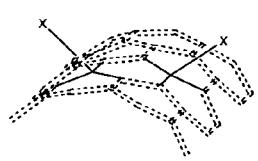
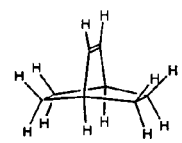
FIG. 13A
FIG. 13B
FIG. 13C
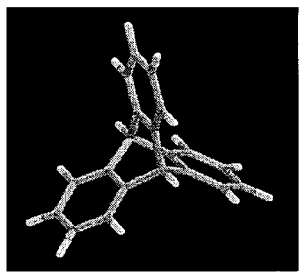
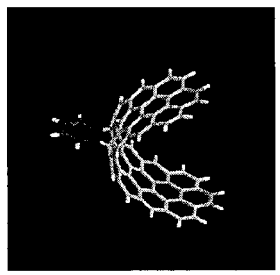
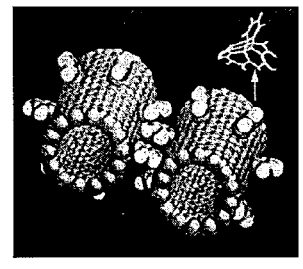
FIG. 13D
FIG. 13E
FIG. 13F GM1                         LM1
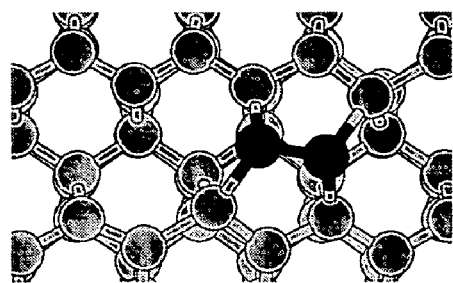        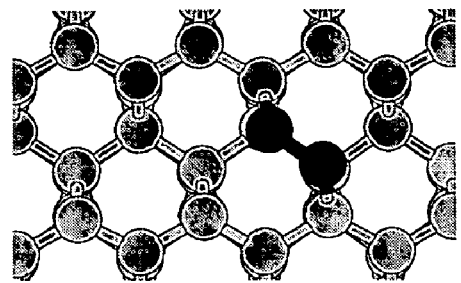
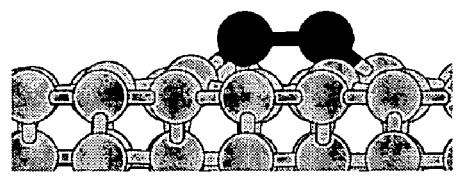        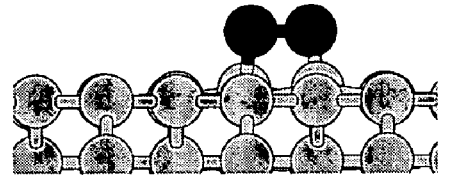
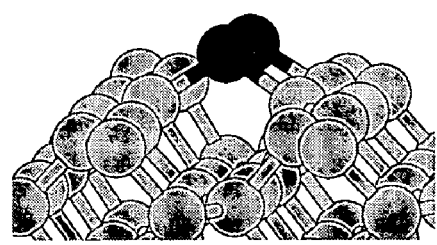        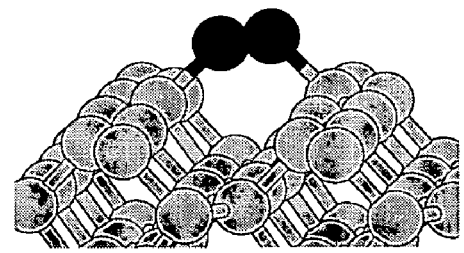
FIG. 18A                    FIG. 18B

| GM2 | LM2-2 | LM2-4 | LM2-6 |
|---|---|---|---|
| 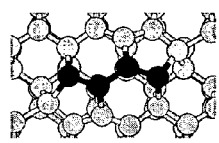 | 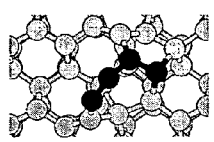 | 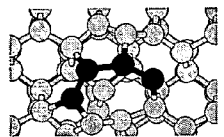 | 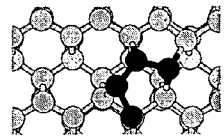 |
|  |  |  |  |
| 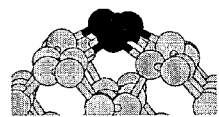 | 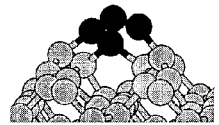 | 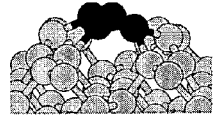 | 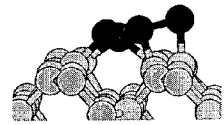 |
| FIG. 20A | FIG. 20B | FIG. 20C | FIG. 20D |
| LM2-8 | LM2-12 |
|---|---|
| 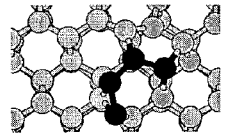 | 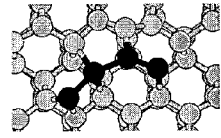 |
|  | 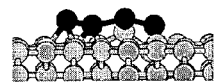 |
| 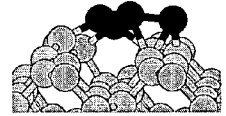 | 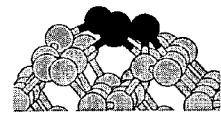 |
| FIG. 20E | FIG. 20F |

GM3    LM3A-1    LM3A-2    LM3A-3
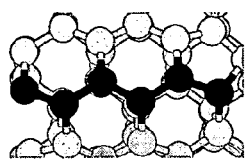 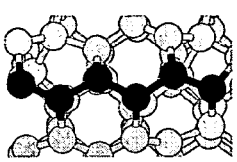 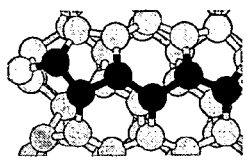 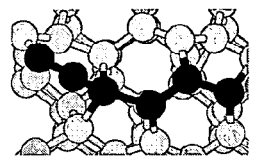
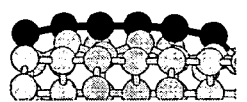 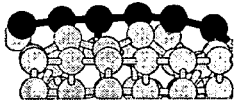 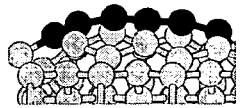 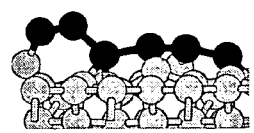
 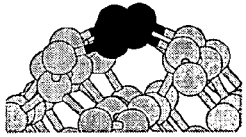 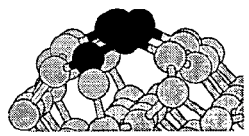 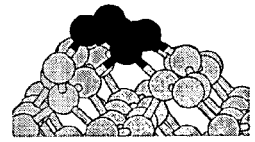
FIG. 22A    FIG. 22B    FIG. 22C    FIG. 22D
LM3A-4    LM3A-5    LM3A-6    LM3A-7
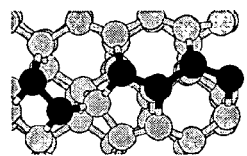 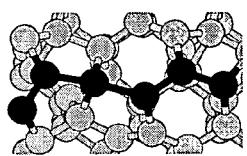 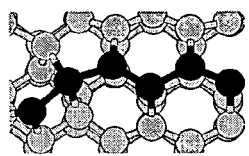 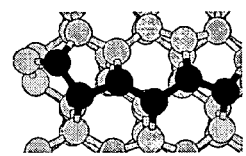
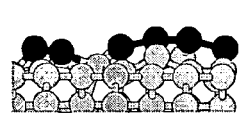 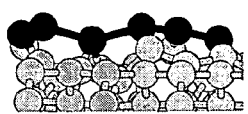 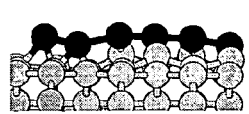 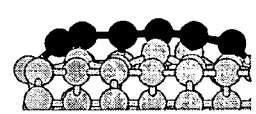
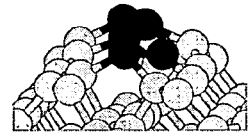  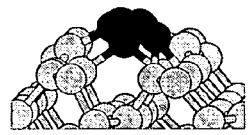 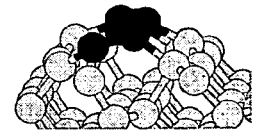
FIG. 22E    FIG. 22F    FIG. 22G    FIG. 22H LM3B-1      LM3B-2      LM3B-4      LM3B-5
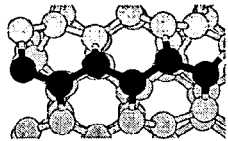 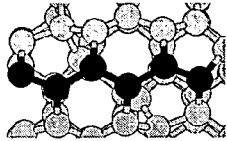 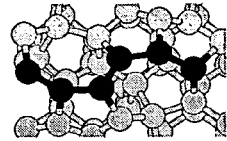 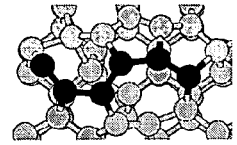
 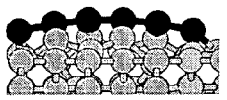 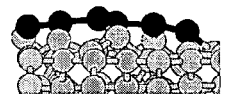 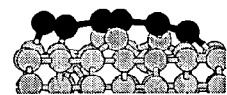
   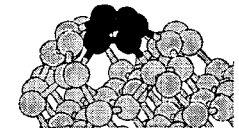
FIG. 24A      FIG. 24B      FIG. 24C      FIG. 24D
LM3B-6      LM3B-8      LM3B-10      LM3B-12
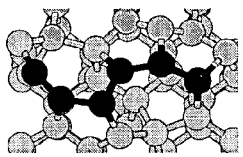 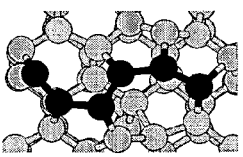 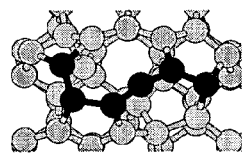 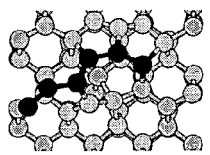
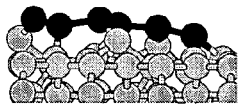 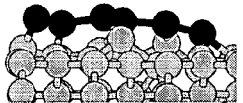 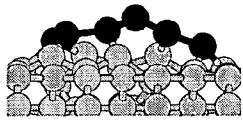 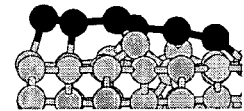
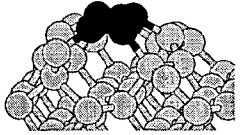 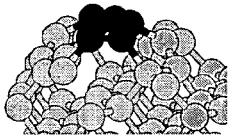  
FIG. 24E      FIG. 24F      FIG. 24G      FIG. 24H

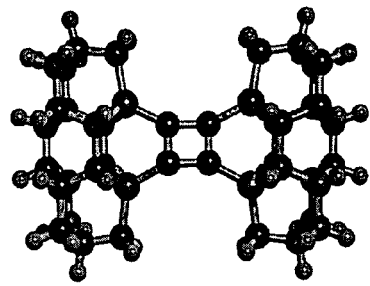
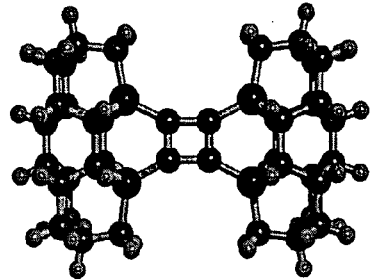
FIG. 29A            FIG. 29B
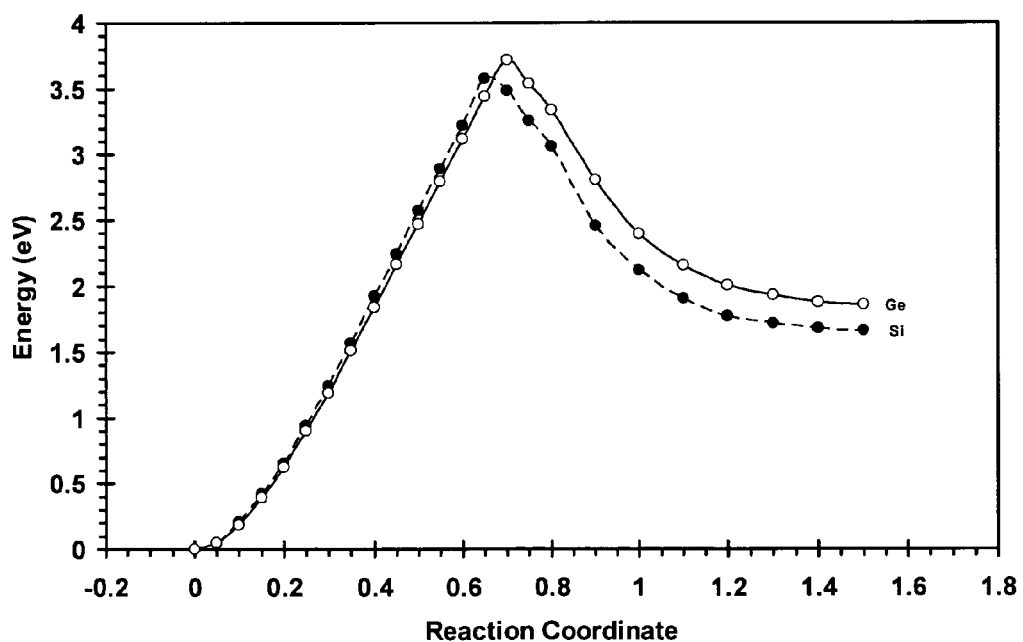
FIG. 30

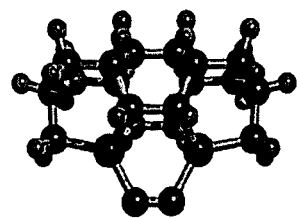 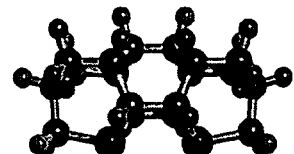 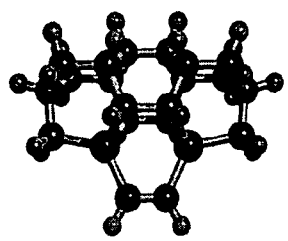
Transition State
Reactants
Products
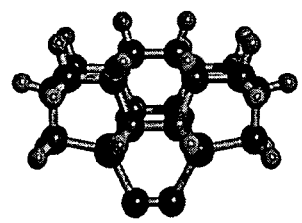 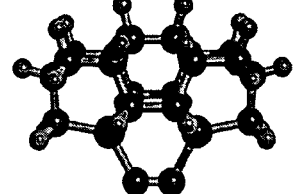 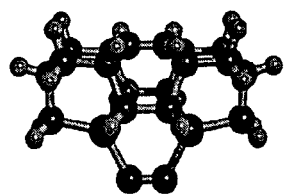
FIG. 31A  FIG. 31B  FIG. 31C
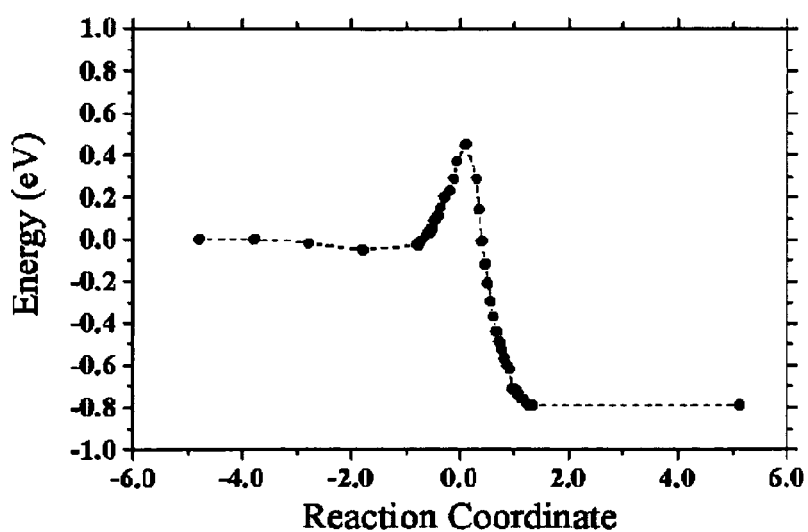
FIG. 32

SIMPLE TOOL FOR POSITIONAL DIAMOND MECHANOSYNTHESIS, AND ITS METHOD OF MANUFACTURE

The present application claims the benefit of U.S. Ser. No. 60/543,802 filed Feb. 11, 2004, the entire contents of which are incorporated by reference herein.

1. BACKGROUND OF THE INVENTION

The properties of diamond, such as its extraordinary hardness, coefficient of friction, tensile strength and low compressibility, electrical resistivity, electrical carrier (electron and hole) mobility, high energy bandgap and saturation velocity, dielectric breakdown strength, low neutron cross-section (radiation-hardness), thermal conductivity, thermal expansion resistance, optical transmittance and refractive index, and chemical inertness allow this material to serve a vital role in a wide variety of industrial and technical applications.

The present invention relates generally to methods for the manufacture of synthetic diamond. More particularly, the invention is concerned with the physical structure and method of manufacture of a tool, which can itself subsequently be employed in the mechanosynthetic manufacture of other molecularly precise diamond structures. However, the same toolbuilding process is readily extended to other classes of tooltip molecules, handle materials, and mechanosynthetic processes and structures other than diamond.

1.1 Conventional Diamond Manufacturing

All prior art methods of manufacturing diamond are bulk processes in which the diamond crystal structure is manufactured by statistical processes. In such processes, new atoms of carbon arrive at the growing diamond crystal structure having random positions, energies, and timing. Growth extends outward from initial nucleation centers having uncontrolled size, shape, orientation and location. Existing bulk processes can be divided into three principal methods—high pressure, low pressure hydrogenic, and low pressure nonhydrogenic.

(A) In the first or high pressure bulk method of producing diamond artificially, powders of graphite, diamond, or other carbon-containing substances are subjected to high temperature and high pressure to form crystalline diamond. High pressure processes are of several types [1]:

(1) Impact Process. The starting powder is instantaneously brought under high pressure by applying impact generated by, for example, the explosion of explosives and the collision of a body accelerated to a high speed. This produces granular diamond by directly converting the starting powder material having a graphite structure into a powder composed of grains having a diamond structure. This process has the advantage that no press is required, as in the two other processes, but there is difficulty in controlling the size of the resulting diamond products. Nongraphite organic compounds can also be shock-compressed to produce diamond [2].

(2) Direct Conversion Process. The starting powder is held under a high static pressure of 13-16 GPa and a high temperature of 3,000-4,000° C. in a sealed high pressure vessel. This establishes stability conditions for diamond, so the powder material undergoes direct phase transition from graphite into diamond, through graphite decomposition and structural reorganization into diamond. In both direct conversion and flux processes, a press is widely used and enables single crystal diamonds to be grown as large as several millimeters in size.

(3) Flux Process. As in direct conversion, a static pressure and high temperature are applied to the starting material, but here fluxes such as Ni and Fe are added to allow the reaction to occur under lower pressure and temperature conditions, accelerating the atomic rearrangement which occurs during the conversion process. For example, high-purity graphite powder is heated to 1500-2000° C. under 4-6 GPa of pressure in the presence of iron catalyst, and under this extreme, but equilibrium, condition of pressure and temperature, graphite is converted to diamond: The flux becomes a saturated solution of solvated graphite, and because the pressure inside the high pressure vessel is maintained in the stability range for diamond, the solubility for graphite far exceeds that for diamond, leading to diamond precipitation and dissolution of graphite into the flux. Every year about 75 tons of diamond are produced industrially this way [14].

(B) In the second or low pressure hydrogenic bulk method of producing diamond artificially, widely known as CVD or Chemical Vapor Deposition, hydrogen ($H_2$) gas mixed with a few percent of methane ($CH_4$) is passed over a hot filament or through a microwave discharge, dissociating the methane molecule to form the methyl radical ($CH_3$) and dissociating the hydrogen molecule into atomic hydrogens (H). Acetylene ($C_2H_2$) can also be used in a similar manner as a carbon source in CVD. Diamond or diamond-like carbon films can be grown by CVD epitaxially on diamond nuclei, but such films invariably contain small contaminating amounts (0.1-1%) of hydrogen which gives rise to a variety of structural, electronic and chemical defects relative to pure bulk diamond. Currently, diamond synthesis from CVD is routinely achieved by more than 10 different methods [163].

As noted by McCune and Baird [3], a diamond particle is a special cubic lattice grown from a single nucleus of four-coordinated carbon atoms. The diamond-cubic lattice consists of two interpenetrating face-centered cubic lattices, displaced by one quarter of the cube diagonal. Each carbon atom is tetrahedrally coordinated, making strong, directed $sp^3$ bonds to its neighbors using hybrid atomic orbitals. The lattice can also be visualized as planes of six-membered saturated carbon rings stacked in an ABC ABC ABC sequence along <111> directions. Each ring is in the "chair" conformation and all carbon-carbon bonds are staggered. A lattice with hexagonal symmetry, called lonsdaleite, can be constructed with the same tetrahedral nearest neighbor configuration. In lonsdaleite, however, the planes of chairs are stacked in an AB AB AB sequence, and the carbon-carbon bonds normal to these planes are eclipsed. In simple organic molecules, the eclipsed conformation is usually less stable than the staggered because steric interactions are greater. Thermodynamically, diamond is slightly unstable with respect to crystalline graphite. At 298 K and 1 atm the free energy difference is 0.026 eV per atom, only slightly greater than $k_BT$, where $k_B$ is the Boltzmann constant and T is the absolute temperature in degrees Kelvin.

The basic obstacle to crystallization of diamond at low pressures is the difficulty in avoiding co-deposition of graphite and/or amorphous carbon when operating in the thermodynamically stable region of graphite [3]. In general, the possibility of forming different bonding networks of carbon atoms is understandable from their ability to form different electronic configurations of the valence electrons. These bond types are classified as $sp^3$ (tetrahedral), $sp^2$ (planar), and $sp^1$ (linear), and are related to the various carbon allotropes including cubic diamond and hexagonal diamond or lonsdaleite ($sp^3$), graphite ($sp^2$), and carbenes ($sp^1$), respectively.

Hydrogen is generally regarded as an essential part of the reaction steps in forming diamond film during CVD, and atomic hydrogen must be present during low pressure diamond growth to: (1) stabilize the diamond surface, (2) reduce the size of the critical nucleus, (3) "dissolve" the carbon in the feedstock gas, (4) produce carbon solubility minimum, (5) generate condensable carbon radicals in the feedstock gas, (6) abstract hydrogen from hydrocarbons attached to the surface, (7) produce vacant surface sites, (8) etch (regasify) graphite, hence suppressing unwanted graphite formation, and (9) terminate carbon dangling bonds [4,6]. Both diamond and graphite are etched by atomic hydrogen, but for diamond, the deposition rate exceeds the etch rate during CVD, leading to diamond (tetrahedral $sp^3$ bonding) growth and the suppression of graphite (planar $sp^2$ bonding) formation. (Note that most potential atomic hydrogen substitutes such as atomic halogens etch graphite at much higher rates than atomic hydrogen [4].)

Low pressure or CVD hydrogenic metastable diamond growth processes are of several types [3-5]:

(1) Hot Filament Chemical Vapor Deposition (HFCVD). Filament deposition involves the use of a dilute (0.1-2.5%) mixture of hydrocarbon gas (typically methane) and hydrogen gas ($H_2$) at 50-1000 torr which is introduced via a quartz tube located just above a hot tungsten filament or foil which is electrically heated to a temperature ranging from 1750-2800° C. The gas mixture dissociates at the filament surface, yielding dissociation products consisting mainly of radicals including $CH_3$, $CH_2$, $C_2H$, and CH, acetylene, and atomic hydrogen, as well as unreacted $CH_4$ and $H_2$. A heated deposition substrate placed just below the hot tungsten filament is held in a resistance heated boat (often molybdenum) and maintained at a temperature of 500-1100° C., whereupon diamonds are condensed onto the heated substrate. Filaments of W, Ta, and Mo have been used to produce diamond. The filament is typically placed within 1 cm of the substrate surface to minimize thermalization and radical recombination, but radiation heating can produce excessive substrate temperatures leading to nonuniformity and even graphitic deposits. Withdrawing the filament slightly and biasing it negatively to pass an electron current to the substrate assists in preventing excessive radiation heating.

(2) High Frequency Plasma—Assisted Chemical Vapor Deposition (PACVD). Plasma deposition involves the addition of a plasma discharge to the foregoing filament process. The plasma discharge increases the nucleation density and growth rate, and is believed to enhance diamond film formation as opposed to discrete diamond particles. There are three basic plasma systems in common use: a microwave plasma system, a radio frequency or RF (inductively or capacitively coupled) plasma system, and a direct current or DC plasma system. The RF and microwave plasma systems use relatively complex and expensive equipment which usually requires complex tuning or matching networks to electrically couple electrical energy to the generated plasma. The diamond growth rate offered by these two systems can be quite modest, on the order of ~1 micron/hour. Diamonds can also be grown in microwave discharges in a magnetic field, under conditions where electron cyclotron resonance is considerably modified by collisions. These "magneto-microwave" plasmas can have significantly higher densities and electron energies than isotropic plasmas and can be used to deposit diamond over large areas.

(3) Oxyacetylene Flame—Assisted Chemical Vapor Deposition. Flame deposition of diamond occurs via direct deposit from acetylene as a hydrocarbon-rich oxyacetylene flame. In this technique, conducted at atmospheric pressure, a specific part of the flame (in which both atomic hydrogen (H) and carbon dimers ($C_2$) are present [19]) is played on a substrate on which diamond grows at rates as high as >100 microns/hour [7].

(C) In the third or low pressure nonhydrogenic bulk method of producing diamond artificially [8-17], a nonhydrogenic fullerene (e.g., $C_{60}$) vapor suspended in a noble gas stream or a vapor of mixed fullerenes (e.g., $C_{60}$, $C_{70}$) is passed into a microwave chamber, forming a plasma in the chamber and breaking down the fullerenes into smaller fragments including isolated carbon dimer radicals ($C_2$) [6]. (Often a small amount of $H_2$, e.g., ~1%, is added to the feedstock gas.) These fragments deposit onto a single-crystal silicon wafer substrate, forming a thickness of good-quality smooth nanocrystalline diamond (15 nm average grain size, range 10-30 nm crystallites [8-10]) or ultrananocrystalline diamond (UNCD) diamond films with intergranular boundaries free from graphitic contamination [9], even when examined by high resolution TEM [16] at atomic resolution [10]. Fullerenes are allotropes of carbon, containing no hydrogen, so diamonds produced from fullerene precursors are hydrogen-defect free [11]—indeed, the Ar/$C_{60}$ film is close in both smoothness and hardness to a cleaved single crystal diamond sample [10]. The growth rate of diamond film is ~1.2 microns/hour, comparable to the deposition rate observed using 1% methane in hydrogen under similar system deposition conditions [9, 10]. Diamond films can, using this process, be grown at relatively low temperatures (<500° C.) [10] as opposed to conventional diamond growth processes which require substrate temperatures of 800-1000° C.

Ab initio calculations indicate that $C_2$ insertion into carbon-hydrogen bonds is energetically favorable with small activation barriers, and that $C_2$ insertion into carbon-carbon bonds is also energetically favorable with low activation barriers [15]. A mechanism for growth on the diamond C(100) (2×1):H reconstructed surface with $C_2$ has been proposed [16]. A $C_2$ molecule impinges on the surface and inserts into a surface carbon-carbon dimer bond, after which the $C_2$ then inserts into an adjacent carbon-carbon bond to form a new surface carbon dimer. By the same process, a second $C_2$ molecule forms a new surface dimer on an adjacent row. Then a third $C_2$ molecule inserts into the trough between the two new surface dimers, so that the three $C_2$ molecules incorporated into the diamond surface form a new surface dimer row running perpendicular to the previous dimer row. This $C_2$ growth mechanism requires no hydrogen abstraction reactions from the surface and in principle should proceed in the absence of gas phase atomic hydrogen.

The UNCD films were grown on silicon (Si) substrates polished with 100 nm diamond grit particles to enhance nucleation [16]. Deposition of UNCD on a sacrificial release layer of $SiO_2$ substrate is very difficult because the nucleation density is 6 orders of magnitude smaller on $SiO_2$ than on Si [18]. However, the carbon dimer growth species in the UNCD process can insert directly into either the Si or $SiO_2$ surface, and the lack of atomic hydrogen in the UNCD fabrication process permits both a higher nucleation density and a higher renucleation rate than the conventional $H_2$/$CH_4$ plasma chemistry [18], so it is therefore possible to grow UNCD directly on $SiO_2$.

Besides fullerenes, it has been proposed that "diamondoids" or polymantanes, small hydrocarbons made of one or more fused cages of adamantane ($C_{10}H_{16}$, the smallest unit cell of hydrogen-terminated crystalline diamond) could be used as the carbon source in nonhydrogenic diamond CVD [20-22]. Dahl, Carlson and Liu [22] suggest that the injection of diamondoids could facilitate growth of CVD-grown diamond film by allowing carbon atoms to be deposited at a rate of about 10-100 or more at a time, unlike conventional plasma CVD in which carbons are added to the growing film one atom at a time, possibly increasing diamond growth rates by an order of magnitude or better. However, Plaisted and Sinnott [23] used atomistic simulations to study thin-film growth via the deposition of very hot (119-204 eV/molecule; 13-17 km/sec) beams of adamantane molecules on hydrogen-terminated diamond (111) surfaces, with forces on the atoms in the simulations calculated using a many-body reactive empirical potential for hydrocarbons. During the deposition process the adamantane molecules react with one another and the surface to form hydrocarbon thin films that are primarily polymeric with the amount of adhesion depending strongly on incident energy. Despite the fact that the carbon atoms in the adamantane molecules are fully $sp^3$ hybridized, the films contain primarily $sp^2$ hybridized carbon with the percentage of $sp^2$ hybridization increasing as the incident velocity goes up. However, cooler beams might allow more consistent $sp^3$ diamond deposition, and other techniques [24] have deposited diamond-like carbon (DLC) films with a higher percentage of $sp^3$ hybridization from adamantane.

1.2 Diamond Manufacturing Via Positional Diamond Mechanosynthesis

A new non-bulk non-statistical method of manufacturing diamond, called positional diamond mechanosynthesis, was proposed theoretically by Drexler in 1992 [32]. In this method, positionally controlled carbon deposition tools are manipulated to sub-Angstrom tolerances via SPM (Scanning Probe Microscopy) or similar atomic-resolution manipulator mechanisms to build diamond in vacuo. Each carbon deposition tool includes a tooltip molecule attached to a larger handle structure which is grasped by the atomic-resolution manipulator mechanism. One or more carbon atoms having one or more dangling bonds are relatively loosely bound to the tip of the tooltip molecule. When the tip is brought into contact with the substrate surface at a specific location and sufficient mechanical forces (compression, torsion, etc.) are applied, a stronger covalent bond is formed between the tip-bound carbon atom(s) and the surface, via the dangling bonds, than previously existed between the tip-bound carbon atom(s) and the tooltip structure. As a result, the tool may subsequently be retracted from the substrate and the tip-bound carbon atom(s) will be left behind on the substrate surface at the specific location and orientation desired. By repeating this process of positionally-constrained chemistry or mechanosynthesis, using a succession of similar tools, a large variety of molecularly precise diamond structures can be fabricated, placing one or a few atoms at a time on the growing workpiece.

Several analyses using the increasingly accurate methods of computational chemistry have confirmed the theoretical validity of the proposed process of positional diamond mechanosynthesis for hydrogen abstraction [25-33] and hydrogen donation [32, 33], in respect to the surface passivating hydrogen atoms, and carbon deposition [32-38], in respect to diamond surfaces and the body of diamond nanostructures. While positional diamond mechanosynthesis has not yet been demonstrated experimentally, early experiments [39] have demonstrated single-molecule positional covalent bond formation on surfaces via SPM, though in these cases bond formation was not purely mechanochemical but included electrochemical or other means. Mechanosynthesis of the Si(111) lattice has been studied theoretically [40, 41] and the first laboratory demonstration of nonelectrical, purely mechanical positional covalent bond formation on a silicon surface using a simple SPM tip was reported in 2003 [42]. In this demonstration, Osaka University researchers lowered a silicon AFM tip toward the silicon Si(111)-(7×7) surface and pushed down on a single atom. The focused pressure forced the atom free of its bonds to neighboring atoms, which allowed it to bind to the AFM tip. After lifting the tip and imaging the material, there was a hole where the atom had been (FIG. 1). Pressing the tip back into the vacancy redeposited the tip-bound selected single atom, this time using the pressure to break the bond with the tip. These manipulation processes were purely mechanical since neither bias voltage nor voltage pulse was applied between probe and sample [42].

Existing mechanosynthetic tools can only be used at ultralow temperatures near absolute zero, and hold the atom or molecule to be deposited only very weakly, and can be employed only very slowly (minutes or hours per mechanosynthetic operation). These tools include the simple diamond stylus [43] and other crude tools such as nanocrystalline diamond grown (a) on standard silicon [44, 48] AFM tips with a 30 nm radius [48], (b) on silicon cantilever tips [46, 47], (c) on tungsten STM tips [45], or (d) on 12 nm radius doped-diamond STM tips [49], using CVD [44-49] including HFCVD [44, 46] or PACVD [45] diamond deposition processes. There is a need for improved mechanosynthetic tools with a molecularly precise <0.3 nm tip radius that can operate at liquid nitrogen or even room temperatures, and can perform mechanosynthetic operations in seconds or even faster cycle times, and can conveniently be precisely manipulated to sub-Angstrom positional accuracy using conventional SPM instruments.

In 2002, Merkle and Freitas [36] proposed the first design for a class of precision tooltip molecules intended to positionally deposit individual carbon dimers on a growing diamond substrate via diamond mechanosynthesis (FIG. 2), and subsequent theoretical analysis [37, 38] has verified that this class of tooltip molecules should be useful for depositing carbon dimers on a dehydrogenated diamond C(110) crystal surface, for the purpose of building additional C(110) surface or other molecularly precise structures at liquid nitrogen or room temperatures. In FIG. 2, DCB6-Si refers to a configuration comprising a six-member ring dicarbon bridge (i.e., DCB6), which is substituted with Si. A general nomenclature is DCB6-X, where X=Si, Ge, Sn or Pb.

No specific proposals for attaching tooltip molecules such as the one illustrated in FIG. 2 A/B to larger tool handles, or complete tools for positional diamond mechanosynthesis, have previously been reported in the scientific, engineering or patent literature. While others have previously noted the need for a handle structure to manipulate the active mechanosynthetic tooltip [32, 33, 36, 38], this invention is the first practical description of how to manufacture and to attach tooltips to such a handle structure, and thus to manufacture a complete mechanosynthetic tool.

The present invention is not limited to a method for the manufacture of a complete tool which can be used for diamond mechanosynthesis. The same toolbuilding process is readily extended to other classes of tooltip molecules, handle materials, and mechanosynthetic processes and structures other than diamond. As examples, which in no way limit or exhaust the possible applications of this invention, the same method as described herein can be used to build complete mechanosynthetic tools and attach handles to: (1) other possible $C_2$ dimer deposition tooltips proposed by Drexler [32] and Merkle [33, 34] for the building of molecularly precise diamond structures; (2) other possible carbon deposition tooltips, including but not limited to carbene tooltips as proposed by Drexler [32] and Merkle [33, 34] and monoradical methylene tooltips as proposed by Freitas [234], for the deposition of carbon or hydrocarbon moieties during the building of molecularly precise diamond structures, or other tooltips that may be used for the removal of individual carbon atoms, $C_2$ dimers [38], or other hydrocarbon moieties from a growing diamond surface; (3) tooltips for the abstraction [25-33] and donation [32, 33] of hydrogen atoms, for the purpose of positional surface passivation or depassivation during the building of molecularly precise diamond structures, or during the building of molecularly precise structures other than diamond, or of other atoms similarly employed for passivation purposes; or (4) tooltips for the deposition or abstraction of atoms, dimers, or other moieties, to or from materials including, but not limited to, covalent solids other than diamond, silicon, germanium or other semiconductors, intermetallics, ceramics, and metals.

SUMMARY OF THE INVENTION

The present embodiments provide a mechanosynthesis tool and a method for building the mechanosynthesis tool for use in the molecularly precise fabrication of physical structures, in particular, diamond structures.

An embodiment of the invention is a capped tooltip molecule, the molecule having a tip end and a nucleation-site, handle end distal to the tip end, the capped tooltip molecule comprising one or more adamantane molecules arranged in a polymantane or lonsdaleite configuration to form a base molecule, the base molecule having at least one bridgehead carbon of the base molecule substituted with a dimerholder atom X, wherein dimerholder atom X comprises a Group III element, a Group IV element other than carbon, or a Group V element, to form a tip end of the tooltip molecule; and a capped carbon dimer covalently bonded to the dimerholder atom X wherein the capped carbon dimer has a structure =C-cap or =C-cap-C=. When the capped carbon dimer has the structure =C-cap, the -cap- comprises a group as set forth in Table 1 for =C-cap; and when the capped carbon dimer has the structure =C-cap-C=, the -cap- comprises a group as set forth in Table 1 for =C-cap-C=.

A device for diamond handle attachment to a tooltip molecule is a further embodiment of the invention. The device comprises a tooltip molecule, a carbon dimer and deposition surface material as follows. The tooltip molecule of the device of the present embodiment has a tip end and a nucleation-site, handle end distal to the tip end, the tooltip molecule comprising one or more adamantane molecules arranged in a polymantane or lonsdaleite configuration to form a base molecule, the base molecule having at least one carbon of the base molecule substituted with a dimerholder atom X, wherein dimerholder atom X comprises a Group III element, a Group IV element other than carbon, or a Group V element, to form a tip end of the tooltip molecule. The carbon dimer of the device is covalently bonded to a dimerholder atom X; and the deposition surface material is covalently bonded to the carbon dimer. The deposition surface material comprises a metal, alloy or element having a melting point of at least 300° C., a thermal expansion coefficient maximally different than that of diamond, a mismatch in crystal lattice constant as compared to that of diamond, resistance to carbide formation, less bonding strength to the carbon dimer as compared to bonding strength between the diamondholder atom X and the carbon dimer, and little or no solubility or reaction with carbon. In certain embodiments of the device, the dimerholder atom comprises Si, Ge, Sn or Pb. In certain embodiments of the device, the deposition surface material comprises graphite, $Al_2O_3$, Pb, Sn, Ge, Cu, Au, or Ag.

A mechanosynthetic tool comprising the device of the above paragraph and further comprising a handle covalently bonded to the nucleation-site, handle end of the tooltip molecule is a further embodiment of the invention. The handle comprises a diamond shard having an apical tip C(110) crystal face covalently bonded to the nucleation-site, handle end of the tooltip molecule; or the handle comprises a diamond crystal, rod, or cone having a base and an apex distal to the base, wherein the base has a diameter such that the base is grippable by a microscale manipulator device, and wherein the apex is covalently bonded to the nucleation-site, handle end of the tooltip molecule.

A further embodiment is an activated mechanosynthetic tool for positional diamond mechanosynthesis, the tool comprising a tooltip molecule, a carbon dimer radical, and a handle as follows. The tooltip molecule has a tip end and a nucleation-site, handle end distal to the tip end, the tooltip molecule comprising one or more adamantane molecules arranged in a polymantane or lonsdaleite configuration to form a base molecule, the base molecule having at least one carbon of the base molecule substituted with a dimerholder atom X, wherein dimerholder atom X comprises a Group III element, a Group IV element other than carbon, or a Group V element, to form a tip end of the tooltip molecule. The carbon dimer radical is covalently bonded to the dimerholder atom X; and the handle comprises a diamond shard having an apical tip C(110) crystal face covalently bonded to the nucleation-site, handle end of the tooltip molecule; or a diamond crystal, rod, or cone having a base and an apex distal to the base, wherein the base has a diameter such that the base is grippable by a microscale manipulator device, and wherein the apex is covalently bonded to the nucleation-site, handle end of the tooltip molecule. The activated mechanosynthetic tool is positionally restrained in vacuo.

A discharged mechanosynthetic tool for positional diamond mechanosynthesis is a further embodiment of the invention. The discharged tool comprises a tooltip molecule and a handle. The tooltip molecule of the discharged tool has a tip end and a nucleation-site, handle end distal to the tip end, the tooltip molecule comprising one or more adamantane molecules arranged in a polymantane or lonsdaleite configuration to form a base molecule, the base molecule having at least one carbon of the base molecule substituted with a dimerholder atom X, wherein dimerholder atom X comprises a Group III element, a Group IV element other than carbon, or a Group V element, to form a tip end of the tooltip molecule. The handle of the discharged tool comprises a diamond shard having an apical tip C(110) crystal face covalently bonded to the nucleation-site, handle end of the tooltip molecule; or a diamond crystal, rod, or cone having a base and an apex distal to the base, wherein the base has a diameter such that the base is grippable by a microscale manipulator device, and wherein the apex is covalently bonded to the nucleation-site, handle end of the tooltip molecule. The discharged tool is held in vacuo.

A process for manufacture of a positional diamond mechanosynthesis tool is an embodiment of the invention, the process comprising obtaining a capped tooltip molecule as described supra; covalently attaching the tooltip molecule to a deposition surface material in a tip-down orientation, thereby removing the cap and forming a surface material-bound tooltip molecule, wherein the deposition surface material is as described supra; and covalently attaching in vacuo a handle to the tooltip molecule to form a mechanosynthesis tool, wherein the handle is as described supra. Attaching a handle comprises attaching a diamond shard having an apical tip C(110) crystal face for covalently bonding to the nucleation-site, handle end of the tooltip molecule; or growing a handle by bulk diamond deposition onto the surface material-bound tooltip molecule wherein deposition occurs preferentially onto the nucleation-site, handle end of the tooltip molecule to form a diamond crystal, rod, or cone handle having a base and an apex distal to the base, wherein the base has a diameter such that the base is grippable by a microscale manipulator device, and wherein the apex is covalently bonded to the nucleation-site, handle end of the tooltip molecule.

In the process of manufacture, attaching the tooltip molecule to a deposition surface material in a tip-down orientation comprises ion bombardment in vacuo, non-impact dispersal and surface decapping in vacuo, or solution-phase chemical synthesis.

In the process of manufacture, ion bombardment in vacuo comprises supplying the capped tooltip molecule to an ionization source; heating the capped tooltip molecule in a vacuum chamber to provide a capped tooltip molecule vapor; ionizing the capped tooltip molecule vapor by laser ablation, electron bombardment, electron attachment, or photoionization to form capped tooltip molecule ions; electrostatically accelerating the capped tooltip molecule ions to form an ion beam; and directing the ion beam in a scanning pattern across the deposition surface material in vacuo thereby releasing the capping group and producing dangling bonds at the $C_2$ dimer that provide for insertion of the dimer into the deposition material surface.

In the process of manufacture, non-impact dispersal and surface decapping in vacuo comprises bonding the tooltip molecule to the deposition surface material in the desired orientation by non-impact dispersal and weak physisorption on the deposition surface material by spin coating, dip coating, spray coating, or laser irradiation; and decapping the tooltip molecule using targeted energy input to produce dangling bonds at the C2 dimer that provide for insertion of the dimer into the surface material. A hydrogen absorber or a cap ion absorber in vacuo may be included during the decapping.

In the process of manufacture, the solution-phase chemical synthesis comprises functionalizing the deposition surface to form a functionalized surface; and reacting the functionalized surface with the capped tooltip molecule to form a covalent bond between the tooltip molecule carbon dimer and the deposition surface, thereby releasing the cap and the functional group.

In the process of manufacture, attaching a handle by direct bonding of a diamond shard having an apical tip C(110) crystal face to the nucleation-site, handle end of the tooltip molecule comprises: mounting a diamond shard as a working tip of an atomic force microscope to expose a C(110) crystal face, the diamond shard having a diameter grippable by a microscale manipulator device; dehydrogenating the diamond shard to form a depassivated diamond shard tip; and binding the depassivated diamond shard tip to the nucleation-site, handle end of the tooltip molecule to form a handle bound to the tooltip molecule and having a diameter grippable by a microscale manipulator device.

The process of manufacture may further comprise baking in vacuo, mechanically separating the mechanosynthesis tool from the deposition surface, or shaping or machining the mechanosynthesis tool.

A further embodiment of the invention is a process of depositing a carbon dimer onto a diamond substrate having a dehydrogenated C(110) surface, the process comprising contacting the charged mechanosynthetic tool described supra and the dehydrogenated C(110) surface of the diamond substrate; and mechanically separating the mechanosynthesis tool from the workpiece thereby depositing the carbon dimer onto the workpiece.

A process of charging a discharged mechanosynthetic tool described supra is an embodiment of the invention. The process comprises contacting the discharged mechanosynthetic tool and acetylene to form a charged tool, wherein the discharged mechanosynthetic tool is positionally restrained in vacuo; and abstracting hydrogen atoms from the charged tool to form a dimerized tool.

DETAILED DESCRIPTION OF THE DRAWINGS

For a more complete understanding of the present invention, reference is made to the following descriptions taken in conjunction with the accompanying drawings.

FIG. 1. Mechanosynthesis of a single silicon atom on a silicon Si(111)-(7×7) surface (*Phys. Rev. Lett.* 90, 176102, 2003).

Figure 2A:
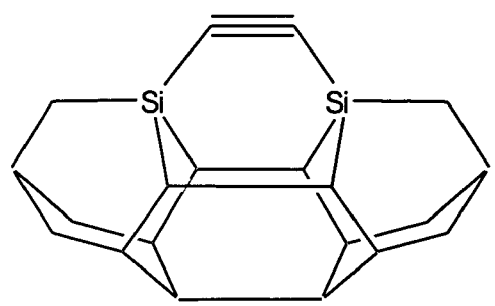
Figure 2B:
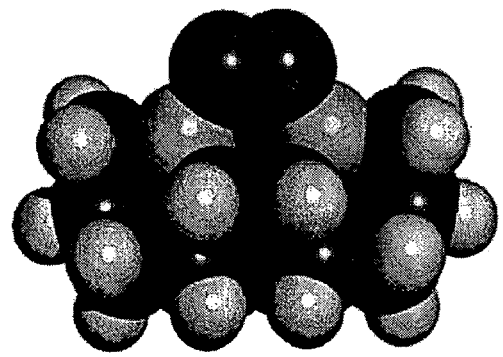
Figure 2C:
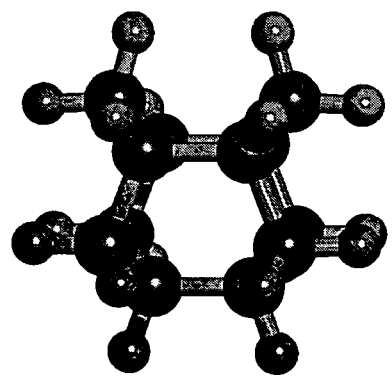

FIG. 2A-FIG. 2C. DCB6—Si dimer placement tooltip molecule [36]. FIG. 2A. Wire frame view of tooltip molecule. FIG. 2B. Overlapping spheres view of FIG. 2A. FIG. 2C. Iceane.

FIG. 3A-FIG. 3B. DCB6-Ge tooltip molecule: FIG. 3A, uncapped; FIG. 3B, capped with iodine atoms.

FIG. 4A-FIG. 4C. Progressive stages of "tip-on-tip" dimerization of capped tooltip molecules. FIG. 4A, undimerized; FIG. 4B, dimerized with one bond; FIG. 4C, dimerized with two bonds.

FIG. 5A-FIG. 5C. Progressive stages of "tip-on-base" recombination of capped tooltip molecules. FIG. 5A, unrecombined; FIG. 5B, one bond recombination; FIG. 5C, two bond recombination.

FIG. 6A-FIG. 6D. Progressive stages of possible sidebonding recombination reaction between an iodine-capped DCB6-Ge tooltip molecule and a molecule of n-octane. FIG. 6A, unrecombined tooltip molecule (top) and n-octane (bottom); FIG. 6B, 1-bond recombination; FIG. 6C, 2-bond recombination forming a 4-carbon ring; FIG. 6D, 2-bond recombination forming a 6-carbon ring.

Figures 7A, 7B:
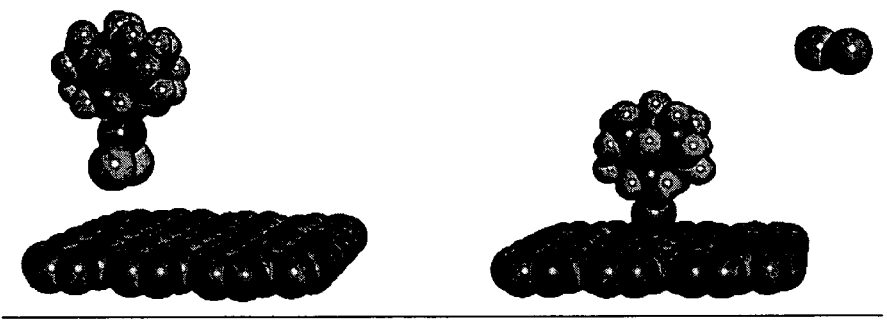
Figures 7C, 7D, 7E:
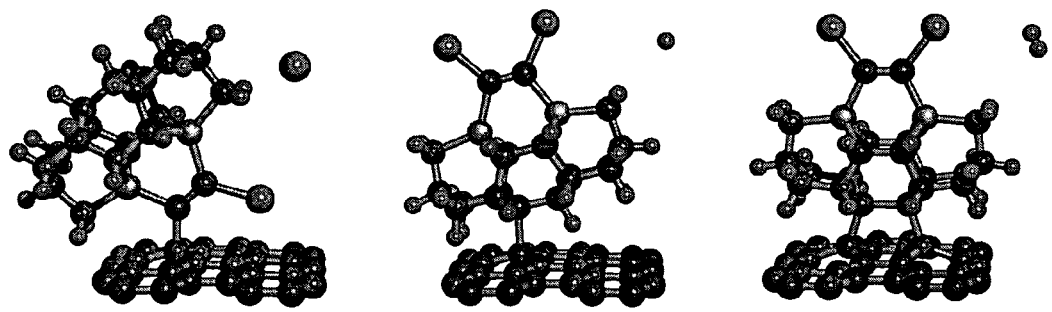

FIG. 7A-FIG. 7E. Schematic of iodine-capped DCB6-Ge tooltip molecule. FIG. 7A, DCB6-Ge impacting 3×3 unit-cell graphite surface in desired orientation; FIG. 7B, DCB6-Ge bonding to surface and releasing capping group as an $I_2$ molecule, or alternatively, FIG. 7C, bonding to surface with only one bond through the C2 dimer with release of one I atom; FIG. 7D, one bond to surface through tooltip molecule base with release of one H atom, or FIG. 7E, two bonds to surface through tooltip molecule base with release of one $H_2$ molecule.

Figures 8A, 8B, 8C:
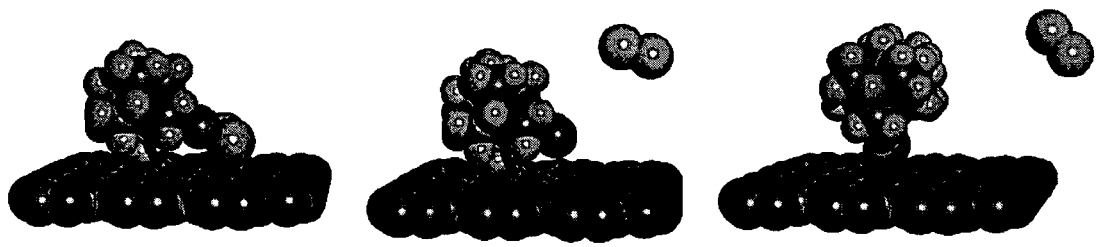

FIG. 8A-FIG. 8C. Schematic of iodine-capped DCB6-Ge tooltip molecule. FIG. 8A, dispersed on 3×3 unit-cell graphite surface in desired orientation; FIG. 8B, absorbing targeted energy sufficient to decap the tooltip molecule in vacuo, releasing the capping group as two iodine ions or as an $I_2$ molecule, and FIG. 8C, bonding to the deposition surface.

Figure 9:
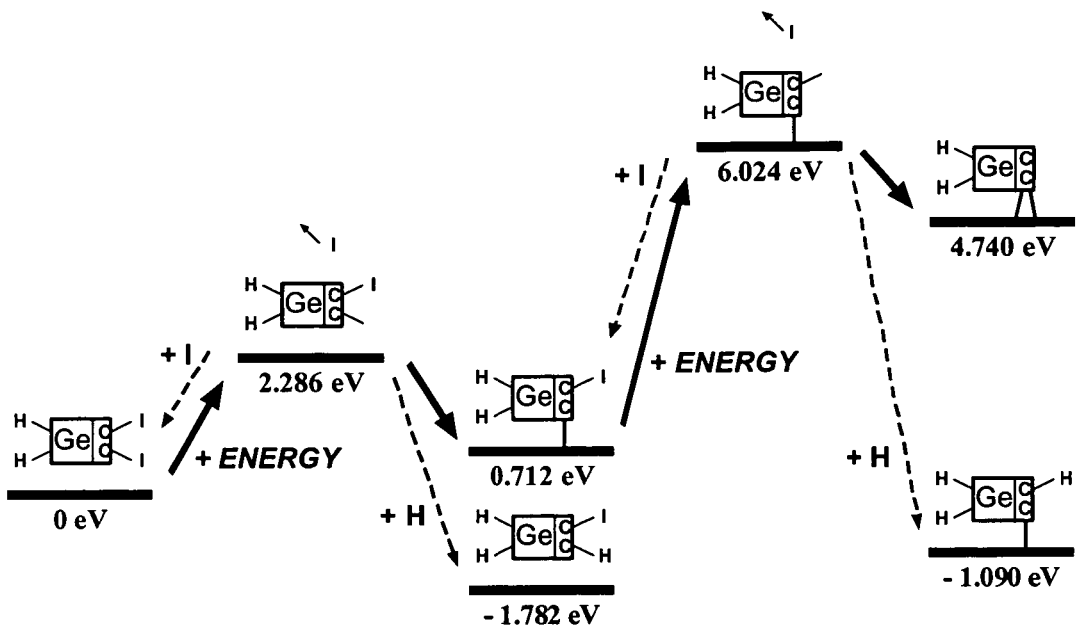

FIG. 9. Estimated energetics of the iodine-capped DCB6-Ge tooltip molecule decapping process on 3×3 unit-cell graphite surface, using semi-empirical AM1.

Figure 10:
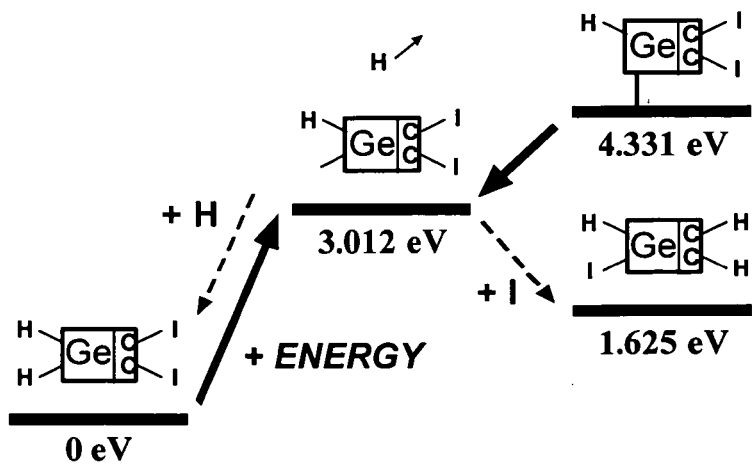

FIG. 10. Estimated energetics of a dehydrogenation of the base of the iodine-capped DCB6-Ge tooltip molecule during the decapping process on 3×3 unit-cell graphite surface, using semi-empirical AM1 (0 eV=lowest-energy configuration), for a tooltip molecule having no bonds to the surface (at bottom left).

Figure 11:
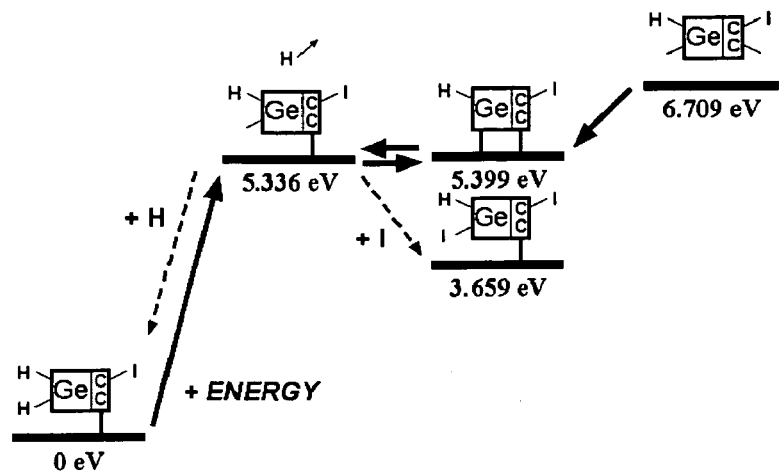

FIG. 11. Estimated energetics of a dehydrogenation of the base of the iodine-capped DCB6-Ge tooltip molecule during the decapping process on 3×3 unit-cell graphite surface, using semi-empirical AM1, for a tooltip molecule with one bond to the surface (at bottom left).

Figure 12:
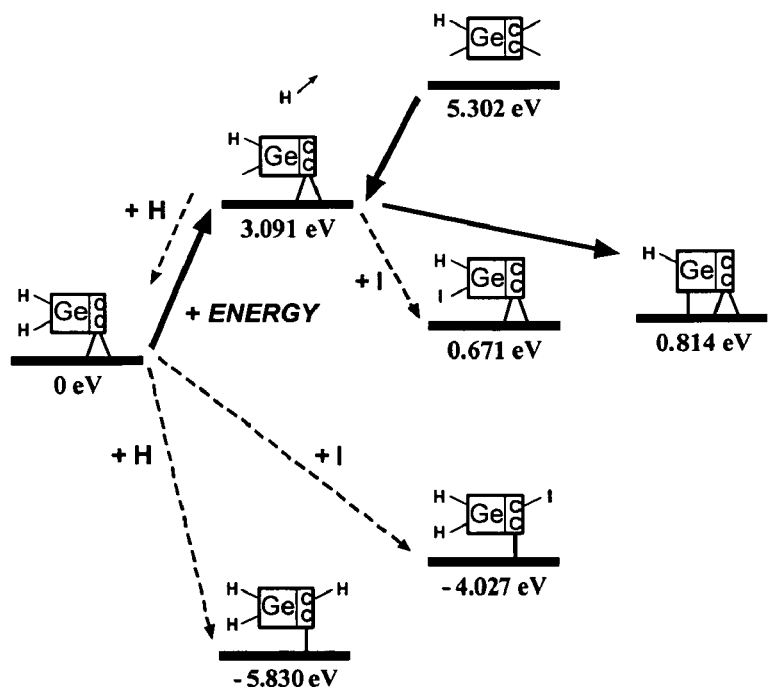

FIG. 12. Estimated energetics of a dehydrogenation of the base of the iodine-capped DCB6-Ge tooltip molecule during the decapping process on 3×3 unit-cell graphite surface, using semi-empirical AM1, for a tooltip molecule with two bonds to the surface (at left).

FIG. 13. Attachment of a tooltip molecule to a graphene deposition surface via solution phase combination of capping group and surface functionalization group. FIG. 13A, a section of (10,0) single-walled carbon nanotube (CNT) with a functional group "X" attached at the para-isomer positions (1 and 4) in one of the 6-carbon rings in the graphene surface; a capped tooltip is shown above this surface; FIG. 13B, the tooltip molecule chemically bound to the deposition surface across two bonds at the carbon $C_2$ dimer; FIG. 13C, bicyclooctene; FIG. 13D, triptycene; FIG. 13E and FIG. 13F, Possible cycloaddition reaction of ortho-benzyne molecules to the graphene walls of carbon nanotubes.

Figure 14:

FIG. 14. Multiply twinned diamond crystal growth during hot-filament assisted CVD. Photos courtesy of John C. Angus, Case Western Reserve University [174].

Figure 15:
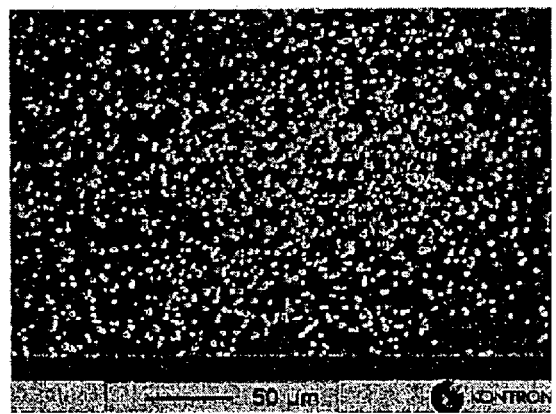

FIG. 15. SEM photograph of uniform 2-micron diamond crystals grown by MPCVD using surface-tethered single-cage adamantane molecules as nucleation seeds on a Si(111) surface; image courtesy of Luc Giraud [163].

Figure 16A:
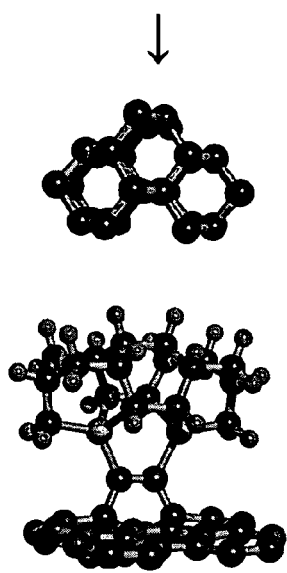
Figure 16B:
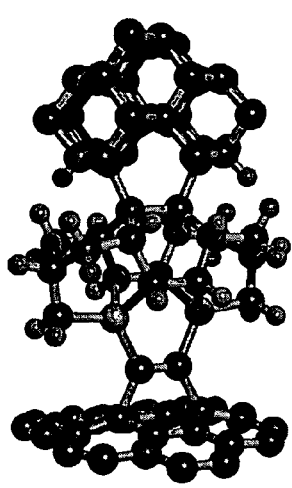
Figure 16C:
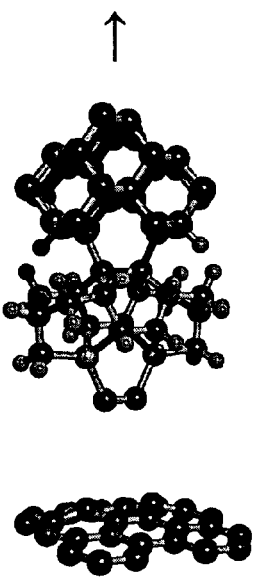

FIG. 16. Extraction of surface-bound tooltip molecule via bonding to vertically inserted and retracted dehydrogenated diamond C(110) probe manipulated via SPM. FIG. 16A, lower; FIG. 16B, bind; FIG. 16C, retract.

Figure 17A:
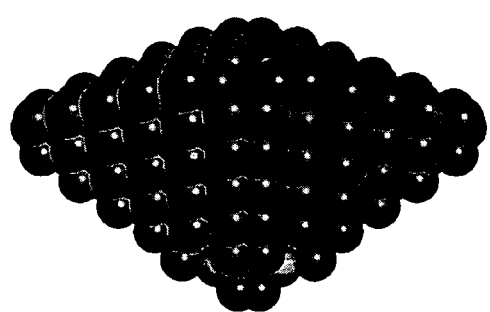
Figure 17B:
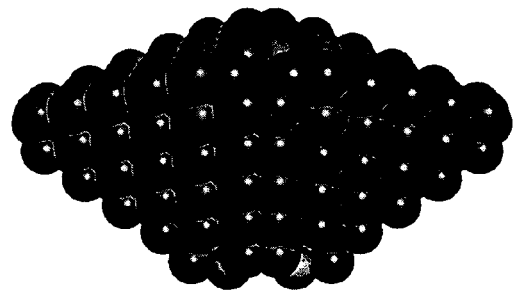

FIG. 17. Idealized mechanosynthetic tool handle structure (passivating hydrogen atoms not shown). FIG. 17A, active $C_2$ dimer bound on tip; FIG. 17B, $C_2$ dimer discharged from tip.

FIG. 18A-FIG. 18B. 1-dimer structure around global minimum GM1 (FIG. 18A) on bare diamond C(110), top view and two side views. 1-dimer structure around local minimum LM1 (FIG. 18B) on bare diamond C(110), top view and two side views.

Figure 19:
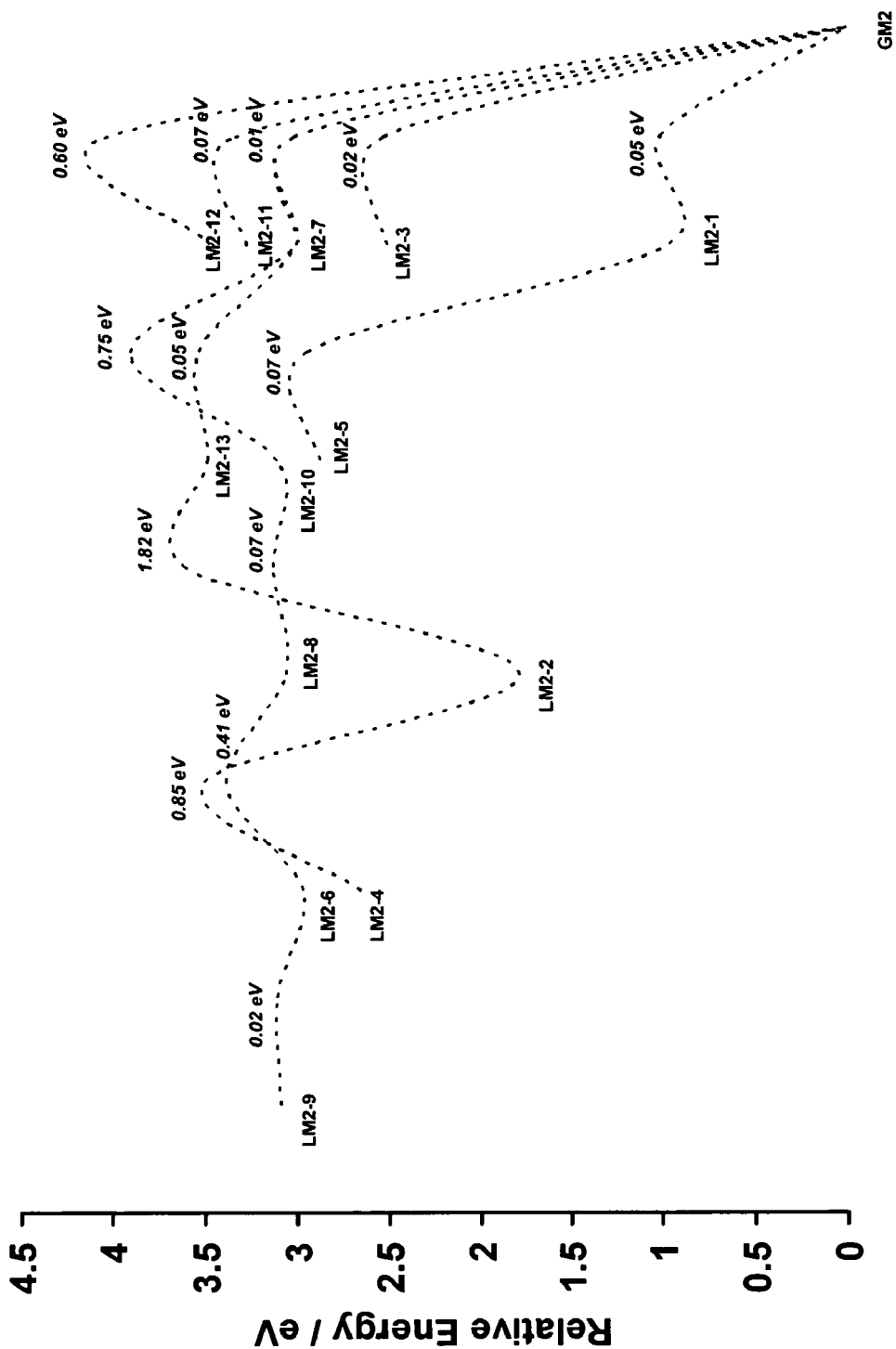

FIG. 19. Potential energy diagram for 2-dimer stationary points formed around GM1 on bare diamond C(110).

FIG. 20A-FIG. 20F. 2-dimer structures around global minimum GM2 (FIG. 20A) on bare diamond C(110), top view and two side views. 2-dimer structures around local minima LM2-2, LM2-4, LM2-6, LM2-8, LM2-12 (FIG. 20B-FIG. 20F, respectively) on bare diamond C(110), top view and two side views.

Figure 21:
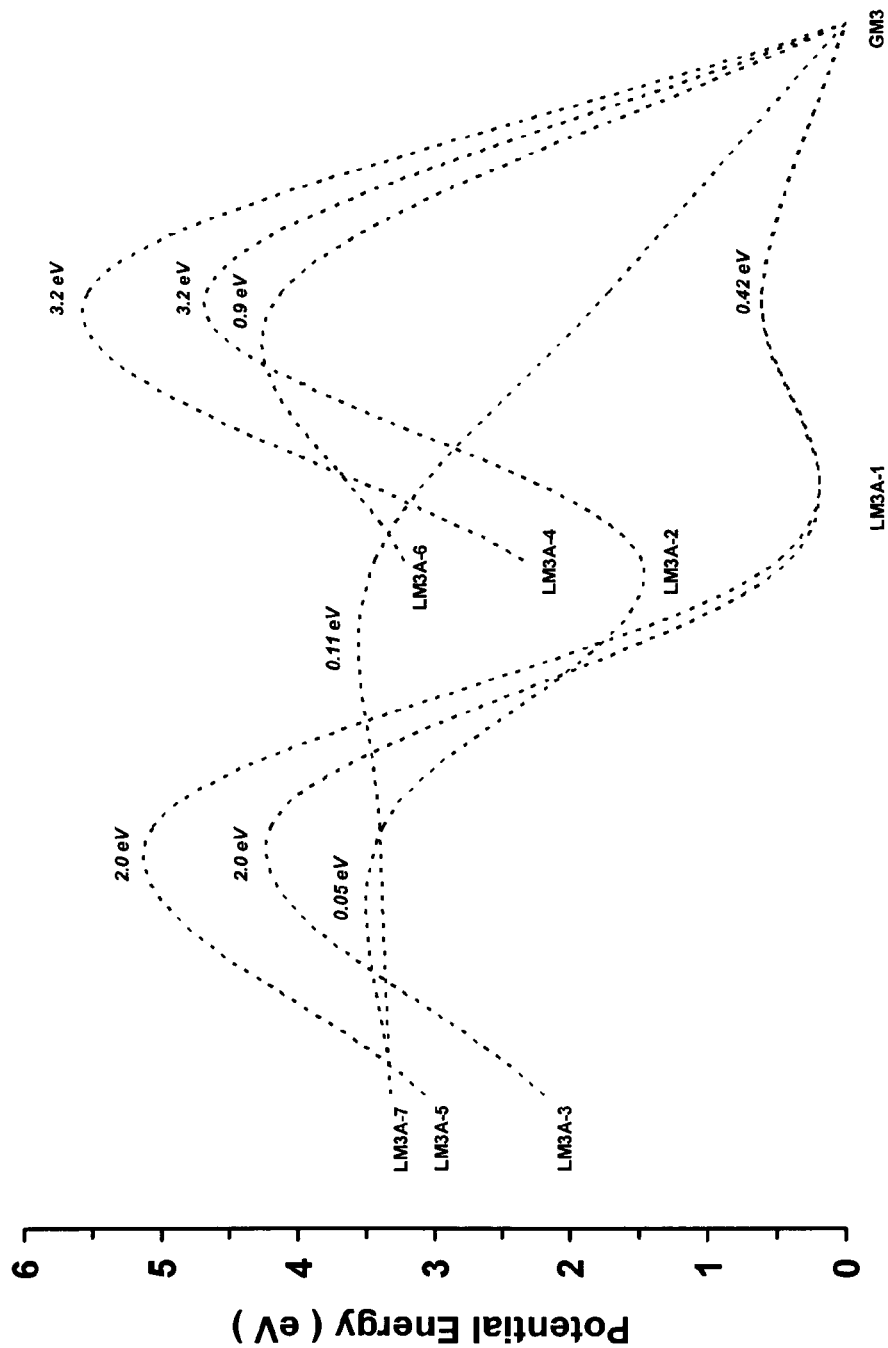

FIG. 21. Potential energy diagram for 3-dimer stationary points formed around GM2 on bare diamond C(110).

FIG. 22A-FIG. 22H. 3-dimer structures around global minimum GM3 (FIG. 22A) on bare diamond C(110), top view and two side views. 3-dimer structures around local minima LM3A-1, LM3A-2, LM3A-3, LM3A-4, LM3A-5, LM3A-6, LM3A-7 (FIG. 22B-FIG. 22H, respectively) on bare diamond C(110), top view and two side views.

Figure 23:
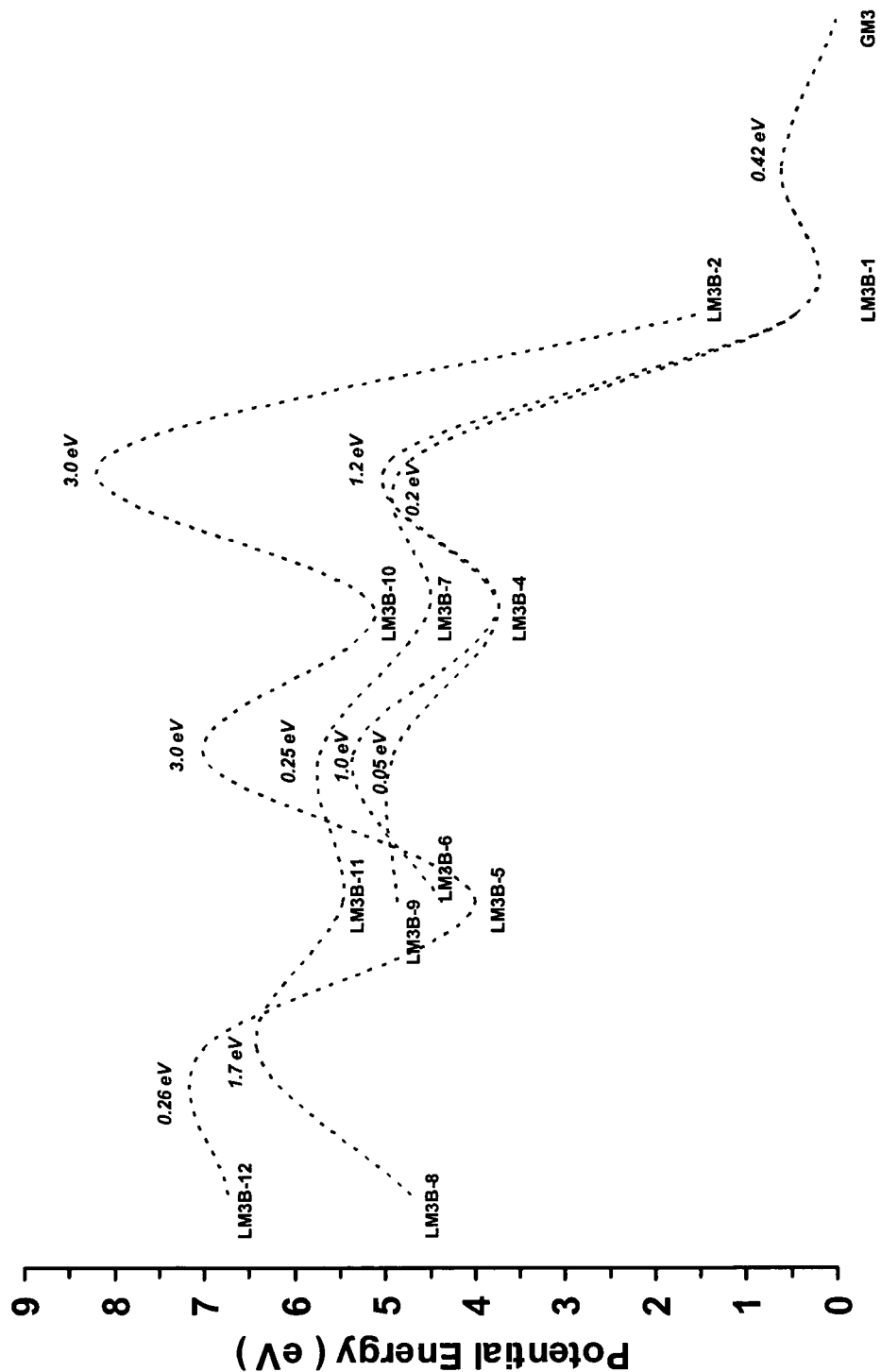

FIG. 23. Potential energy diagram for 3-dimer stationary points formed around LM2-4 on bare diamond C(110).

FIG. 24A-FIG. 24H. 3-dimer structures around local minimum LM2-4: LM3B-1, LM3B-2, LM3B-4, LM3B-5, LM3B-6, LM3B-8, LM3B-10, LM3B-12 (FIG. 24A-FIG. 24H, respectively) on bare diamond C(110), top view and two side views.

Figure 25:
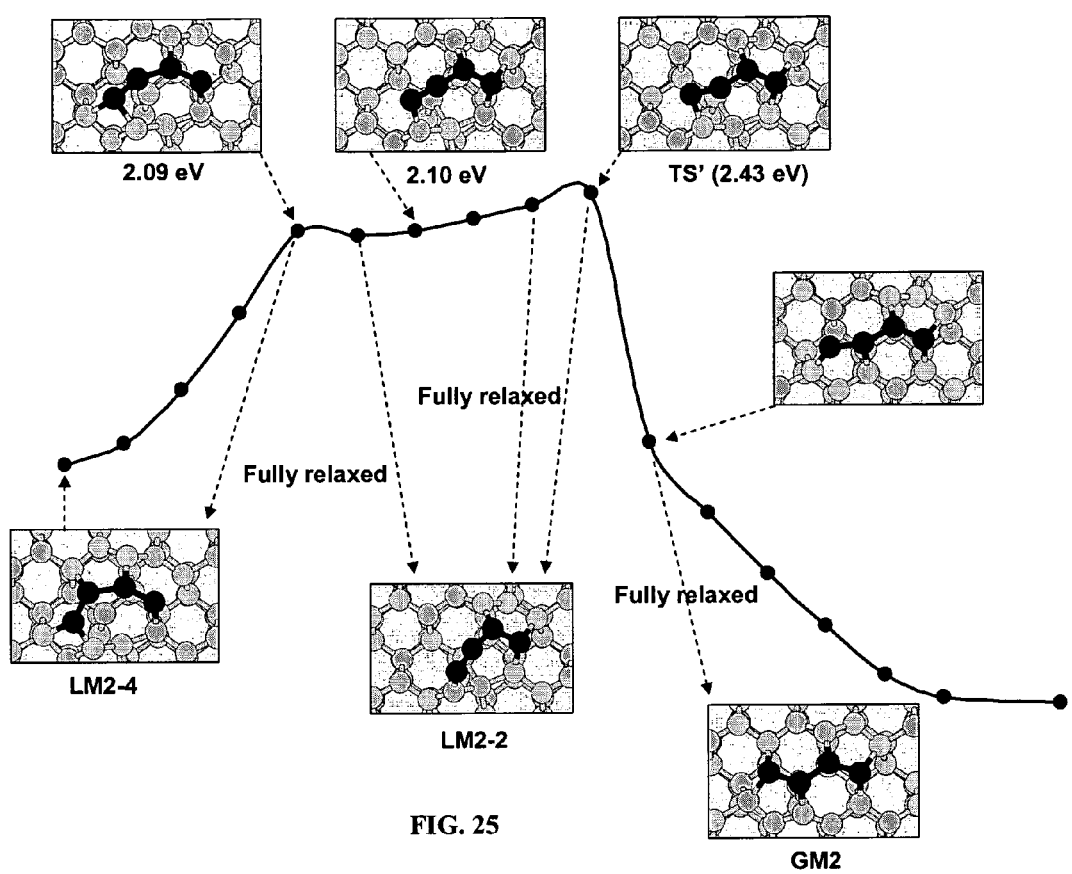

FIG. 25. Scanned potential curve simulating the positional placement of a $C_2$ on bare diamond C(110), showing path through transition state (TS') to defect structure LM2-4.

Figure 26:
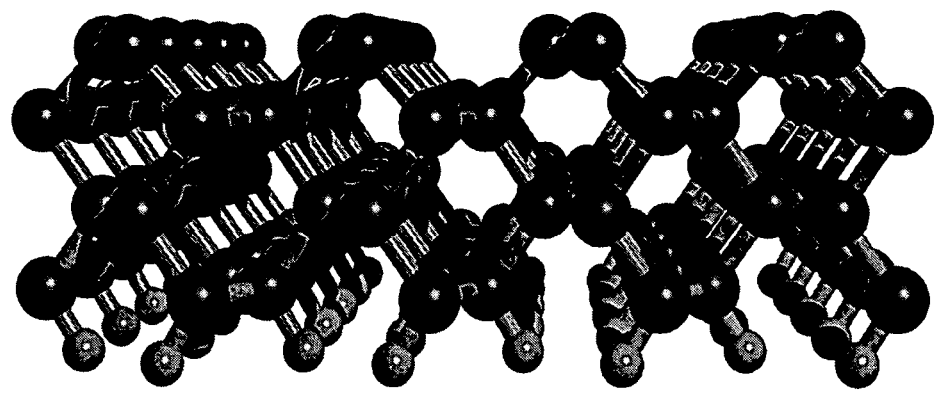

FIG. 26. Structure of the periodic diamond C(110) surface model.

Figure 27A:
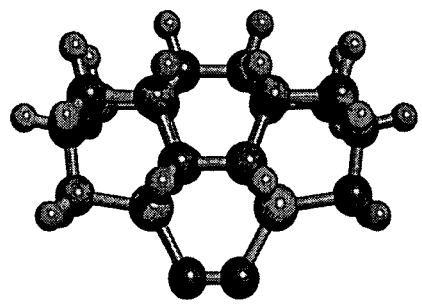
Figure 27B:
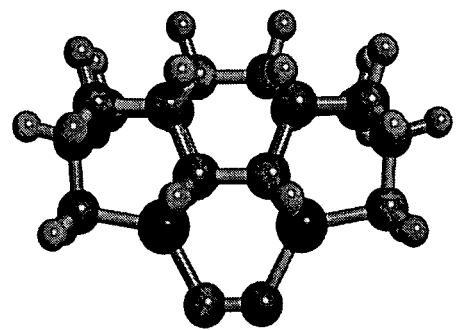

FIG. 27A-FIG. 27B. Density Functional Theory/Generalized Gradient Approximation optimized structures of the Si-triadamantane (FIG. 27A) and Ge-triadamantane molecules (FIG. 27B), each containing a carbon dimer attached at the terminal end.

Figure 28:
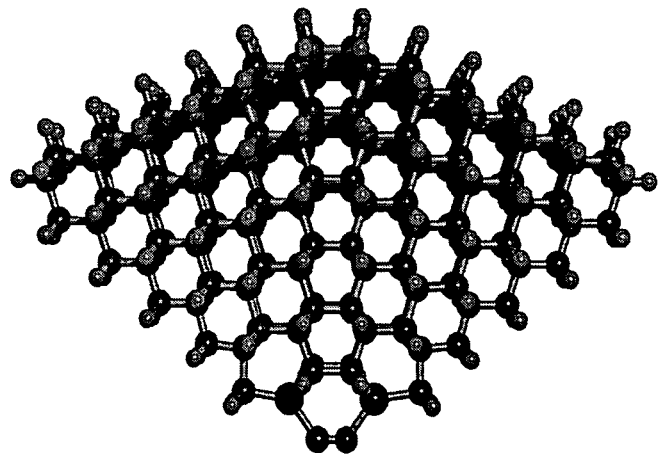

FIG. 28. Extended Ge-triadamantane dimer placement tool for diamond mechanosynthesis.

FIG. 29A-FIG. 29B. Density Functional Theory/Generalized Gradient Approximation optimized structures of the dimerized Si-triadamantane (FIG. 29A) and Ge-triadamantane molecules (FIG. 29B).

FIG. 30. Reaction path potential energy for dimerization of the Si-triadamantane and Ge-triadamantane molecules.

FIG. 31A-FIG. 31C. Structures of reactants (FIG. 31A), transition state (FIG. 31B), and products (FIG. 31C) of intermolecular dehydrogenation of Ge-triadamantane molecules.

FIG. 32. Potential energy along the reaction coordinate for the intermolecular dehydrogenation of Ge-triadamantane.

Figure 33:
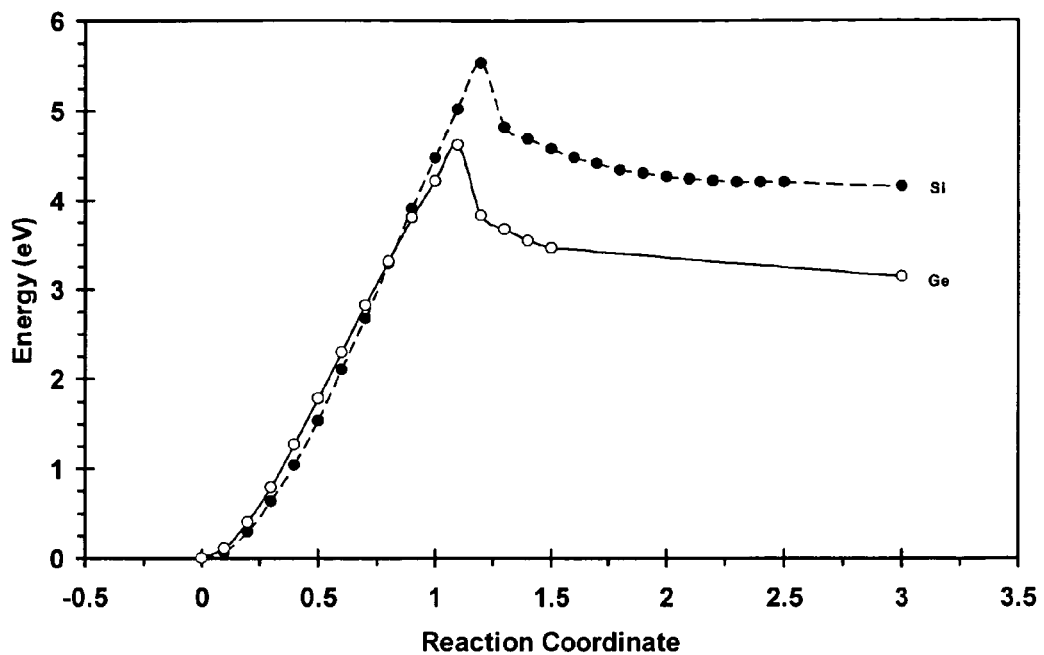

FIG. 33. Reaction path potential for acetylene addition to Si- and Ge-triadamantane.

Figure 34:
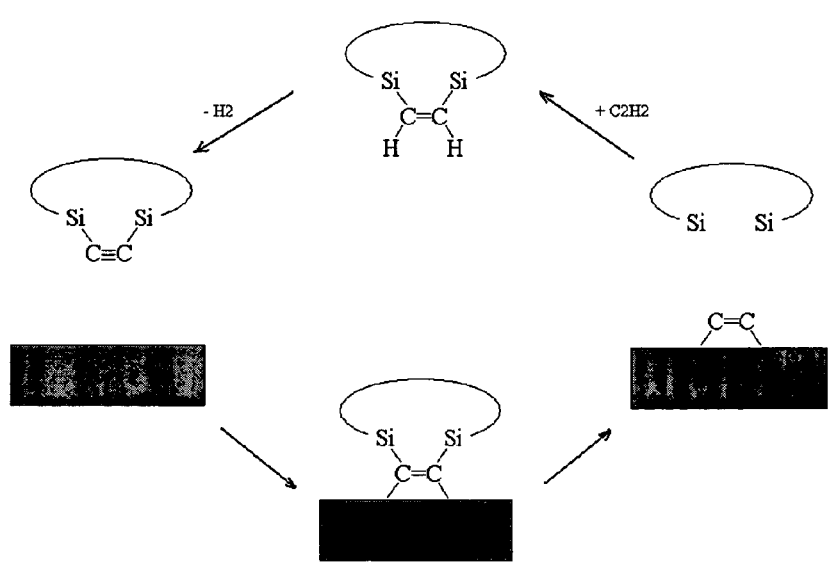

FIG. 34. One scheme for a cycle of dimer-mediated diamond mechanosynthesis. The first step (left) involves approach of the dimerized tool tip to the diamond surface leading to a tool+substrate complex (bottom). The next step involves retraction of the tool tip leaving behind a deposited carbon dimer (right). The tool is then "recharged" with acetylene (top) followed by a dehydrogenation step that ultimately leads to a re-dimerized tool (left), allowing the cycle to be repeated.

Figure 35A:
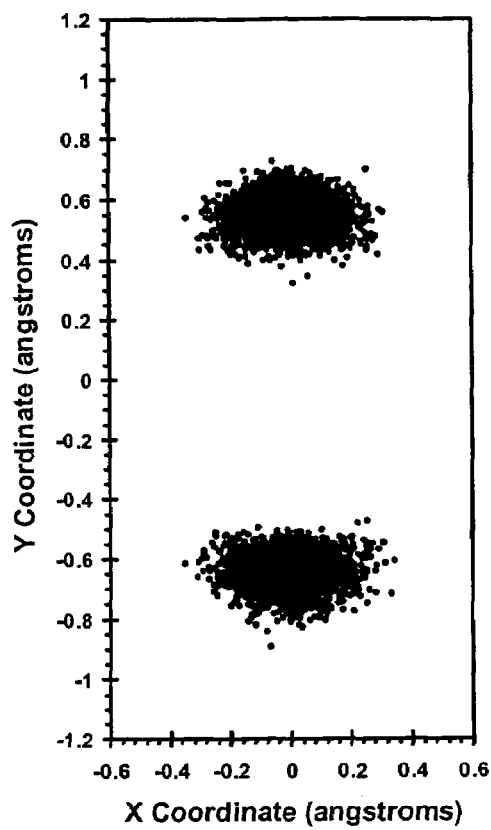
Figure 35B:
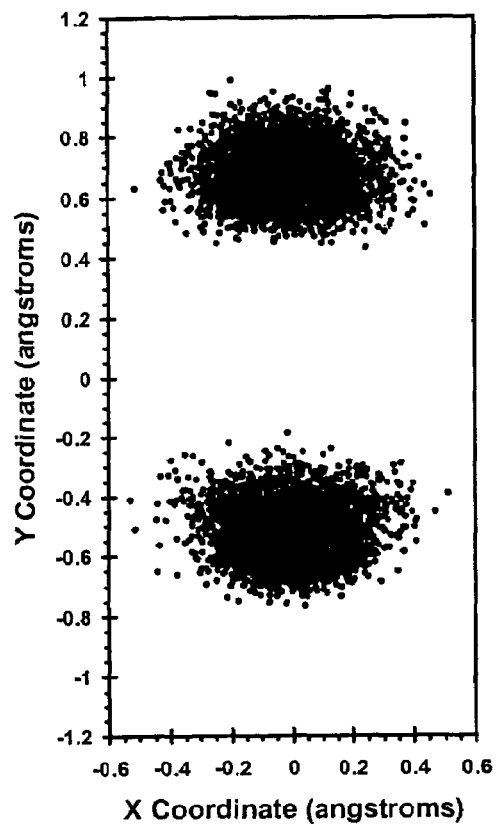

FIG. 35A-FIG. 35B. Plots of the dimer carbon atom coordinates for the Si (FIG. 35A)/Ge (FIG. 35B)-*triadamantane* molecule covalently bonded to the extended dimer placement tool structure.

Figure 36A:
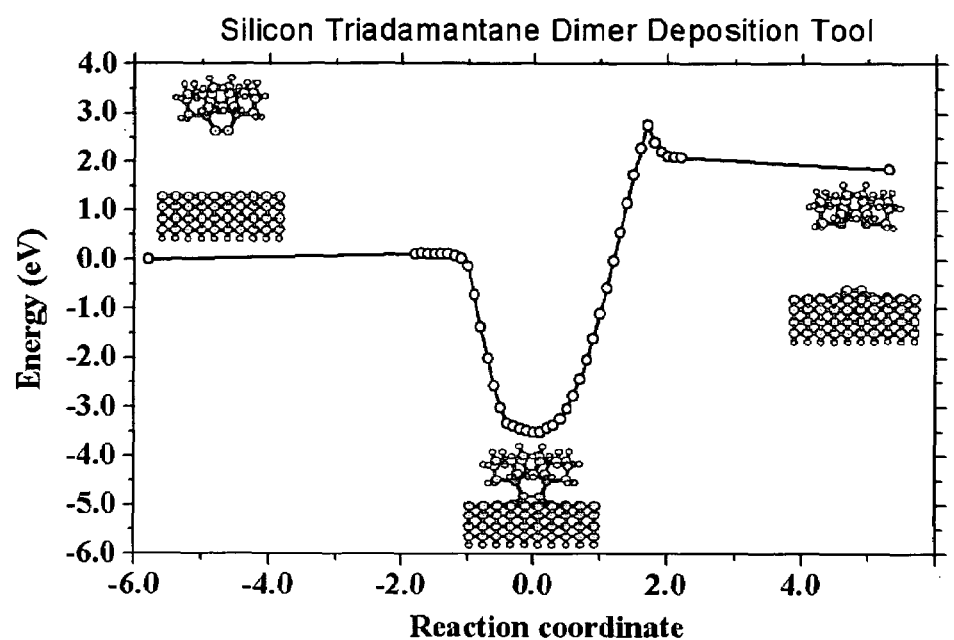
Figure 36B:
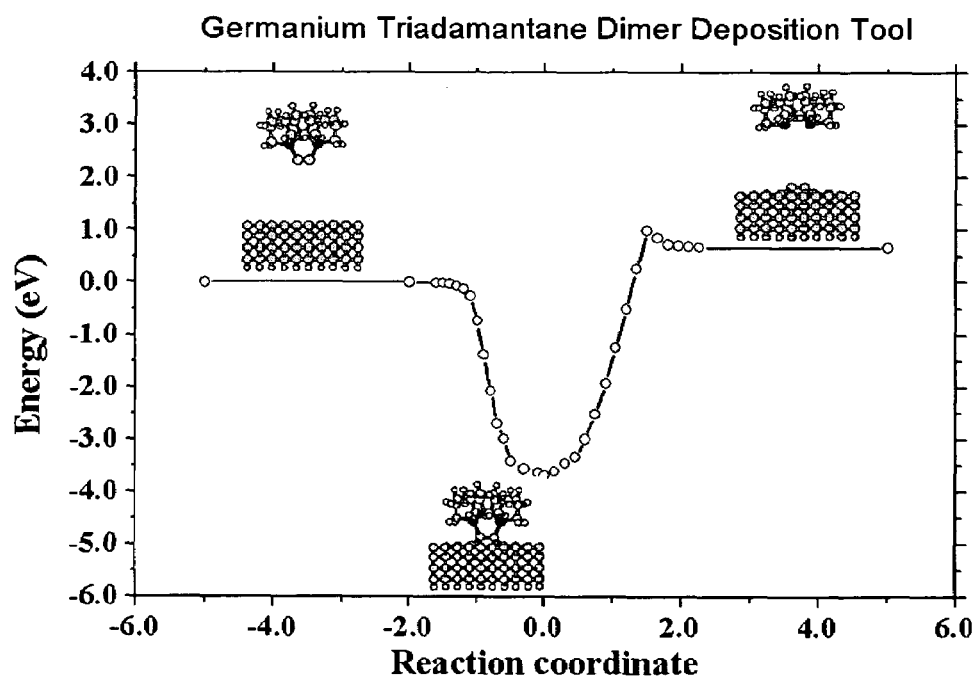

FIG. 36A-FIG. 36B. Reaction path potential energy plots for adsorption and retraction of the Si-triadamantane tool (FIG. 36A) and the Ge-triadamantane tool (FIG. 36B).

2. DESCRIPTION OF THE INVENTION

The present invention is concerned with the physical structure and method of manufacture of a complete tool for positional diamond mechanosynthesis, which can subsequently be employed in the mechanosynthetic manufacture of other molecularly precise diamond structures, including other tools for positional diamond mechanosynthesis.

The present invention is the first description of a complete tool for positional diamond mechanosynthesis, along with its method of manufacture. The subject mechanosynthetic tool is constructed using only bulk chemical and mechanical processes, and yet, once fabricated, is capable of molecularly precise carbon dimer deposition to produce molecularly precise diamond structures. The present invention provides a tool by which the trajectory and timing of each new carbon atom added to a growing diamond nanostructure can be precisely controlled, thus allowing the manufacture of molecularly precise three-dimensional diamond structures of specified size, shape, orientation, location, and chemical composition, a significant improvement over all known bulk methods for fabricating synthetic diamond and a significant improvement over all existing mechanosynthetic SPM tips or styluses.

The positional diamond mechanosynthesis tool described herein enables the convenient manufacture of large numbers and varieties of diamond mechanosynthesis tools of similar or improved types, and also enables the convenient manufacture of a wide variety of molecularly precise nanoscale, microscale, and other diamond structures that cannot be fabricated by any known bulk process, including, but not limited to, molecularly-sharp scanning probe tips, shaped nanopores and custom binding sites, complex nanosensors, interleaved nanomechanical structures, compact mechanical nanocomputer components, nanoelectronic and quantum computational devices, aperiodically nanostructured optical materials, and many other complex nanodevices, nanomachines, and nanorobots. The tool can also be used in the fabrication of additional tools for the positional mechanosynthetic manufacture of molecularly precise structures made of materials other than diamond, employing either carbon (e.g., nanotubes and other graphene sheet structures) or carbon together with elements other than carbon, such as nanostructured nondiamond hydrocarbons, nanostructured fluorocarbons, nanostructured sapphire/alumina, and even DNA and other organic polymeric materials.

The positional diamond mechanosynthesis tool comprises two parts that are preferably covalently joined.

The first part of the positional diamond mechanosynthesis tool is the tooltip molecule (FIG. 2). In a preferred embodiment, the tooltip molecule consists of one or more adamantane molecules arranged in a polymantane or lonsdaleite (iceane; FIG. 2C) configuration making a triadamantane base molecule. One or more dimerholder atoms (most preferably the Group IV elements Si, Ge, Sn, and Pb with three bonds into the base, but Group V elements N, P, As, Sb and Bi and Group III elements B, Al, Ga, In, and Tl with two bonds into the base may also be used [36]) are substituted into each of the adamantane molecules composing the triadamantane base molecule. A carbon of the base molecule that is substituted with a dimerholder atom is referred to as a "bridgehead" carbon to indicate that that carbon lies at the junction of two rings. A single carbon dimer ($C_2$) molecule is bonded to two dimerholder atoms integral to the triadamantane base molecule; the carbon dimer is held by the tooltip but is later mechanically released during a mechanosynthetic dimer placement operation. Finally, a capping group is temporarily bonded to the two dangling bonds of the carbon dimer, passivating the dangling bonds and chemically stabilizing the tooltip molecule for a solution-phase environment. The capping group must be removed from the tooltip, exposing the dimer dangling bonds and activating the tooltip molecule, prior to use in a diamond mechanosynthesis operation.

The second part of the positional diamond mechanosynthesis tool is the handle structure (e.g., FIG. 17). The handle structure may be a large rigid molecule, which in a preferred embodiment is a regular crystal, rod, or cone, of pure hydrogen-terminated diamond, thus providing the greatest possible mechanical rigidity and thermal stability. At the base of the handle, the handle structure is sufficiently wide (for example, 0.1-10 microns in diameter) to be securely grasped by, or bonded to, a conventional SPM tip, a MEMS robotic end-effector, or other similarly rigid and well-controlled microscale manipulator device. Near the apex of the handle structure, the tooltip molecule is covalently bonded to the handle structure, forming an intimate and permanent connection thereto. The tooltip molecule is oriented coaxially with the handle structure, with the carbon dimer (whether capped or uncapped) of the tooltip molecule occupying the location most distal from the base of the handle structure, just as the writing tip of a sharpened pencil is most distal from the pencil eraser end.

The manufacture of the complete positional diamond mechanosynthesis tool comprises four processes, including (1) synthesis of capped tooltip molecule (Section 2.1), (2) attachment of tooltip molecule to deposition surface in a preferred orientation (Section 2.2), (3) attaching handle structures onto the tooltip molecules (Section 2.3), and finally (4) separating the finished tools from the deposition surface (Section 2.4). The concept of seeded growth of a useful nanoscale tool has previously been employed in the CVD growth of carbon nanotube tips for AFM [50-52].

2.1 Step 1: Synthesis of Capped Tooltip Molecule

STEP 1. Synthesize the triadamantane tooltip molecule, with its active $C_2$ dimer tip appropriately capped, using methods of bulk chemical synthesis derived from known synthesis pathways for functionalized polyadamantanes as found in the existing chemical literature. In a preferred embodiment, synthesis of the triadamantane tooltip molecule and placement of a capping group on the active $C_2$ dimer tip of the tooltip molecule occurs simultaneously, in solution, using conventional bulk chemical synthesis techniques.

Investigations performed to date on sila-adamantanes [53-55] and synthesis of multiply-substituted adamantanes such as 1,3,5,7-tetramethyl-tetrasilaadamantane [53, 56] and other 1,3,5,7-tetrasilaadamantanes [57] provide useful background for the synthesis of a DCB6-X (X=Si, Ge, Sn, Pb) capped tooltip molecule according to the present embodiments. For example, adamantanes are readily functionalized with alkene C=C bonds, e.g., 2,2-divinyladamantane, a colorless liquid at room temperature [161]. Polymantanes as a class of molecules can be functionalized [58, 60] and assembled to a limited extent, including biadamantanes [63], diadamantanes [64-66] and diamantanes [67], triamantanes [68, 69], and tetramantanes [70, 71]. The Beilstein database lists over 20,000 adamantane variants and there are several excellent literature reviews of adamantane chemistry [59-63]. The molecular geometries of diamantane, triamantane, and isotetramantane have been investigated theoretically using molecular mechanics, semiempirical and ab initio approaches [72]. The core of the DCB6-X (X=Si, Ge, Sn, Pb) class of adamantane-based tooltip molecules is a single iceane molecule (FIG. 2C), the smallest unit cell of lonsdaleite or hexagonal diamond (the counterpart to adamantane which is the unit cell for the more common cubic diamond lattice). The iceane molecule was first synthesized experimentally in 1974 [73-75] and more recently has been studied using the customary methods of computational chemistry [77-80]; commercial sources for hexagonal diamond (lonsdaleite) powder already exist [76].

Although synthesis of the DCB6-X molecule is guided by the references noted above, synthesis of a capped DCB6-X molecule requires additional consideration. In particular, a decision to be made with respect to the synthesis of a tooltip molecule as described herein is the choice of capping group to be used to passivate the two dangling bonds of the $C_2$ dimer that is held by the tooltip molecule. The presence of the capping group converts the otherwise highly reactive $C_2$ dimer radical into a chemically stable moiety in solution phase for the duration of the synthesis process. Only when the capping group is later removed (Section 2.2), in vacuo, does the $C_2$ dimer resume its status as a chemically active radical. Note that for some choices of capping group it may be simpler to synthesize the capped tooltip molecule in the configuration of a double-capped single-bonded C—C dimer, then employ a subsequent process to alkenate the dimer bond to C=C which would include removing half of the capping groups.

Many possible capping groups could in principle provide electronic closed-shell termination of the $C_2$ dangling bonds, thus maximizing tooltip molecule chemical stability during conventional solution synthesis in Step 1 and during tooltip molecule attachment in Step 2 (Section 2.2). In some procedures, attachment is facilitated if the chemical structure of the capping group is highly dissimilar to the adamantane structure of the tooltip molecule, so that the capping group may be conveniently removed, e.g., by selective bond resonance excitation, during the tooltip attachment process. (Thus purely hydrocarbon-based and some other organic radicals may be problematic as capping groups.) For simplicity of analysis, ease of tooltip molecule synthesis, and ease of capping group removal, the capping group should have as few atoms as possible, all else equal. An enumeration of 400 potentially useful capping groups fulfilling the above requirements is given in Table 1. The nomenclature of (=C-cap) and (=C-cap-C=) indicates the placement of the capping group with respect to the $C_2$ dimer. It is noted that the present invention is not limited to the illustrative exemplar moieties listed in Table 1. As the number of atoms in the capping group increases, the combinatoric possibilities expand enormously.

TABLE 1

Possible capping groups for the $C_2$ dimer tooltip molecule

| Type of Capping Group | Capping Group Atoms or Multi-atom Moieties |
|---|---|
| Single-atom, single-element (=C-cap) | —H, —F, —Cl, —Br, —I<br>—Li, —Na, —K, —Rb, —Cs |
| Bridge-atoms, single-element (=C-cap-C=) | —O—, —O—O—, —S—, —S—S—, —Se—, —Se—Se—, —Te—, —Te—Te—<br>—Be—, —Be—Be—, —Mg—, —Mg—Mg—, —Ca—, —Ca—Ca—, —Sr—, —Sr—Sr—, —Ba—, —Ba—Ba— |
| Two-atom, two-element (=C-cap) | —OH  —SH  —SeH  —TeH  —BeH  —MgH  —CaH  —SrH  —BaH<br>—OF  —SF  —SeF  —TeF  —BeF  —MgF  —CaF  —SrF  —BaF<br>—OCl  —SCl  —SeCl  —TeCl  —BeCl  —MgCl  —CaCl  —SrCl  —BaCl<br>—OBr  —SBr  —SeBr  —TeBr  —BeBr  —MgBr  —CaBr  —SrBr  —BaBr<br>—OI  —SI  —SeI  —TeI  —BeI  —MgI  —CaI  —SrI  —BaI<br>—OLi  —SLi  —SeLi  —TeLi<br>—ONa  —SNa  —SeNa  —TeNa<br>—OK  —SK  —SeK  —TeK<br>—ORb  —SRb  —SeRb  —TeRb<br>—OCs  —SCs  —SeCs  —TeCs |
| Bridge-atoms, two-element (=C-cap-C=) | —NH—, —NHHN—, —PH—, —PHHP—, —AsH—, —AsHHAs—, —SbH—, —SbHHSb—, —BiH—, —BiHHBi—, —BH—, —BHHB—, —AlH—, —AlHHAl—, —GaH—, —GaHHGa—, —InH—, —InHHIn—, —TlH—, —TlHHTl—<br>—NLi—, —NLiLiN—, —PLi—, —PLiLiP—, —AsLi—, —AsLiLiAs—, —SbLi—, —SbLiLiSb—, —BiLi—, —BiLiLiBi—, —BLi—, —BLiLiB—, —AlLi—, —AlLiLiAl—, —GaLi—, —GaLiLiGa—, —InLi—, —InLiLiIn—, —TlLi—, —TlLiLiTl—<br>—NF—, —NFFN—, —PF—, —PFFP—, —AsF—, —AsFFAs—, —SbF—, —SbFFSb—, —BiF—, —BiFFBi—, —BF—, —BFFB—, —AlF—, —AlFFAl—, —GaF—, —GaFFGa—, —InF—, —InFFIn—, —TlF—, —TlFFTl—<br>—NNa—, —NNaNaN—, —PNa—, —PNaNaP—, —AsNa—, —AsNaNaAs—, —SbNa—, —SbNaNaSb—, —BiNa—, —BiNaNaBi—, —BNa—, —BNaNaB—, —AlNa—, —AlNaNaAl—, —GaNa—, —GaNaNaGa—, —InNa—, —InNaNaIn—, —TlNa—, —TlNaNaTl—<br>—NCl—, —NClClN—, —PCl—, —PClClP—, —AsCl—, —AsClClAs—, —SbCl—, —SbClClSb—, —BiCl—, —BiClClBi—, —BCl—, —BClClB—, —AlCl—, —AlClClAl—, —GaCl—, —GaClClGa—, —InCl—, —InClClIn—, —TlCl—, —TlClClTl—<br>—NK—, —NKKN—, —PK—, —PKKP—, —AsK—, —AsKKAs—, —SbK—, —SbKKSb—, —BiK—, —BiKKBi—, —BK—, —BKKB—, —AlK—, —AlKKAl—, —GaK—, —GaKKGa—, —InK—, —InKKIn—, —TlK—, —TlKKTl—<br>—NBr—, —NBrBrN—, —PBr—, —PBrBrP—, —AsBr—, —AsBrBrAs—, —SbBr—, —SbBrBrSb—, —BiBr—, —BiBrBrBi—, —BBr—, —BBrBrB—, —AlBr—, —AlBrBrAl—, —GaBr—, —GaBrBrGa—, —InBr—, —InBrBrIn—, —TlBr—, —TlBrBrTl—<br>—NRb—, —NRbRbN—, —PRb—, —PRbRbP—, —AsRb—, —AsRbRbAs—, —SbRb—, —SbRbRbSb—, —BiRb—, —BiRbRbBi—, —BRb—, —BRbRbB—, —AlRb—, —AlRbRbAl—, —GaRb—, —GaRbRbGa—, —InRb—, —InRbRbIn—, —TlRb—, —TlRbRbTl—<br>—NI—, —NIIN—, —PI—, —PIIP—, —AsI—, —AsIIAs—, —SbI—, —SbIISb—, —BiI—, —BiIIBi—, —BI—, —BIIB—, —AlI—, —AlIIAl—, —GaI—, —GaIIGa—, —InI—, —InIIIn—, —TlI—, —TlIITl—<br>—NCs—, —NCsCsN—, —PCs—, —PCsCsP—, —AsCs—, —AsCsCsAs—, —SbCs—, —SbCsCsSb—, —BiCs—, —BiCsCsBi—, —BCs—, —BCsCsB—, —AlCs—, —AlCsCsAl—, —GaCs—, —GaCsCsGa—, —InCs—, —InCsCsIn—, —TlCs—, —TlCsCsTl— |
| Three-atom, two-element (=C-cap) | —NH$_2$  —NF$_2$  —NCl$_2$  —NBr$_2$  —NI$_2$<br>—PH$_2$  —PF$_2$  —PCl$_2$  —PBr$_2$  —PI$_2$<br>—AsH$_2$  —AsF$_2$  —AsCl$_2$  —AsBr$_2$  —AsI$_2$<br>—SbH$_2$  —SbF$_2$  —SbCl$_2$  —SbBr$_2$  —SbI$_2$<br>—BiH$_2$  —BiF$_2$  —BiCl$_2$  —BiBr$_2$  —BiI$_2$<br>—NLi$_2$  —NNa$_2$  —NK$_2$  —NRb$_2$  —NCs$_2$<br>—PLi$_2$  —PNa$_2$  —PK$_2$  —PRb$_2$  —PCs$_2$<br>—AsLi$_2$  —AsNa$_2$  —AsK$_2$  —AsRb$_2$  —AsCs$_2$<br>—SbLi$_2$  —SbNa$_2$  —SbK$_2$  —SbRb$_2$  —SbCs$_2$<br>—BiLi$_2$  —BiNa$_2$  —BiK$_2$  —BiRb$_2$  —BiCs$_2$<br>—BH$_2$  —BF$_2$  —BCl$_2$  —BBr$_2$  —BI$_2$<br>—AlH$_2$  —AlF$_2$  —AlCl$_2$  —AlBr$_2$  —AlI$_2$<br>—GaH$_2$  —GaF$_2$  —GaCl$_2$  —GaBr$_2$  —GaI$_2$<br>—InH$_2$  —InF$_2$  —InCl$_2$  —InBr$_2$  —InI$_2$<br>—TlH$_2$  —TlF$_2$  —TlCl$_2$  —TlBr$_2$  —TlI$_2$<br>—BLi$_2$  —BNa$_2$  —BK$_2$  —BRb$_2$  —BCs$_2$ |

TABLE 1-continued

Possible capping groups for the $C_2$ dimer tooltip molecule

| Type of Capping Group | Capping Group Atoms or Multi-atom Moieties |
|---|---|
| | —AlLi$_2$    —AlNa$_2$    —AlK$_2$    —AlRb$_2$    —AlCs$_2$ |
| | —GaLi$_2$    —GaNa$_2$    —GaK$_2$    —GaRb$_2$    —GaCs$_2$ |
| | —InLi$_2$    —InNa$_2$    —InK$_2$    —InRb$_2$    —InCs$_2$ |
| | —TlLi$_2$    —TlNa$_2$    —TlK$_2$    —TlRb$_2$    —TlCs$_2$ |
| Organic radicals (=C-cap) | methyl (—CH$_3$), vinyl (—CH=CH$_2$), ethyl (—CH$_2$CH$_3$), etc. carboxyl (—COOH), methoxy (—OCH$_3$), etc. formyl (—CHO), acetyl (—CCH$_3$O), etc. phenyl (—C$_6$H$_5$) etc. |

The choice of capping group is determined by the desired interactions of tooltip molecules with the selected deposition surface (as described in Step 2 (Section 2.2) and Step 4 (Section 2.4)), but also by the desired interactions of tooltip molecules with themselves, e.g., during synthesis. There are at least four relevant factors to be considered in selecting a capping group.

First, from the standpoint of basic utility, a preferred capping group: (1) should be loosely bound to the dimer, thus easily released in order to uncap (and activate) the tooltip; (2) should form only a single bond with carbon; and (3) should be very simple, hence relatively easy to synthesize in a polymantane system. A few capping groups that are preferred with respect to these three factors are given in Table 2.

TABLE 2

Bonding Energies between Capping Group and Carbon or Diamond (modified from [4])

| Possible Tooltip Molecule Capping Atoms | Bond Energy to Carbon (kcal/mole) | Bond Energy to Diamond* (kcal/mole) |
|---|---|---|
| Iodine (I) | 52 | 49.5 |
| Sulfur (S) | 65 | — |
| Bromine (Br) | 68 | 63 |
| Silicon (Si) | 72 | — |
| Nitrogen (N) | 73 | — |
| Methoxy (OCH$_3$) | — | 78 |
| Chlorine (Cl) | 81 | 78.5 |
| Carbon (C) | 83 | 80 |
| Oxygen (O) | 86 | — |
| Hydroxyl (OH) | — | 90.5 |
| Hydrogen (H) | 99 | 91 |
| Fluorine (F) | 116 | 103 |

*Values given are the binding energies of tertiary carbon atoms to the capping atoms, i.e., the bonding energy between capping atoms and a carbon atom which is bound to three other carbon atoms.

Considering ease of release alone, Table 2 implies that the bond energy of iodine to carbon makes iodine a preferred capping group among those listed in Table 2. Thus, when considering ease of release alone, two iodine atoms are a preferred embodiment for a $C_2$ dimer capping group of the tooltip molecule. FIG. 3 below, right, illustrates a capped tooltip molecule with two iodine atoms as the capping group.

Second, during bulk chemical synthesis using conventional techniques in solution phase, the capped tooltip molecule should not spontaneously dimerize across the $C_2$ working tips. Dimerization can occur between two tooltip molecules across one bond or two bonds, as shown in FIG. 4. Table 3 shows the results of geometry optimization energy minimization calculations using semi-empirical AM1 for the DCB6-Ge capped tooltip molecule in various stages of "tip-on-tip" dimerization, for a variety of capping groups, in vacuo. The nomenclature in Table 3, such as (=C—O—O—C=), (=C—Be—Be—C=), etc. indicates the placement of the capping group with respect to the $C_2$ dimer. Preferred capping groups among those listed in Table 3 are those where existence of the tooltip molecule in an undimerized state is energetically favorable.

Table 3 illustrates that with no protective capping group in place, tip-to-tip dimerization is very energetically favorable. Tooltip molecule dimerization is energetically unfavorable to varying degrees for 1-atom capping groups consisting of, for example, —I, —Cl, —F, —Na, and —Li, and also for several 2-atom and 3-atom capping groups including hydroxyl (—OH), amine (—NH$_2$), oxylithyl (—OLi), oxyiodinyl (—OI), and sulfiodinyl (—SI). In the case of some 2-atom oxyl (—OF), sulfyl (—SS—, —SH, —SF), and selenyl (—SeH) capping groups, dimerization is energetically unfavorable for direct =C—C=bonds linking the two tooltip molecules but appears likely to occur if dimerization occurs through an oxygen, sulfur (e.g., =C—S—C= or =C—S—S—C=) or selenium atom in the dimerization bond(s) linking the two tooltip molecules. Single-bond dimerization of an H-capped tooltip molecule with release of H$_2$ is also energetically favorable, though double-bond dimerization for H-capped tooltips with the release of 2H$_2$ appears unfavorable.

These analyses should be repeated using ab initio techniques, and should be extended to include a calculation of activation energy barriers (which could be substantial), weak ionic forces that could lead to crystallization (in the case of capping groups containing metal or semi-metal atoms), and solvent effects, all of which could affect the results. As a limited example of one such study, Mann et al [38] found that the dimerization reaction enthalpies of uncapped DCB6—Si and DCB6-Ge tooltip molecules are −1.64 eV and −1.84 eV, but that the energy barriers to the dimerization reaction were 1.93 eV and 1.86 eV, respectively. Therefore the dimerization of uncapped DCB6—Si and DCB6-Ge tooltip molecules "is thermodynamically favored but not kinetically favored. Due to the electron correlation errors in DFT these barrier heights may be considerably overestimated, therefore both reactions may be kinetically accessible at room temperature."

TABLE 3

Energy minimization calculations for DCB6-Ge capped tooltip molecule "tip-on-tip" dimerization, using semi-empirical AM1 (0 eV = lowest-energy configuration)

| Tooltip Molecule Capping Group | Undimerized Tooltip Molecule (eV) | Lowest-E Dimerized Tooltip Mol. (1-bond) (eV) | Lowest-E Dimerized Tooltip Mol. (2-bond) (eV) |
| --- | --- | --- | --- |
| Dioxyl (=C—O—O—C=) | forms unstable cyclic peroxides (ozonides) | | |
| Diberyl (=C—Be—Be—C=) | | | |
| Be in dimerizing bond(s): | +11.256 | +5.013 | 0 |
| no Be in dimerizing bond(s): | +11.256 | +12.874 | — |
| Oxygen (=C—O—C=) | | | |
| including ozonides: | +9.214 | +7.520 | 0 |
| excluding ozonides: | +9.214 | +10.775 | +0.492 |
| O in dimerizing bond(s): | +9.214 | +7.520 | 0 |
| no O in dimerizing bond(s): | +9.214 | — | +5.466 |
| Beryllium (=C—Be—C=) | +7.293 | +2.472 | 0 |
| Sulfur (=C—S—C=) | | | |
| S in dimerizing bond(s): | +7.089 | +2.843 | 0 |
| no S in dimerizing bond(s): | +7.089 | — | +6.661 |
| Imide (=C—NH—C=) | +7.015 | +5.173 | 0 |
| Diselenyl (=C—Se—Se—C=)* | | | |
| Se in dimerizing bond(s): | +6.563 | +2.141 | +1.969 |
| no Se in dimerizing bond(s): | +6.563 | +5.870 | 0 |
| Diamine (=C—NHHN—C=) | | | |
| N in dimerizing bond(s): | +6.004 | +1.438 | 0 |
| no N in dimerizing bond(s): | +6.004 | +0.923 | +6.315 |
| Selenium (=C—Se—C=)* | | | |
| Se in dimerizing bond(s): | +6.346 | +3.565 | 0 |
| no Se in dimerizing bond(s): | +6.346 | — | +6.173 |
| NO CAPPING GROUP | +4.585 | — | 0 |
| Nitrodiiodinyl ($I_2$N—C≡C—N$I_2$) | | | |
| N in dimerizing bond(s): | +3.702 | +4.881 | +3.594 |
| no N in dimerizing bond(s): | +3.702 | 0 | +1.471 |
| Disulfyl (=C—S—S—C=) | | | |
| S in dimerizing bond(s): | +3.545 | +0.612 | 0 |
| no S in dimerizing bond(s): | +3.545 | +3.871 | +4.799 |
| Selenohydryl (H—Se—C≡C—Se—H)* | | | |
| Se in dimerizing bond(s): | +3.320 | +1.545 | 0 |
| no Se in dimerizing bond(s): | +3.320 | +5.463 | +10.295 |
| Magnesium (=C—Mg—C=)* | | | |
| Mg in dimerizing bond(s): | +2.886 | +1.544 | 0 |
| no Mg in dimerizing bond(s): | +2.886 | — | +2.012 |
| Oxybromyl (Br—O—C≡C—O—Br) | | | |
| O in dimerizing bond(s): | +2.271 | 0 | +0.771 |
| no O in dimerizing bond(s): | +2.271 | +5.662 | +10.001 |
| Phosphohydryl ($H_2$P—C≡C—P$H_2$) | | | |
| P in dimerizing bond(s): | +1.322 | +1.398 | +0.936 |
| no P in dimerizing bond(s): | +1.322 | 0 | +1.926 |
| Oxyfluoryl (F—O—C≡C—O—F) | | | |
| O in dimerizing bond(s): | +1.242 | +0.786 | 0 |
| no O in dimerizing bond(s): | +1.242 | +2.479 | +6.467 |
| Dimagnesyl (=C—Mg—Mg—C=)* | | | |
| Mg in dimerizing bond(s): | +1.206 | — | 0 |
| no Mg in dimerizing bond(s): | +1.206 | +1.229 | +3.204 |
| Nitrodifluoryl ($F_2$N—C≡C—N$F_2$) | | | |
| N in dimerizing bond(s): | +1.160 | +0.642 | 0 |
| no N in dimerizing bond(s): | +1.160 | +2.023 | +6.597 |
| Fluorosulfyl (F—S—C≡C—S—F) | | | |
| S in dimerizing bond(s): | +0.648 | +0.593 | 0 |
| no S in dimerizing bond(s): | +0.648 | +1.349 | +5.509 |

TABLE 3-continued

Energy minimization calculations for DCB6-Ge capped tooltip molecule "tip-on-tip" dimerization, using semi-empirical AM1 (0 eV = lowest-energy configuration)

| Tooltip Molecule Capping Group | Undimerized Tooltip Molecule (eV) | Lowest-E Dimerized Tooltip Mol. (1-bond) (eV) | Lowest-E Dimerized Tooltip Mol. (2-bond) (eV) |
|---|---|---|---|
| Sulfobromyl (Br—S—C≡C—S—Br) | | | |
| S in dimerizing bond(s): | +0.425 | 0 | +0.742 |
| no S in dimerizing bond(s): | +0.425 | +0.426 | +5.733 |
| Hydrogen (H—C≡C—H) | +0.379 | 0 | +3.193 |
| Bromine (Br—C≡C—Br) | +0.070 | 0 | +3.426 |
| Sulfhydryl (H—S—C≡C—S—H) | | | |
| S in dimerizing bond(s): | +0.075 | +0.317 | 0 |
| no S in dimerizing bond(s): | +0.075 | +0.856 | +5.415 |
| Amine (H$_2$N—C≡C—NH$_2$) | | | |
| N in dimerizing bond(s): | 0 | +0.166 | +0.512 |
| no N in dimerizing bond(s): | 0 | +0.969 | +5.598 |
| Iodine (I—C≡C—I) | 0 | +0.171 | +3.621 |
| Chlorine (Cl—C≡C—Cl) | 0 | +0.236 | +4.089 |
| Sulfiodinyl (I—S—C≡C—S—I) | | | |
| S in dimerizing bond(s): | 0 | +0.212 | +0.166 |
| no S in dimerizing bond(s): | 0 | +0.525 | +5.175 |
| Borohydryl (H$_2$B—C≡C—BH$_2$) | | | |
| B in dimerizing bond(s): | 0 | +0.239 | +0.926 |
| no B in dimerizing bond(s): | 0 | +0.270 | +4.153 |
| Oxyiodinyl (I—O—C≡C—O—I) | | | |
| O in dimerizing bond(s): | 0 | +0.631 | +0.467 |
| no O in dimerizing bond(s): | 0 | +2.705 | +5.475 |
| Hydroxyl (H—O—C≡C—O—H) | | | |
| O in dimerizing bond(s): | 0 | +0.607 | +0.576 |
| no O in dimerizing bond(s): | 0 | +2.839 | +6.830 |
| Berylfluoryl (F—Be—C≡C—Be—F) | | | |
| Be in dimerizing bond(s): | 0 | +1.417 | +2.680 |
| no Be in dimerizing bond(s): | 0 | +1.092 | +4.375 |
| Seleniodinyl (I—Se—C≡C—Se—I)* | | | |
| Se in dimerizing bond(s): | 0 | +1.418 | +7.364 |
| no Se in dimerizing bond(s): | 0 | +7.294 | +9.901 |
| Berylchloryl (Cl—Be—C≡C—Be—Cl) | | | |
| Be in dimerizing bond(s): | 0 | +1.524 | +2.625 |
| no Be in dimerizing bond(s): | 0 | +1.633 | +5.260 |
| Oxylithyl (Li—O—C≡C—O—Li) | | | |
| O in dimerizing bond(s): | 0 | +1.705 | +3.803 |
| no O in dimerizing bond(s): | 0 | +4.539 | +11.752 |
| Selenobromyl (Br—Se—C≡C—Se—Br)* | | | |
| Se in dimerizing bond(s): | 0 | +2.077 | +6.670 |
| no Se in dimerizing bond(s): | 0 | +4.826 | +8.683 |
| Fluorine (F—C≡C—F) | 0 | +3.048 | +9.682 |
| Sodium (Na—C≡C—Na)** | 0 | +3.753 | +11.766 |
| Lithium (Li—C≡C—Li) | 0 | +10.941 | +23.698 |

*energy minimization computed using PM3 instead of AM1
**energy minimization computed using MNDO/d instead of AM1

In the case of bromine, and to a lesser extent in several other cases, the undimerized and 1-bond dimerized forms appear energetically almost equivalent, although 2-bond dimerization is energetically unlikely. Application of the process described in Step 2 using a capping group having this characteristic could result in a mixture of undimerized and 1-bond dimerized tooltips attached to the deposition surface. In the event that some 1-bond dimerizations occur and that a few dimerized tooltip molecules are subsequently inserted into the deposition surface during Step 2, the distinctive two-lobed geometric signature of these dimerized nucleation seeds can be detected and mapped via SPM scan prior to Step 3, and subsequently avoided during tool detachment in Step 4. Surface editing is another approach. Due to the low surface nucleation density (Section 2.2.1), after the aforementioned mapping procedure it may be possible to selectively detach and remove from the surface all attached dimerized tooltip molecules that are detected, e.g., using focused ion beam, electron beam, or NSOM photoionization, subtractively editing the deposition surface prior to commencing CVD in Step 3. An alternative to subtractive editing is additive editing, wherein FIB deposition of new substrate atoms on and around the dimerized tooltip molecule can effectively bury it under a smooth mound of fresh substrate, again preventing nucleation of diamond at that site during Step 3.

Third, the capped-$C_2$ tip of the capped tooltip molecule should not spontaneously recombine into the side or the bottom of the adamantane base of neighboring tooltip molecules during synthesis or storage. FIG. 5 illustrates a side-bonding event. Recombination can occur between two tooltip molecules across one bond or two bonds. Table 4 shows the results of semi-empirical energy calculations using AM1 for the DCB6-Ge capped tooltip molecule in two particular cases of "tip-on-base" side-bonding recombination, for a variety of capping groups, in vacuo. The nomenclature in Table 4, such as (F—O—C=C—O—F), (=C—O—C=), etc. indicates the placement of the capping group with respect to the $C_2$ dimer. Preferred capping groups among those listed in Table 4 are those where recombination of neighboring tooltip molecules is energetically unfavorable.

With no protective capping group, tip-on-base recombination is very energetically preferred, with 1-bond recombination preferred over 2-bond when the H atom released from the adamantane base during formation of the 1-bond link becomes bonded with the remaining dangling bond of the tip-held $C_2$ dimer. Mann et al [38] showed that intermolecular dehydrogenation from the bottom of the adamantane base by a neighboring uncapped tooltip molecule is exothermic and kinetically accessible (against a 0.48 eV reaction energy barrier) at room temperature. However, with an appropriate cap in place, tooltip molecule recombination is energetically unfavorable to varying degrees, e.g., for 1-atom capping groups consisting of —I, —Br, —Na, and —Li, and also for several 2-atom and 3-atom capping groups including hydroxyl (—OH), amine (—NH$_2$), oxylithyl (—OLi), seleniodinyl (—SeI), several sulfyl groups including sulfhydryl (—SH), sulfiodinyl (—SI), and sulfalithyl (—SLi), and dimagnesyl (—MgMg—). There may be some tip-to-tip ionic bonding for beryllium (—Be—), lithium, oxylithyl, seleniodinyl, selenobromyl (—SeBr), berylfluoryl (—BeF) and berylchloryl (—BeCl) capping groups, and the imide (—NH—) cap appears to twist the tooltip dimer out of horizontal alignment. In the case of some 2-atom sulfyl (—SF, —SBr), and selenyl (—SeH) capping groups, recombination is energetically unfavorable for direct =C—C=bonds linking the two tooltip molecules but appears likely to occur if recombination occurs through a sulfur (e.g., =C—S—C= or =C—S—S—C=) or selenium atom in the recombination bond(s) linking the two tooltip molecules. Single-bond recombination of an H-capped tooltip molecule with release of H$_2$ is slightly energetically favorable, though double-bond dimerization for H-capped tooltips with release of 2H$_2$ appears very unfavorable energetically. These analyses should be repeated using ab initio techniques, and should be extended to include a calculation of activation energy barriers (which could be substantial), weak ionic forces that could lead to crystallization (in the case of capping groups containing metal atoms), and solvent effects, all of which could affect the results.

TABLE 4

Energy minimization calculations for DCB6-Ge capped tooltip molecule "tip-on-base" recombination with adamantane base of tooltip molecule, using semi-empirical AM1 (0 eV = lowest-energy configuration)

| Tooltip Molecule Capping Group | Unrecombined (eV) | Recombined (1 bond) (eV) | Recombined (2 bonds) (eV) |
|---|---|---|---|
| Oxyfluoryl (F—O—C=C—O—F) | | | |
| O in recombining bond(s): | +8.306 | +4.557 | 0 |
| no O in recombining bond(s): | +8.306 | +7.973 | +10.788 |
| Oxygen (=C—O—C=) | +4.622 | 0 | +2.997 |
| Nitrodifluoryl (F$_2$N—C=C—NF$_2$) | | | |
| N in recombining bond(s): | +4.228 | +2.779 | 0 |
| no N in recombining bond(s): | +4.228 | +4.011 | +6.015 |
| Beryllium (=C—Be—C=) | +3.544 | 0 | +4.335 |
| Diselenyl (=C—Se—Se—C=)* | | | |
| Se in recombining bond(s): | +3.306 | +2.765 | 0 |
| no Se in recombining bond(s): | +3.306 | +2.563 | +6.508 |
| NO CAPPING GROUP | +3.207 | 0 | +1.333 |
| Diamine (=C—NHHN—C=) | | | |
| N in recombining bond(s): | +3.118 | +0.014 | 0 |
| no N in recombining bond(s): | +3.118 | +0.622 | +3.238 |
| Sulfur (=C—S—C=) | +3.106 | 0 | +3.859 |
| Imide (=C—NH—C=) | +2.883 | 0 | +2.729 |
| Diberyl (=C—Be—Be—C=) | | | |
| Be in recombining bond(s): | +2.147 | 0 | +0.663 |
| no Be in recombining bond(s): | +2.147 | +0.154 | +3.393 |
| Oxybromyl (Br—O—C=C—O—Br) | | | |
| O in recombining bond(s): | +2.027 | +1.815 | 0 |
| no O in recombining bond(s): | +2.027 | +2.004 | +5.019 |
| Selenium (=C—Se—C=)* | +1.788 | 0 | +3.680 |

TABLE 4-continued

Energy minimization calculations for DCB6-Ge capped tooltip molecule "tip-on-base" recombination with adamantane base of tooltip molecule, using semi-empirical AM1 (0 eV = lowest-energy configuration)

| Tooltip Molecule Capping Group | Unrecombined (eV) | Recombined (1 bond) (eV) | Recombined (2 bonds) (eV) |
|---|---|---|---|
| Fluorosulfyl (F—S—C≡C—S—F) | | | |
| S in recombining bond(s): | +1.583 | +1.312 | 0 |
| no S in recombining bond(s): | +1.583 | +2.365 | +6.057 |
| Fluorine (F—C≡C—F) | +0.771 | 0 | +2.620 |
| Selenohydryl (H—Se—C≡C—Se—H)* | | | |
| Se in recombining bond(s): | +0.668 | +1.544 | 0 |
| no Se in recombining bond(s): | +0.668 | +4.596 | +8.318 |
| Oxyiodinyl (I—O—C≡C—O—I) | | | |
| O in recombining bond(s): | +0.353 | +0.502 | 0 |
| no O in recombining bond(s): | +0.353 | +0.257 | +3.334 |
| Sulfobromyl (Br—S—C≡C—S—Br) | | | |
| S in recombining bond(s): | +0.351 | +0.531 | 0 |
| no S in recombining bond(s): | +0.351 | +0.879 | +5.087 |
| Magnesium (═C—Mg—C═)* | +0.258 | 0 | +3.352 |
| Borohydryl (H$_2$B—C≡C—BH$_2$) | | | |
| B in recombining bond(s): | +0.209 | +0.237 | 0 |
| no B in recombining bond(s): | +0.209 | +1.073 | +4.215 |
| Chlorine (Cl—C≡C—Cl) | +0.111 | 0 | +3.121 |
| Nitrodiiodinyl (I$_2$N—C≡C—NI$_2$) | | | |
| N in recombining bond(s): | +0.068 | +1.086 | 0 |
| no N in recombining bond(s): | +0.068 | +1.469 | +3.632 |
| Hydrogen (H—C≡C—H) | 0 | +0.117 | +2.679 |
| Hydroxyl (H—O—C≡C—O—H) | | | |
| O in recombining bond(s): | 0 | +1.304 | +1.570 |
| no O in recombining bond(s): | 0 | +0.143 | +3.235 |
| Bromine (Br—C≡C—Br) | 0 | +0.276 | +3.538 |
| Phosphohydryl (H$_2$P—C≡C—PH$_2$) | | | |
| P in recombining bond(s): | 0 | +0.662 | +0.615 |
| no P in recombining bond(s): | 0 | +0.399 | +2.607 |
| Amine (H$_2$N—C≡C—NH$_2$) | | | |
| N in recombining side bond(s): | 0 | +1.066 | +0.992 |
| N in recombining bottom bond(s): | 0 | +1.043 | +1.854 |
| no N in recombining side bond(s): | 0 | +0.423 | +3.025 |
| no N in recombining bottom bond(s): | 0 | +0.744 | +2.444 |
| Dimagnesyl (═C—Mg—Mg—C═)* | | | |
| Mg in recombining bond(s): | 0 | +0.731 | +1.196 |
| no Mg in recombining bond(s): | 0 | +1.294 | +3.229 |
| Iodine (I—C≡C—I) | 0 | +0.785 | +4.256 |
| Sulfhydryl (H—S—C≡C—S—H) | | | |
| S in recombining bond(s): | 0 | +0.799 | +0.379 |
| no S in recombining bond(s): | 0 | +0.890 | +4.701 |
| Sulfiodinyl (I—S—C≡C—S—I) | | | |
| S in recombining bond(s): | 0 | +0.833 | +0.425 |
| no S in recombining bond(s): | 0 | +0.921 | +5.383 |
| Oxylithyl (Li—O—C≡C—O—Li) | | | |
| O in recombining bond(s): | 0 | +2.218 | +0.089 |
| no O in recombining bond(s): | 0 | +1.148 | +4.156 |
| Sodium (Na—C≡C—Na)** | 0 | +1.225 | +4.813 |
| Berylfluoryl (F—Be—C≡C—Be—F) | | | |
| Be in recombining bond(s): | 0 | +1.842 | +2.665 |
| no Be in recombining bond(s): | 0 | +1.635 | +5.569 |
| Sulfalithyl (Li—S—C≡C—S—Li) | | | |
| S in recombining bond(s): | 0 | +3.018 | +0.973 |
| no S in recombining bond(s): | 0 | +2.032 | +7.264 |

TABLE 4-continued

Energy minimization calculations for DCB6-Ge capped tooltip molecule "tip-on-base" recombination with adamantane base of tooltip molecule, using semi-empirical AM1 (0 eV = lowest-energy configuration)

| Tooltip Molecule Capping Group | Unrecombined (eV) | Recombined (1 bond) (eV) | Recombined (2 bonds) (eV) |
|---|---|---|---|
| Berylchloryl (Cl—Be—C≡C—Be—Cl) | | | |
| Be in recombining bond(s): | 0 | +3.430 | +5.542 |
| no Be in recombining bond(s): | 0 | +2.057 | +6.162 |
| Lithium (Li—C≡C—Li) | 0 | +3.700 | +7.444 |
| Selenobromyl (Br—Se—C≡C—Se—Br)* | | | |
| Se in recombining bond(s): | 0 | +5.340 | +5.145 |
| no Se in recombining bond(s): | 0 | +7.749 | +10.775 |
| Seleniodinyl (I—Se—C≡C—Se—I)* | | | |
| Se in recombining bond(s): | 0 | +8.123 | +11.421 |
| no Se in recombining bond(s): | 0 | +10.503 | +14.970 |

*energy minimization computed using PM3 instead of AM1
**energy minimization computed using MNDO/d instead of AM1

In the case of chlorine, and to a lesser extent in several other cases, the unrecombined and 1-bond recombined forms appear energetically almost equivalent, although 2-bond recombination is energetically unlikely. Application of the process described in Step 2 using a capping group having this characteristic could result in a mixture of unrecombined and 1-bond recombined tooltips attached to the deposition surface. In the event that some 1-bond recombinations occur and that a few recombined tooltip molecules are subsequently inserted into the deposition surface during Step 2, the distinctive two-lobed geometric signature of these recombined nucleation seeds can be detected and mapped via SPM scan prior to Step 3, and subsequently avoided during tool detachment in Step 4. Surface editing is another approach. Due to the low surface nucleation density (Section 2.2.1), after the aforementioned mapping procedure it may be possible to selectively detach and remove from the surface all attached recombined tooltip molecules that are detected, e.g., using focused ion beam, electron beam, or NSOM photoionization, subtractively editing the deposition surface prior to commencing CVD in Step 3. An alternative to subtractive editing is additive editing, wherein FIB deposition of new substrate atoms on and around the recombined tooltip molecule can effectively bury it under a smooth mound of fresh substrate, again preventing nucleation of diamond at that site during Step 3.

Fourth, the capped-$C_2$ tip of the capped tooltip molecule should not spontaneously react with solvent, feedstock, or catalyst molecules that are employed during conventional techniques for the bulk chemical synthesis of functionalized adamantanes in solution phase. A definitive result regarding this capping-group selection factor depends upon the synthesis pathways followed.

As a proxy for these many pathways, it has been shown that even straight-chain hydrocarbons, upon exposure to the customary aluminum halide catalysts at high temperature, readily produce mixtures of various polymethyladamantanes [81]. The simplest-case recombination event illustrated in FIG. 6 was analyzed via semi-empirical energy calculations using AM1 for the DCB6-Ge iodine-capped tooltip molecule in the specific instances of 1-bond and 2-bond side-bonding recombination with a simple straight-chain hydrocarbon molecule (n-octane). The 2-bond analysis includes one event in which the second bond occurs adjacent to the first, producing a 4-carbon ring with the octane molecule, and a second alternative event in which the second bond occurs with an octane chain carbon atom three positions down the chain, producing a more stable 6-carbon ring with the octane molecule. Since solvent effects, temperature, reverse reaction rates, and so forth will determine whether the reaction can occur, and will also determine the relative yields of various products and reactants, the thermodynamics results indicate primarily the relative ease or difficulty of maintaining the given capped tooltip molecule stably in solution with liquid n-octane. The data in Table 5 show that iodine (—I), hydrogen (—H), amine (—NH$_2$), and perhaps bromine (—Br) capped tooltip molecules should be the most stable in hydrocarbon media, as should seleniodinyl (—SeI) and several sulfyl-capped molecules including sulfhydryl (—SH), sulfiodinyl (—SI), and sulfobromyl (—SBr). Fluorine- and oxygen-containing capping groups may be (relatively) less stable.

TABLE 5

Energy minimization calculations for DCB6-Ge capped tooltip molecule side-bonding recombination reaction with a molecule of n-octane, using semi-empirical AM1 (0 eV = lowest-energy configuration)

| Tooltip Molecule Capping Group | Not Recombined (eV) | Recombined (1 bond) (eV) | Recombined (2 bonds, 4-carbon ring) (eV) | Recombined (2 bonds, 6-carbon ring) (eV) |
|---|---|---|---|---|
| Imide (—NH—) | +4.075 | 0 | +2.148 | +0.200 |
| Sulfur (=C—S—C=) | +3.397 | 0 | +2.391 | +0.446 |
| NO CAP | +3.347 | — | +1.935 | 0 |

TABLE 5-continued

Energy minimization calculations for DCB6-Ge capped tooltip molecule side-bonding recombination reaction with a molecule of n-octane, using semi-empirical AM1 (0 eV = lowest-energy configuration)

| Tooltip Molecule Capping Group | Not Recombined (eV) | Recombined (1 bond) (eV) | Recombined (2 bonds, 4-carbon ring) (eV) | Recombined (2 bonds, 6-carbon ring) (eV) |
|---|---|---|---|---|
| Diamine (—NHHN—) | +2.838 | +2.949 | +1.939 | 0 |
| Fluorine (—F) | +1.989 | +1.029 | +1.999 | 0 |
| Lithium (—Li) | +1.744 | +2.439 | +1.806 | 0 |
| Oxylithyl (—OLi) | +1.194 | +1.189 | +2.379 | 0 |
| Selenobromyl (—SeBr)* | +1.099 | +1.612 | +2.465 | 0 |
| Oxybromyl (OBr) | +0.979 | +0.503 | +1.963 | 0 |
| Oxyiodinyl (—OI) | +0.967 | +0.575 | +1.968 | 0 |
| Hydroxyl (—OH) | +0.948 | +0.472 | +1.987 | 0 |
| Nitrodifluoryl (—NF$_2$) | +0.885 | +0.421 | +1.961 | 0 |
| Disulfyl (=C—S—S—C=) | +0.841 | 0 | +2.137 | +0.380 |
| Chlorine (—Cl) | +0.765 | +0.429 | +2.044 | 0 |
| Borohydryl (—BH$_2$) | +0.690 | +1.370 | +4.003 | 0 |
| Sulfalithyl (—SLi) | +0.484 | +1.276 | +1.859 | 0 |
| Bromine (—Br) | +0.346 | +0.214 | +1.946 | 0 |
| Hydrogen (—H) | +0.081 | +0.069 | +1.939 | 0 |
| Phosphohydryl (—PH$_2$) | +0.043 | +0.072 | +1.906 | 0 |
| Iodine (—I) | 0 | +0.147 | +2.041 | +0.120 |
| Amine (—NH$_2$) | 0 | +0.148 | +2.263 | +0.301 |
| Nitrodiiodinyl (—NI$_2$) | 0 | +0.239 | +2.261 | +0.346 |
| Sulfhydryl (—SH) | 0 | +0.465 | +2.346 | +0.759 |
| Sulfiodinyl (—SI) | 0 | +0.478 | +2.579 | +0.832 |
| Sulfobromyl (—SBr) | 0 | +0.526 | +1.678 | +1.082 |
| Berylfluoryl (—BeF) | 0 | +0.562 | +2.263 | +0.876 |
| Berylchloryl (—BeCl) | 0 | +0.725 | +3.114 | +1.191 |
| Dimagnesyl (—Mg$_2$—)* | 0 | +0.956 | +2.399 | +0.802 |
| Seleniodinyl (—SeI)* | 0 | +1.474 | +0.834 | +1.498 |

*energy minimization computed using PM3 instead of AM1

2.2 Step 2: Attach Tooltip Molecule to Deposition Surface in Preferred Orientation STEP 2. Attach a small number of tooltip molecules to an appropriate deposition surface in tip-down orientation, so that the tooltip-bound dimer is bonded to the deposition surface.

A suitable deposition surface material (Section 2.2.1) is determined by choosing a surface which is not readily amenable to bulk diamond deposition, under the thermal and chemical conditions that will prevail during the diamond deposition processes described in Step 3. In Attachment Method A (Section 2.2.2), tooltip molecules may be bonded to the deposition surface in the desired orientation via low-energy ion bombardment of the deposition surface in vacuo, creating a low density of preferred diamond nucleation sites. In Attachment Method B (Section 2.2.3), tooltip molecules may be bonded to the deposition surface in the desired orientation by non-impact dispersal and weak physisorption on the deposition surface, followed by tooltip molecule decapping via targeted energy input producing dangling bonds at the $C_2$ dimer which can then bond into the deposition surface in vacuo, also creating a low density of preferred diamond nucleation sites. In Attachment Method C (Section 2.2.4), the techniques of conventional solution-phase chemical synthesis are used to attach tooltip molecules to a deposition surface in the preferred orientation, again creating diamond nucleation sites.

2.2.1 Surface Nucleation and Choice of Deposition Substrate

The intention of this invention is to grow a handle molecule as a single crystal of bulk diamond large enough to permit convenient physical manipulation of the attached $C_2$ dimer-bearing tooltip. Since this single crystal will be in the size range of 0.1-10 microns, and since sufficient room must be allowed around each single crystal to afford access to a MEMS-scale gripping mechanism, the maximum surface nucleation density appropriate for this process in the preferred embodiment will be ~$10^5$ cm$^{-2}$, giving a mean separation between handle molecule crystals of ~32 microns on the deposition surface. In other embodiments in which much smaller 100 nm handle molecule crystals can be employed with narrower attachment clearances for the external gripping mechanism, the maximum surface nucleation density could be as high as ~$10^9$ cm$^{-2}$, giving a mean separation between surface-grown handle molecule crystals of ~320 nm.

Conventional diamond films grown by CVD on smooth nondiamond substrates are characterized by very low nucleation densities, typically <$10^4$ cm$^{-2}$ when diamond is deposited on a polished silicon wafer surface, which is many orders of magnitude less than that exhibited by most materials [127]. (Interestingly, the CVD nucleation density of diamond nanocrystals on an SiO$_2$ substrate is 6 orders of magnitude smaller than on pure silicon [18].) The commercial preparation of continuous diamond films requires separately nucleated diamond crystals eventually to grow together to form a single sheet, and therefore is maximally efficient under conditions of high nucleation density. Thus, diamond film growth procedures often include preliminary substrate preparation techniques which attempt to increase the nucleation density to a practicable level. Such techniques typically involve introduction of surface discontinuities by scratching or abrading the substrate surface with a fine diamond grit powder or paste. Such surface discontinuities either create preferential geometrical sites for diamond crystal nucleation, or more probably embedded residues from the diamond abrading powder may serve as nucleation sites from which diamond growth can occur by accumulation. The presence of carbon particles on the surface of a substrate can provide a high density of nucleation sites for subsequent diamond growth [82]. As shown in Table 6, despite abrasive surface preparation the nucleation densities for diamond films prepared by such techniques remain relatively low, on the order of ~$10^8$ cm$^{-2}$ (~1 $\mu$m$^{-2}$) (vs. ~$10^{15}$ cm$^{-2}$ available atomic sites), and the surface structure of such films is unpredictable and typically exhibits very disordered surface patterns [127]. Nucleation has also been enhanced by coating substrate surfaces with a thin (10-20 nm) layer of hydrocarbon oil [83].

TABLE 6

Typical surface nucleation densities of diamond on polished silicon after various surface pretreatments (modified from Liu and Dandy [84])

| Pretreatment Method | Typical Nucleation Density (nuclei/cm$^2$) |
| --- | --- |
| No pretreatment | $10^3$-$10^5$ |
| Covering/coating with Fe film | $5 \times 10^5$ |
| As+ ion implantation on Si | $10^5$-$10^6$ |
| Covering/coating with graphite film | $10^6$ |
| Manual scratching with diamond grit | $10^6$-$10^{10}$ |
| Seeding | $10^6$-$10^{10}$ |
| Ultrasonic scratching with diamond grit | $10^7$-$10^{11}$ |
| Biasing (voltage) | $10^8$-$10^{11}$ |
| Covering/coating with graphite fiber | $>10^9$ |
| C$_{70}$ clusters + biasing | $3 \times 10^{10}$ |

Since the purpose of this invention is to grow isolated micron-scale diamond single crystals over tooltip molecule nucleation sites, rather than a continuous diamond film, the deposition surface ideally is chosen so as to minimize the number of natural (non-tooltip molecule) nucleation sites. If tooltip molecules are attached at a number density of ~$10^5$ cm$^{-2}$ to a surface of polished silicon otherwise having no pretreatment, the number density of naturally occurring nucleation sites can be held to at most $10^3$-$10^5$ cm$^{-2}$. This implies that from 50% to 99% of the isolated micron-scale diamond single crystals that are grown during Step 3 (Section 2.3) will be correctly nucleated by surface-bound undimerized tooltip molecules. An SPM scan of the deposition surface, following the completion of Step 2 but prior to the commencement of Step 3, can identify and map the positions of all of the undimerized surface-bound tooltip molecules, so that the isolated micron-scale diamond single crystals that are later grown and properly nucleated by surface-bound tooltip molecules can be identified prior to selection and detachment in Step 4 (Section 2.4).

As noted by May [85], most of the CVD diamond films reported to date have been grown on single-crystal Si wafers, mainly due to the availability, low cost, and favorable properties of Si wafers. But this is not the only possible substrate material. According to the present embodiments, suitable substrates for diamond handle molecule crystal growth are generally characterized by five basic criteria [85], the first four of which are summarized quantitatively in Table 7.

First, the substrate must have a melting point (at the process pressure) higher than the temperature required for diamond growth (at least 300-500° C., but normally greater than 700° C.). This precludes the use of low-melting-point materials such as plastics, aluminum, certain glasses and some electronic materials such as GaAs as a deposition substrate, when hydrogenic diamond CVD techniques are employed in Step 3 (Section 2.3).

Second, for growing diamond films the substrate material should have a thermal expansion coefficient comparable with that of diamond, since at the high growth temperatures currently used, a substrate will tend to expand, and thus the diamond coating will be grown upon and bonded directly to an expanded substrate. Upon cooling, the substrate will contract back to its room temperature size, whereas the diamond coating, with its very small expansion coefficient, will be relatively unaffected by the temperature change, causing the diamond film to experience significant compressive stresses from the shrinking substrate, leading to bowing of the sample, and/or cracking, flaking or even delamination of the entire film [85]. However, a nondiamond deposition surface for growing diamond tool handle molecules, starting from surface-bound tooltip molecule nuclei, should incorporate the maximum possible thermal expansion mismatch between the substrate and diamond, producing thermal stresses upon cooling that can facilitate tool separation from the nondiamond deposition surface in Step 4 (Section 2.4).

Third, a mismatch in the crystal lattice constant [86, 87] between the diamond comprising the tool handle molecule and the nondiamond substrate greatly reduces the bonding opportunities between handle molecule and substrate, during handle molecule growth (Section 2.3). An extensive interfacial misfit also facilitates tool separation from the nondiamond deposition surface in Step 4 (Section 2.4).

Fourth, in order to form adherent diamond films it is a customary requirement that the substrate material should be capable of forming a carbide layer to a certain extent, since diamond CVD on nondiamond substrates usually involves the formation of a thin carbide interfacial layer upon which the diamond then grows. The carbide layer is viewed as a "glue" which promotes diamond growth and aids its adhesion by (partial) relief of interfacial stresses caused by lattice mismatch and substrate contraction [85]. However, according to the present embodiments, a preferred nondiamond deposition surface for growing diamond tool handle molecules, starting from surface-bound tooltip molecule nuclei, is a substrate that resists or prohibits carbide formation. The absence of carbide on the nondiamond deposition surface (a) discourages downgrowth of the tool handle molecule into the substrate, (b) helps maintain the isolation of the finished tooltip apex, and (c) facilitates tool separation from the nondiamond deposition surface in Step 4 (Section 2.4). On the basis of carbide exclusion, potential substrate materials including metals, alloys and pure elements can be subdivided into three broad classes [85, 88], in descending order of preference for the present invention:

(1) Carbide Exclusion. Metals such as Cu, Sn, Pb, Ag and Au, as well as non-metals such as Ge and sapphire/alumina (Al$_2$O$_3$), have little or no solubility or reaction with C. These materials do not form a carbide layer, and so any diamond layer that might try to form will not adhere well to the surface (which is known as a way to make free-standing diamond films, as the films will often readily delaminate after deposition). These are the best materials for a deposition surface upon which to grow detachable diamond tool handle molecules nucleated by surface-bound tooltip molecules. Unwanted natural nucleation centers are unlikely to arise on polished non-pretreated surfaces and downgrowth from the tooltip molecule seed or the growing tool handle structure, towards the substrate, will be resisted by these surfaces.

(2) Carbon Solvation. Metals such as Pt, Pd, Rh, Ni, Ti and Fe exhibit substantial mutual solubility or reaction with C (all industrially important ferrous materials such as iron and stainless steel cannot be diamond coated using simple CVD methods) [85]. During CVD, a substrate composed of these metals acts as a carbon sink whereupon deposited carbon dissolves into the surface, forming a solid solution. This dissolution transports large quantities of C into the bulk, rather than remaining at the surface where it can promote diamond nucleation [85]. Often diamond growth on the surface only begins after the substrate is completely saturated with carbon, with carbide finally appearing on the surface, by which time the tool handle molecule may already have grown sufficiently large as a single diamond crystal atop a surface-bound tooltip molecule.

(3) Carbide Formation. Metals such as Ti, Zr, Hf, V, Nb, Ta, Cr, Mo, W, Co, Ni, Fe, Y, Al, and certain other rare-earth metals can form carbide during CVD. In some metals, such as Ti, the interfacial carbide layer continues growing during diamond deposition and can become hundreds of microns thick. Non-metals such as B and Si, and Si-containing compounds such as $SiO_2$, quartz and $Si_3N_4$, also form carbide layers, and substrates composed of carbides themselves, such as SiC, WC and TiC, are particularly amenable to diamond deposition [85]. Surface nucleation rates ($cm^{-2}$ $hr^{-1}$) on stable carbide-forming substrates (Si, Mo, W) are 10-100 times higher than on carbide-resistant substrates [89], and surface nucleation density ($cm^{-2}$) on Mo is about 10 times higher than on other carbide-forming substrates (Si, Ni, Ti, Al) under similar deposition conditions [90]. If used as polished non-pretreated deposition surfaces for diamond tool handle growth, these materials should only sparsely produce competing diamond crystal nucleation centers during hydrogenic CVD processes. (Diamond cannot be epitaxially grown directly on silicon or GaAs substrates [91].) However, carbon dimers that are present in the feedstock gases during low-temperature nonhydrogenic CVD can insert into Si and $SiO_2$ surfaces, readily producing silicon carbide [18]. Additionally, as the CVD process continues, carbide-forming materials may permit some unwanted downgrowth from the surface-bound tooltip molecule or growing tool handle structure, towards the substrate. Note that bombardment of surfaces, particularly refractory metal surfaces such as tungsten, with fullerene ions having energies from about 0.0025-250 MeV results in implantation of carbon and the formation of surface or subsurface carbides [11].

TABLE 7

Relevant physical parameters of potential mechanosynthesis tool deposition surface (substrate) material

| Substrate Material | Melting Point at 1 atm (° C.) | Linear Thermal Expansion Coefficient ($K^{-1}$) | Lattice Constant at ~300 K (Å) |
| --- | --- | --- | --- |
| Diamond (cubic) | 3057 [92] | $0.8 \times 10^{-6}$ [93, 94] | 3.566986 [95] |
| Lonsdaleite (hexagonal) | — | — | |
| a-axis | | | 2.52 [94] |
| c-axis | | | 1.42 [94] |
| Graphite (hexagonal) | 3797 [92] | | |
| a-axis | | <0 [94] | 2.464 [95] |
| c-axis | | $25 \times 10^{-6}$ [94] | 6.711 [95] |
| Carbide Exclusion: | | | |
| Ge | 937 [96] | $6 \times 10^{-6}$ [98] | 5.64613 [100] |
| Sn | 232 [96] | $22 \times 10^{-6}$ [98] | 6.48920 [100] |
| Pb | 328 [96] | $28.9 \times 10^{-6}$ [98] | 4.95 [95] |
| Sapphire/Alumina ($Al_2O_3$): | 2045 [96] | | |
| ⊥ to c-axis | | $5.0 \times 10^{-6}$ [99] | 4.76 [99] |
| ∥ to c-axis | | $6.66 \times 10^{-6}$ [99] | 13.00 [99] |
| Au | 1063 [96] | $14.2 \times 10^{-6}$ [98] | 4.08 [95] |
| Ag | 961 [96] | $18.9 \times 10^{-6}$ [98] | 4.09 [95] |
| Cu (fcc) | 1084 [97] | $17 \times 10^{-6}$ [97] | 3.61 [95] |
| Carbon Solvation: | | | |
| Pt | 1769 [96] | $8.8 \times 10^{-6}$ [98] | 3.92 [95] |
| Pd | 1552 [96] | $11.8 \times 10^{-6}$ [98] | 3.89 [95] |
| Rh | 1966 [96] | $8.2 \times 10^{-6}$ [98] | 3.80 [95] |
| Carbide Formation: | | | |
| Si (cubic) | 1412 [97] | $7.6 \times 10^{-6}$ [97] | 5.43095 [100] |
| $SiO_2$ (quartz) | 1710 [101] | $13.3 \times 10^{-6}$ [101] | 4.91 (a), 5.41 (c) [101] |
| $Si_3N_4$ | 1900 [96] | $3.3 \times 10^{-6}$ [103] | 5.38 [105] |
| B (fcc) | 2300 [96] | $6 \times 10^{-6}$ [98] | 5.37 [106] |
| Ti | 1675 [96] | $8.6 \times 10^{-6}$ [98] | 2.95 (a), 4.68 (c) [95] |
| Zr | 1852 [96] | $5.7 \times 10^{-6}$ [98] | 3.23 (a), 5.15 (c) [95] |
| Hf | 2150 [96] | $5.9 \times 10^{-6}$ [98] | 3.19 (a), 5.05 (c) [95] |
| V | 1890 [96] | $8.4 \times 10^{-6}$ [98] | 3.03 [95] |
| Nb | 2468 [96] | $7.3 \times 10^{-6}$ [98] | 3.30 [95] |
| Ta | 2996 [96] | $6.3 \times 10^{-6}$ [98] | 3.30 [95] |
| Cr | 1890 [96] | $4.9 \times 10^{-6}$ [98] | 2.51 (a), 4.07 (c) [95] |
| Mo | 2610 [96] | $4.8 \times 10^{-6}$ [98] | 3.15 [95] |
| W | 3410 [96] | $4.5 \times 10^{-6}$ [98] | 3.16 [95] |
| Co (>390° C.) (fcc) | 1494 [97] | $12.5 \times 10^{-6}$ [97] | 3.54 [97] |
| Ni (fcc) | 1455 [97] | $13.3 \times 10^{-6}$ [97] | 3.52 [97] |
| Fe (<912° C.) (bcc) | — | $12.1 \times 10^{-6}$ [97] | 2.86 [97] |
| Fe (912-1400° C.) (bcc) | 1536 [97] | $>14.6 \times 10^{-6}$ [97] | 3.56 [97] |
| Y | 1495 [96] | $10.6 \times 10^{-6}$ [98] | 3.65 (a), 5.73 (c) [95] |
| Y—$ZrO_2$ (cubic) | 2850 [102] | $4.0 \times 10^{-6}$ [102] | 5.07 [107] |
| Al | 660 [96] | $23.1 \times 10^{-6}$ [98] | 4.05 [95] |
| SiC (cubic) | 2697 [102] | $4.63 \times 10^{-6}$ [102] | 4.3596 [91, 97] |

TABLE 7-continued

Relevant physical parameters of potential mechanosynthesis tool deposition surface (substrate) material

| Substrate Material | Melting Point at 1 atm (° C.) | Linear Thermal Expansion Coefficient ($K^{-1}$) | Lattice Constant at ~300 K (Å) |
|---|---|---|---|
| WC (fcc) | 2870 [96] | 4-7 × $10^{-6}$ [104] | 4.248 [108] |
| TiC | 3140 [96] | 7 × $10^{-6}$ [104] | ~8.1 [109] |
| Easy Nucleation: | | | |
| BN (cubic) | 2727 [102] | 0.59 × $10^{-6}$ [102] | 3.615 [102] |

Dimer Release Criterion. In addition to these four basic factors, a fifth criterion in the choice of deposition substrate material is that the tooltip molecule should bind the $C_2$ dimer more strongly than the deposition surface, so that when the finished tool is pulled away from the deposition surface in Step 4 (Section 2.4), the dimer will stay attached to the tool and not remain on the deposition surface. If the dimer stays with the tool, then the result is a tool with an active tip ready to perform diamond mechanosynthesis. If the dimer remains on the deposition surface, the result is a dimerless "discharged" tool which must be recharged with $C_2$ dimer by some additional process [38] before the tool can be used for diamond mechanosynthesis.

A full computational simulation of the interaction between complete modeled deposition surfaces and the DCB6-Ge tooltip has not yet been done. However, a preliminary evaluation has examined the energy minima of a tooltip that is first joined to a deposition surface through the dimer ($E_J$) and is then pulled away from the deposition surface, for Dimer-on-Tooltip ($E_{DoT}$) and Dimer-on-Surface ($E_{DoS}$) configurations, where the "surfaces" are crudely modeled as follows: C (diamond), Si, Ge, Sn, and Pb surface as a single nonterminated 10-atom adamantane-like cage, with the tooltip dimer bonded to 2 adjacent cage atoms; Cu surface as 4 Cu atoms arranged in a square, with the tooltip dimer bonded to 2 adjacent Cu atoms; $Al_2O_3$ as a single 5-atom chain of alternating Al and O atoms, with the tooltip dimer bonded to the two Al atoms; and C (graphite) as a 3×3 (unit cells) flat single-plane sheet with all perimeter C atoms immobilized. The quantity ($E_{DoS}$–$E_{DoT}$), tabulated in the rightmost column of Table 8 for each surface, is negative if the dimer prefers to stick to the surface after the tooltip has been pulled away from the surface, and is positive if the dimer prefers to stick to the tooltip after the tooltip has been pulled away from the surface, the desired result. (This is only a crude analysis because the quantity ($E_{DoS}$–$E_{DoT}$) really informs us only as to whether the total process of charged tooltip deposition plus discharged tooltip retraction is endo- or exothermic, not the reaction direction or preference.) Since surfaces composed of the larger-radius Ag and Au atoms should bind the dimer less strongly than Cu, it appears that all "carbide exclusion" deposition surface materials listed in Table 7 (with the possible exception of Cu, whose ($E_{DoS}$–$E_{DoT}$) is slightly negative; Table 8), and graphite, at least tentatively satisfy this additional dimer-release criterion. Note that a release energy ($E_J$–$E_{DoT}$)<0 for all deposition surface in Table 8 suggests a thermodynamic preference for a decapped tooltip molecule to bind to the deposition surface.

TABLE 8

Crude estimate using semi-empirical AM1 of energetic preference for tooltip dimer to release from deposition surface, as the tooltip is retracted from the deposition surface (values >0 for ($E_{DoS}$ – $E_{DoT}$) indicate release from surface; J = tooltip joined to surface through dimer, DoS = dimer on surface, DoT = dimer on tooltip)

| Deposition Surface Material | ($E_J$ – $E_{DoT}$) in eV | ($E_{DoS}$ – $E_{DoT}$) in eV |
|---|---|---|
| C (diamond) | −5.772 | −3.864 |
| Si | −5.007 | −0.192 |
| Cu | −5.090 | −0.115 |
| Ge | −4.700 | +1.067 |
| Sn | −2.802 | +2.247 |
| Pb | −1.463 | +2.743 |
| $Al_2O_3$ | −0.995 | +2.753 |
| C (graphite) | −0.560 | +5.180 |

Taking all five factors into account (Tables 7 and 8), "carbide exclusion" materials are preferred substrates for diamond handle molecule crystal growth according to certain of the present embodiments. Graphene sheets (e.g., graphite, carbon nanotubes) may also be used with nonhydrogenic CVD processes, since atomic hydrogen etches graphene, although there exists a preferential epitaxial lattice registry relationship between the diamond C(111) and graphite (0001) surfaces, and similarly between the diamond C(110) and graphite (1120) surfaces [84], which might encourage non-tooltip-molecule nucleation. Furthermore, any conventional substrate material suitable for the deposition of CVD diamond thereon may be employed as the substrate utilized in the present invention, though perhaps with decreased efficiency or convenience. Thus the substrate material could be a metal, a metal carbide, a metal nitride, or a ceramic—e.g., silicon carbide, tungsten carbide, molybdenum, boron, boron nitride, niobium, graphite, copper, aluminum nitride, silver, iron, steel, nickel, silicon, alumina, or silica [5], or combinations thereof including cermets such as $Al_2O_3$—Fe, TiC—Ni, TiC—Co, TiC—TiN, or $B_4C$—Fe systems [110]. Finally, specialized surface treatments may be applied to the deposition surface in order to suppress natural nucleation—for example, ion implantation of Ar+ ions ($3 \times 10^{15}$ ions/$cm^2$ at 100 KeV) on silicon substrate is known to decrease nucleation density [111].

2.2.2 Tooltip Attachment Method A: Ion Bombardment in Vacuo

Tooltip molecules may be bonded to the deposition surface in the desired orientation via low-energy ion bombardment of the deposition surface in vacuo, creating a low density of preferred diamond nucleation sites. This is similar to the recognized pretreatment method of (for example) As+ ion implantation ($10^{14}$ ions/$cm^2$ at 100 KeV) on silicon substrate

[112, 113] which yields a typical nucleation density of $10^5$-$10^6$ nuclei/cm$^2$, up from $10^4$ in the absence of such ion implantation treatment [84]. Ion-beam implantation of C+ ions to form diamond-like carbon (DLC) films on various atomically clean substrates in chambers maintained at <$10^{-9}$ torr are well-known [114-118, 137], including gold [118] and copper [119] surfaces, and halogen atoms have been partially substituted for hydrogen in DLC deposited on metal substrate in photosensor applications [120].

The specifics of Attachment Method A in the present invention are as follows. First, capped tooltip molecules (Section 2.1) are supplied to an ionization source. A vapor of capped tooltip molecules is created by heating in a vacuum chamber (e.g., $C_{60}$ has a vapor pressure of 0.001 torr at 500° C. [17]). The vaporized capped tooltip molecules are next ionized by at least one of the procedures of laser ablation, electron bombardment, electron attachment, or photoionization. The capped tooltip molecule ions are then electrostatically accelerated to form a low-energy, highly dilute tooltip molecule ion beam, a well-known technology [121]. The ion beam is then directed in a scanning pattern across the deposition surface in vacuo. Upon striking the surface, the tooltip molecule ions (FIG. 7A) may partially fragment with the release of the capping group, producing dangling bonds at the $C_2$ dimer which can then insert into the substrate surface (FIG. 7B). This beam energy transferred to the tooltip molecule upon impact should not significantly exceed 7.802 eV, the minimum energy required to entirely remove the $C_2$ dimer from an uncapped DCB6-Ge tooltip molecule [36]. (This is considerably lower than the 10-80 eV ions studied by Sinnott et al [145] to functionalize carbon nanotubes (CNTs) by similar means, the 10-300 eV C$^+$ ion beams used to grow diamond-like carbon films on various substrates [118], and the >250 eV needed to fragment fullerene ions into free $C_2$ dimer radicals [11].) Another outcome is that only one capping group is released, bonding the tooltip molecule to the surface with only one bond through the $C_2$ dimer (FIG. 7C). Table 9 shows that this 1-bond outcome is energetically comparable to the 2-bond outcome, in the case an iodine cap and a graphite surface. Yet another possible outcome is that the tooltip molecule bonds to the surface at its base through either one (FIG. 7D) or two (FIG. 7E) bonds, releasing an H or $H_2$, respectively, though neither base-bonding outcome is energetically preferred compared to the desired dimer-bonding outcomes.

TABLE 9

Energy minimization calculations for iodine-capped DCB6-Ge tooltip molecule bonding on 3 × 3 unit-cell single-plane graphite deposition surface, using semi-empirical AM1 (0 eV = lowest-energy configuration) and with all perimeter C atoms immobilized in the flat graphite sheet

| (Tooltip + Surface) Configuration | Illustrated in: | Energy (eV) |
|---|---|---|
| Tooltip over surface (no bonding) | FIG. 7A | 0 |
| 2 bonds to surface at $C_2$ dimer + $I_2$ | FIG. 7B | +2.649 |
| 1 bond to surface at $C_2$ dimer + I | FIG. 7C | +2.056 |
| 1 bond to surface at tooltip base + H | FIG. 7D | +5.414 |
| 2 bonds to surface at tooltip base + $H_2$ | FIG. 7E | +4.382 |

Capping group removal energies from an isolated DCB6-Ge tooltip molecule for a variety of capping groups are estimated computationally (using semi-empirical AM1) as ranging from 1.9-7.4 eV (Table 10), as, for example, 3.554 eV for two iodine capping atoms, 4.728 eV for two amine capping groups, or 7.453 eV for two hydroxyl capping groups. These required energies would be halved when only one capping group is removed during tooltip molecule ion impact with the surface.

TABLE 10

Capping group removal energies for an isolated DCB6-Ge tooltip molecule, including the caps for both carbon atoms in the $C_2$ dimer, estimated using semi-empirical AM1

| Capping Group | Removal Energy (eV) |
|---|---|
| Magnesium (—Mg—)* | 1.989 |
| Phosphohydryl (—PH$_2$ —PH$_2$) | 2.495 |
| Seleniodinyl (—SeI —SeI)* | 2.650 |
| Dimagnesyl (—MgMg—)* | 2.731 |
| Beryllium (—Be—) | 2.936 |
| Sodium (—Na —Na)** | 3.171 |
| Selenobromyl (—SeBr —SeBr)* | 3.265 |
| Hydrogen (—H —H) | 3.308 |
| Bromine (—Br —Br) | 3.521 |
| Berylfluoryl (—BeF —BeF) | 3.528 |
| Iodine (—I —I) | 3.554 |
| Sulfobromyl (—SBr —SBr) | 3.680 |
| Selenohydryl (—SeH —SeH)* | 3.745 |
| Berylchloryl (—BeCl —BeCl) | 3.829 |
| Sulfochloryl (—SCl —SCl) | 3.859 |
| Chlorine (—Cl —Cl) | 3.961 |
| Borohydryl (—BH$_2$ —BH$_2$) | 3.979 |
| Diamine (—NHHN—) | 4.019 |
| Sulfur (—S—) | 4.116 |
| Sulfhydryl (—SH —SH) | 4.141 |
| Sulfiodinyl (—SI —SI) | 4.231 |
| Lithium (—Li —Li) | 4.323 |
| Fluorosulfyl (—SF —SF) | 4.374 |
| Nitrodiiodinyl (—NI$_2$ —NI$_2$) | 4.624 |
| Sulfalithyl (—SLi —SLi) | 4.702 |
| Amine (—NH$_2$ —NH$_2$) | 4.728 |
| Nitrodifluoryl (—NF$_2$ —NF$_2$) | 4.896 |
| Imide (—NH—) | 5.012 |
| Disulfyl (—SS—) | 5.058 |
| Oxygen (—O—) | 5.339 |
| Oxyfluoryl (—OF —OF) | 5.474 |
| Diberyl (—BeBe—) | 5.761 |
| Fluorine (—F —F) | 6.782 |
| Oxybromyl (—OBr —OBr) | 7.063 |
| Oxylithyl (—OLi —OLi) | 7.104 |
| Oxyiodinyl (—OI —OI) | 7.215 |
| Hydroxyl (—OH —OH) | 7.453 |

*energy minimization computed using PM3 instead of AM1
**energy minimization computed using MNDO/d instead of AM1

However, the removal energy for a single passivating hydrogen atom in the base of the tooltip molecule is 3.519 eV for an H atom removed from the bottom of the tooltip molecule base, comparable to many of the capping group removal energies listed in Table 10. Given the random orientation of tooltip molecules upon their arrival at (and impact with) the deposition surface, the sweep of a dilute beam of tooltip molecule ions across the surface will result in a thin scattering of tooltip molecules attached to the surface in a variety of orientations—some bound by two bonds to the uncapped dimer (as desired), others bound by only one bond to a partially uncapped dimer, and others bound directly to the tooltip molecule base in various orientations. Simple inspection of potential impact geometries suggests that energy transfer primarily into the dimer capping group upon impact is most probable if the tooltip molecule arrives at the deposition surface within (conservatively) ±20' of vertical, in tip-down orientation. Therefore the probability of such arrival (assuming a random distribution of tooltip molecule ion orientations in the beam) and hence the probability of a dimer-bonded tooltip molecule (having either 1 or 2 bonds to the surface through the $C_2$ dimer) is roughly $(40°/360°)^2 \sim 1\%$, among all tooltip molecules that become bonded to the deposition surface.

Given a ~1% success rate, after the bombardment process and prior to the commencement of Step 3 the surface should be scanned by SPM to find and record the positions of those few tooltip molecules that are bound to the surface in the desired orientation. Depending upon the number density achieved, undesired tooltip molecule nucleation sites might simply be avoided during tool detachment in Step 4. Surface editing is another approach. Due to the low surface nucleation density (Section 2.2.1), after the aforementioned mapping procedure it may be possible to selectively detach and remove from the surface all attached misoriented tooltip molecules that are detected, e.g., using focused ion beam, electron beam, or NSOM photoionization, subtractively editing the deposition surface prior to commencing CVD in Step 3. A second alternative to subtractive editing is additive editing, wherein FIB deposition of new substrate atoms on and around the misoriented tooltip molecule can effectively bury it under a smooth mound of fresh substrate, again preventing nucleation of diamond at that site during Step 3. A third corrective procedure is reparative editing, wherein the methods described in Attachment Method B (Section 2.2.3) are employed to fully uncap the only partially uncapped tooltip molecule which has become bonded to the deposition surface (through only one carbon atom of the $C_2$ dimer) during the ion bombardment process of Attachment Method A. The result of this editing is that in Step 3, diamond handle structures will grow only on properly-oriented surface-bound tooltip molecules.

The ability of a chemisorbed (covalently bonded) tooltip molecule to migrate across a deposition surface in vacuo depends strongly upon the chemical structure of both tooltip molecule and the deposition surface material, and temperature. For example, spontaneous surface migration of gold atoms on gold surfaces is well known, though this mobility is greatly reduced at low temperatures and possibly also by alloying with silver or in combinations with other carbide resistant substrate materials. On the other hand, Larsson [122] estimates that during conventional diamond CVD on diamond substrate the acetylide radical ($C_2H$) has an energy barrier to migration of 3.6 eV across a clean diamond C(111) surface and the methyl radical ($CH_3$) has an even higher energy barrier to migration of 3.7 eV; on C(100), estimates for migration barriers range from 1.3-1.9 eV for methylene ($CH_2$) radicals [123, 124], 1.1-2.7 eV for methyl radicals [123, 125], and 1.7 eV for ethylene (C=$CH_2$) radicals [124]. Taking migration time from the Arrhenius equation as $t_{migrate}^{-1} \sim (k_B T/h) \exp(-E_{mig}/k_B T)$, where $h=6.63 \times 10^{-34}$ J-sec (Planck's constant) and $k_B=1.381 \times 10^{-23}$ J/K (Boltzmann's constant), then at T=300 K and $E_{mig}=1.1-2.7$ eV, $t_{migrate} \sim 5 \times 10^5$ sec$-3 \times 10^{32}$ sec on diamond substrate, which is very slow. Tooltip molecules have ten times as many atoms per molecule as the aforementioned radicals, hence should exhibit much slower surface migrations at any given temperature.

2.2.3 Tooltip Attachment Method B: Surface Decapping in Vacuo

Tooltip molecules may be bonded to the deposition surface in the desired orientation by non-impact dispersal and weak physisorption on the deposition surface, followed by tooltip molecule decapping via targeted energy input producing dangling bonds at the $C_2$ dimer which can then bond into the deposition surface in vacuo, again creating a low density of preferred diamond nucleation sites (FIG. 8).

The specifics of Attachment Method B in the present invention are as follows.

First, capped tooltip molecules are dispersed and physisorbed onto the deposition surface by any of several methods. These methods may include (but are not limited to): (1) spin coating, in which a suspension of capped tooltip molecules is applied to the center of a spinning wafer of smooth deposition surface material, and subsequently dispersed across the wafer surface; (2) dip coating, in which a wafer of smooth deposition surface material is dipped into a suspension of capped tooltip molecules and slowly withdrawn; or (3) spray coating, in which a suspension of capped tooltip molecules is applied to the wafer of smooth deposition surface material as a fine spray. All three methods have been successfully employed commercially to apply onto a smooth silicon wafer a dilute coating of 100-200 nm diamond particles to a number density of ~1 $\mu m^{-2}$ (~$10^8$ cm$^{-2}$), starting with a suspension of 1 gm diamond particles in 1 liter of isopropanol [126-128], ethanol [82], or methanol [129]. In another analogous application [130], a layer of hydrocarbon molecules is applied to a substrate by the Langmuir—Blodgett technique, whereupon the surface is irradiated with a laser to decompose the layer of molecules at the surface without influencing the substrate; after decomposition the carbon atoms rearrange on the substrate surface to form a diamond-like carbon (DLC) film.

It is well-known that simple adamantane ($C_{10}H_{16}$), though having one of the highest melting points (542 K) of any hydrocarbon, "sublimes readily at atmospheric pressure and room temperature." [60] The enthalpy of sublimation for adamantane is $\Delta H_{subl}=58,810$ J/mole (~0.61 eV/molecule) [131] and the triple point for adamantane is $T_{triple}=733$ K at $P_{triple}=2.7$ GPa [132, 133], hence from the Clausius-Clapeyron equation the partial pressure of solid adamantane ($P_{adam}$) may be estimated as: $\ln(P_{adam})=\ln(P_{triple})+(\Delta H_{subl}/R)(T_{triple}^{-1}-T_{adam}^{-1})=31.37-(7077\ T_{adam}^{-1})$, where R=8.31 J/mole-K (universal gas constant). At $T_{adam}=77$ K ($LN_2$ temperature), the partial pressure of adamantane is only $5 \times 10^{-32}$ atm, or ~1 sublimed adamantane molecule per 200,000 m$^3$ of volume at equilibrium, entirely negligible. However, at 300 K, $P_{adam}=0.024$ atm, or ~1 sublimed adamantane molecule per 1700 nm$^3$ of volume at equilibrium, a substantial sublimation rate.

The capped triadamantane tooltip molecule, being a larger molecule and containing two or more heavy atoms, should be less easily sublimed under ambient conditions. However, these molecules have not yet been synthesized nor are their precise thermodynamic properties known. Taking adamantane as the worst-case scenario, the surface dispersal conditions most certain to work consist of a suspension of capped tooltip molecules in a liquid nitrogen ($LN_2$) carrier fluid, dispersed onto a smooth deposition surface which is maintained at or slightly below 77 K, the boiling point of $LN_2$. After applying the suspension to the deposition surface, the surface temperature may be temporarily elevated to slightly above 77 K to drive off the chemically inert $LN_2$ carrier fluid, leaving only capped tooltip molecules dispersed in vacuo on the cold deposition substrate surface in the energetically preferred equilibrium position shown in FIG. 8A. If the selected capped tooltip molecules have a low or negligible sublimation rate at room temperature, then other higher-temperature suspension fluids may be used which are easily evaporatable and compatible with the underlying substrate, i.e., chemically nonreactive with the underlying substrate material(s). For example, fullerenes including $C_{60}$ and $C_{70}$ have been dispersed onto silicon, silica, and copper surfaces at room temperature using an evaporatable carrier fluid (e.g., toluene), then employed as growth nuclei for microwave plasma diamond film CVD [82].

Second, the capping group must be induced to debond from the $C_2$ dimer in the tooltip molecule via excitation of the =C-cap bond. Some crude methods will not work. For example, if the capping atom is iodine, this atom has a large mass and hence a low frequency of vibration in a C—I bond (e.g., ~5.0×10$^{12}$ Hz at 350 K), so the absorption of a single IR photon of this frequency would add only ~0.02 eV to the bond, which is insufficient to break it. From Table 10, ~1.777 eV is required to break each of the two C—I bonds constituting the capping group of a DCB6-Ge tooltip molecule. This energy corresponds to the absorption of a single 430 THz (~7000 Å) visible red photon. Laser photoexcitation, photodissociation or photofragmentation [11] is commonly used in atom-selective bond breaking to selectively control a chemical reaction, e.g., the photodissociation of iodine atoms from iodopropane ions [134]. Alternatively, the requisite bond-breaking energy can be provided by a beam of electrons, noble element ions, or other energetic neutrals [135-137] directed towards the cooled deposition surface where the capped tooltip molecules reside. Viewed from above in its preferred orientation relative to the deposition surface, the iodine capped tooltip molecule has a cross-sectional area of ~44.42 Å$^2$ of which ~5.05 Å$^2$ represents the cross-sectional area of the iodine capping group, hence the beam of photons or ions carrying the debonding energy will strike the capping group, on average, ~10% of the time that they strike a tooltip molecule at all. Much more selectively, an STM tip can be scanned over the cold deposition surface specifically to break the C—I bond via ~1.5 eV single tunneling electrons [138-140]. For instance, the STM-mediated positionally-controlled single-molecule dissociation of an iodine atom from individual molecules of copper surface-physisorbed iodobenzene ($C_6H_5I$) and diiodobenzene ($C_6H_4I_2$) has been demonstrated experimentally by Hla et al [140]; in the inelastic tunneling regime, lower-energy electrons can also be injected via a resonance state between tip/substrate and the target molecule, breaking the weak C—I bond in iodobenzene without breaking the stronger C—C or C—H bonds [140].

Third, once the capping group has been removed and the dangling bonds have been exposed from the $C_2$ dimer, these bonds can form strong attachments with the deposition substrate surface, thus affixing the tooltip molecule to the deposition surface in the desired tip-down orientation. The energetics of the bond-by-bond decapping procedure for an iodine-capped DCB6-Ge tooltip molecule on a 3×3 unit-cell graphite surface is estimated in FIG. 9 using semi-empirical AM1 simulations which included four unattached atoms (2H, 2I) to permit total atom count to remain constant throughout all substitutions. After each iodine capping atom is removed, the conversion of the dangling $C_2$ dimer bond to a new covalent bond between dimer and deposition surface appears to be energetically favored by 1.574 eV for the first bond and by 1.284 eV for the second bond. However, the presence of stray H or I ions can poison this reaction. For example, the dangling dimer bonds will bond to any H ions that are present, in preference to bonding with the deposition surface, so hydrogen must be excluded from the vicinity of the tooltip molecules during this stage of the process. It would be helpful to include a hydrogen getter in the vacuum chamber to absorb any hydrogens that become separated from the tooltip base. Stray iodine ions have a similar effect so it is helpful to include an intermittent positive-voltage getter plate inside the chamber to periodically attract and collect negative iodine ions as they are released from the tooltip caps. However, if the number of purposely decapped iodine atoms or accidentally debonded hydrogen atoms is on the order of ~10$^5$ cm$^{-2}$ (Section 2.2.1 and Table 6) in a relatively large vacuum chamber, then an encounter between such stray atoms and a surface-bound tooltip molecule, even in the absence of any countermeasures, should be an exceedingly rare event.

The process of energy transfer to the tooltip molecule for the purpose of releasing the capping iodine atoms might also accidentally debond a hydrogen atom from the adamantane base of the tooltip molecule. The energetics of this dehydrogenation during various phases of the bond-by-bond decapping procedure for an iodine-capped DCB6-Ge tooltip molecule on a 3×3 unit-cell graphite surface is estimated in FIG. 10-FIG. 12 using semi-empirical AM1 and including four unattached atoms (2H, 2I) to permit atom count to remain constant during all substitutions.

In the case of a tooltip molecule having no bonds to the surface through the $C_2$ dimer (FIG. 10), that loses one hydrogen atom in the side position of the base, the tooltip molecule has a large energy barrier of 1.319 eV against bonding to the deposition surface through the dangling bond. Unless a stray H or I atom impinges at high velocity and recombines, the dehydrogenated tooltip molecule will remain on the deposition surface in the unreacted state and can later be sublimated off the deposition surface by gentle heating.

In the case of a tooltip molecule having one bond to the surface through the $C_2$ dimer (FIG. 11), that loses one hydrogen atom in the side position of the base, the tooltip molecule has only a small energy barrier (0.063 eV) against bonding to the deposition surface through the dangling bond, so this unwanted double bonding is likely to occur even at $LN_2$ temperatures and cannot later be reversed via gentle heating. Since the barrier is of order $~k_BT$, the configuration change will occur about equally in both directions, producing approximately equal populations of 1-bonded and 2-bonded configurations of tooltip molecules that have lost a single H atom in the side position of the base. These unwanted configurations can be observed by SPM and edited out as previously described. In the unlikely event that a stray H atom impinges and recombines, before the new bond to the deposition surface is established, the original hydrogenated tooltip molecule will be restored.

In the case of a tooltip molecule having two bonds to the surface through the $C_2$ dimer (FIG. 12), that loses one hydrogen atom in the side position of the base, the tooltip molecule has a strong energy preference (2.277 eV) to bond again to the deposition surface through the dangling bond, making a total of 3 bonds to the surface, a configuration that must be removed by post-process editing, or mapped and avoided. As before, the unlikely prior recombination of a stray H atom restores the original hydrogenated tooltip molecule, but impingement of a stray H or I atom before dehydrogenating the base can partially debond the properly 2-bonded tooltip molecule from the deposition surface. While the activation energy barrier to this reaction may be large, even preventative, the existence of such pathways emphasizes the need to minimize the number of stray H and I atoms that are present in the vacuum chamber during the tooltip molecule attachment process.

Once a tooltip molecule has established at least one strong bond to the deposition surface, its surface mobility should be extremely low (Section 2.2.2). However, prior to such bonding these molecules are only physisorbed to the surface. Isolated pairs of iodine-capped DCB6-Ge tooltip molecules placed in tip-to-tip, tip-to-base, tip-to-side, and base-to-base orientations show weak energy barriers (calculated using semi-empirical AM1) between these configurations of only 0.05-0.09 eV (vs. 0.04 eV for (300 K) room temperature, 0.007 eV for (77 K) $LN_2$ temperature), with just a slight preference for the base-to-base orientation. Tooltip molecules placed near each other and tooltip molecules placed several molecule widths apart in the same orientation show almost no energetic preference with separation distance, so tooltip molecules should be distributed randomly across the cold deposition surface. By varying the choices of tooltip molecule, capping group, deposition surface materials, and deposition surface temperature, the speed of tooltip molecule migration across the deposition surface can be made almost arbitrarily slow.

The enthalpy of sublimation for molecular iodine ($I_2$) is $\Delta H_{subl}$=60,800 J/mole (~0.63 eV/molecule) and the vapor pressure over the solid is 6060 Pa at 100° C. [141], hence from the Clausius-Clapeyron equation the partial pressure of solid iodine ($P_{iodine}$) may be estimated as: $\ln(P_{iodine})$~28.32−(7316 $T_{iodine}^{-1}$). At $T_{iodine}$=77 K ($LN_2$ temperature), the partial pressure of iodine is only $1 \times 10^{-34}$ atm but at room temperature ($T_{iodine}$=300 K) the partial pressure $P_{iodine}$=0.0005 atm, hence any stray iodine that remains physisorbed to the deposition surface after the completion of the decapping procedure may be driven off by gentle heating and sublimation.

2.2.4 Tooltip Attachment Method C: Solution Chemistry

Tooltip molecules may be bonded to the deposition surface in the preferred orientation using the techniques of conventional solution-phase chemical synthesis, creating a low density of preferred diamond nucleation sites (FIG. 13).

The specifics of Attachment Method C in the present invention are as follows.

First, the deposition surface is functionalized with an appropriate functionalization group. For illustrative purposes, FIG. 13A shows a section of (10,0) single-walled carbon nanotube (CNT) with a functional group "X" attached at the para-isomer positions (1 and 4) in one of the 6-carbon rings in the graphene surface. A capped tooltip is shown above this surface. For this invention, the functionalized deposition surface could also be a flat graphene surface (i.e., graphite), or could be a functionalized non-graphene surface such as silicon, germanium, gold, and so forth (see Table 7). Graphite is attacked by strong oxidizing agents (such as sulfuric+nitric acid, or by chromic acid) [142], allowing the random surface functionalization of graphene; also, the chemical functionalization of fullerenes is well-studied [143-148]. Since site-specific functionalization may not be strictly required in all cases, e-beam irradiation of dilutely surface-dispersed moieties, ion-beam implantation of functional-group ions, electrochemical functionalization [149, 150], or other related techniques could be employed in some cases to attach functional groups on the deposition surface at very high dilution, e.g., at 1 micron separations. However, direct chemical modification of surfaces via SPM tip [39, 140] enables the functionalization of the deposition surface at specific atomic sites, in cases where this is necessary.

Second, conventional techniques of chemical synthesis are employed to establish conditions in solution phase whereby the tooltip molecule capping group, illustrated in FIG. 13 by iodine, combines with the deposition surface functionalization group, here illustrated as "X", resulting in the removal of both I and X, leaving the tooltip molecule chemically bound to the deposition surface across two bonds at the carbon $C_2$ dimer as shown in FIG. 13B—much like the standard esterification reaction wherein an alcohol molecule having a terminal —OH group combines with a second organic acid molecule having a terminal —H group, creating a C—C covalent bond between the two molecules (an ester) with the release of an $H_2O$ in the process. It is possible that a specific convenient alkenation reaction can be found in the standard chemical synthesis literature, perhaps as an analog to the synthesis pathways for bicyclooctene (FIG. 13C) or more directly as an analog to methods that may already be known for the alkenation (ethenation) of graphite, CNTs, or other deposition surfaces such as Si, Ge, or Au. The attachment reaction could be enhanced in the case of a nanotube deposition surface by using a kinked CNT, then anticipating the tooltip to preferentially attach at the kink site where CNTs are most reactive [151].

Density functional theory (DFT) analysis [152] has considered cycloadditions of dipolar molecules to the C(100)-(2×1) diamond surface. Experiments [153] have demonstrated the [2+4]cycloaddition of benzyne ($C_6H_4$) to polycyclic aromatics such as anthracene, forming triptycene (FIG. 13D). DFT studies [154, 155] of the possible cycloaddition reaction of ortho-benzyne molecules to the graphene walls of carbon nanotubes have been done (FIG. 13E and FIG. 13F). There have also been experimental investigations of solution-phase cycloaddition of organic molecules to semiconductor surfaces [156] and studies of diamondlike carbon films grown in organic solution [157] or grown via the electrolysis of acetates in solution phase [158]. Hoke et al [159] and others [160] have examined the reaction path for ortho-benzyne with $C_{60}$ and $C_{70}$ that leads to the [2+2]cycloaddition product in which benzyne adds across one of the interpentagonal bonds, forming a cyclobutene ring.

Giraud et al [161-163] have synthesized 2,2-divinylada-mantane (DVA), a single-cage adamantane molecule with two vinyl (—CH=$CH_2$) groups bonded to the same carbon atom in the cage, then dispersed this molecule onto a polished hydrogen-terminated Si(111) surface. Upon exposure to UV irradiation, photochemical double hydrosilylation occurs, fixing the adamantane molecule through two —C—C— tethers to two adjacent silicon atoms on the Si(111) surface with minimal steric strain. A rinse with ethanol, deionized water, and a 10 minute sonication with dichloromethane removed all ungrafted or physisorbed DVA. All adamantane molecules that become tethered to the surface via two bonds adopt the identical geometric orientation relative to the surface. Giraud et al [162] note that formation of the C—Si bond between the adamantane molecule and the silicon surface can be achieved by adapting any one of several commonly known techniques, including radical mediated hydrosilylation of olefins with molecular silanes [165-167], photochemical hydrosilylation of olefins with trichlorosilane [168], or hydrosilylation of olefins catalyzed by transition metal complexes [169-173].

2.3 Step 3: Attach Handle Structure to Tooltip Molecule

STEP 3. Attach a large handle molecule or other handle structure to the deposition surface-bound tooltip molecule created in Step 2. There are two general methods that may be used to accomplish this: nanocrystal growth (Section 2.3.1) and direct handle bonding (Section 2.3.2).

2.3.1 Handle Attachment Method A: Nanocrystal Growth

In Method A, a bulk diamond deposition process (see below) is applied simultaneously to the entire tooltip-containing deposition surface (e.g., ~1 $cm^2$) created in Step 2. The adamantane (diamond nanocrystal) base of each bound tooltip molecule serves as a nucleation seed from which a large diamond crystal will grow outward, in preference to growth on areas of the deposition surface where tooltip nucleation seed molecules are absent (FIG. 14). Deposition should proceed until a sufficient quantity of bulk diamond crystal has grown outward and around the tooltip seed molecule such that the tooltip and its newly grown handle can be securely grasped by a MEMS-scale manipulator mechanism. The deposition process should be halted before adjacent growing crystals merge into a single film. As noted in Section 2.2, the number density of tools on the surface is controlled by limiting the number density of tooltip seed molecules attached to the deposition surface during Step 2. As distinguished from the more complex ex post strategy of chemically attaching a capped tooltip molecule to a larger prefabricated handle molecule, in the process described here the handle is grown directly onto the surface-bound tooltip, creating an optimally rigid and durable unitary mechanosynthetic tool structure. Alternatively and less preferred, the growing diamond crystal handle structure can be covalently bonded to some other appropriate large rigid structure such as a CNT, tungsten, or diamond-shard AFM tip, or an EBID/FIB-deposited metal or carbon column, e.g., by growing a vertical column of DLC atop the properly oriented tooltip molecule using a focused beam of hydrocarbon or $C^+$ ions [114-118].

The most useful bulk deposition process is conventional diamond CVD, wherein micron/hour or faster deposition rates are typically demonstrated experimentally. The initial deposition rate onto the starting seed may be slow, but this rate should rapidly increase as more of the diamond handle structure is laid down during the deposition process which will require times on the order of hours. Traditional high-temperature CVD uses a large excess of atomic hydrogen which will etch a graphite or graphene surface, but CVD diamond can be deposited slowly at temperatures as low as 280-350° C. if necessary using the nonhydrogenic Argonne Lab $C_{60}/C_2$-dimer approach [175, 176] (Section 1.1(C)) which uses very little atomic H, in which case graphene etching would no longer be a serious problem. (Thermal suppression of nucleation at 1000° C. has been discussed by McCune [3].)

Conditions in vapor deposition of thin films require a critical nucleus size only on the order of a few atoms [177]. Under these conditions the free energy of formation of a critical nucleus may be negative [177] and the surface energy contribution may cause a reverse effect on the graphite-diamond phase stability [178, 179], a situation called nonclassical nucleation process [177]. Simple thermodynamic calculations by Badziag et al [180] and others [178, 179] have confirmed that hydrogen-terminated diamond nuclei <3 nm in diameter should have a lower energy than hydrogen-terminated graphite nuclei with the same number of carbon atoms, and that for surface bonds terminated with H atoms, diamonds smaller than ~3 nm are energetically favored over polycyclic aromatics (the precursors to graphite).

In 1983, Matsumato and Matsui [19], and later in 1990, Sato [20] and Olah [21], suggested that hydrocarbon cage molecules such as adamantane, bicyclooctane, tetracyclododecane, hexacyclopentadecane, and dodecahedrane could possibly serve as embryos for the homogeneous nucleation of diamond in gas phase. The adamantane molecule ($C_{10}H_{16}$) is the smallest combination of carbon atoms possessing the diamond unit structure, i.e., three six-member rings in a chair conformation. The tetracyclododecane and hexacyclopentadecane molecules represent twinned diamond embryos that were proposed as precursors to the five-fold twinned diamond microcrystals prevalent in CVD diamond films—from simple atomic structure comparisons, the diamond lattice is easily generated from these cage compounds by simple hydrogen abstraction followed by carbon addition [7]. However, in one experiment adamantane placed on a molybdenum deposition surface during acetylene-oxygen combustion CVD failed to nucleate diamond growth [181], possibly due to "a fast transformation of adamantane on molybdenum to molybdenum carbide under diamond growth conditions."

The first successful demonstration of the ability of surface-bound single-cage adamantane molecules to serve as nucleation seeds for diamond CVD was achieved experimentally by the Giraud group [161-164] during 1998-2001. In this process, a special seed molecule-2,2-divinyladamantane (DVA), a single-cage adamantane with two vinyl (—CH=CH$_2$) groups bonded to the same carbon atom in the cage—is synthesized using conventional solution phase techniques [161], then dispersed onto a polished hydrogen-terminated Si(111) surface. When a surface prepared in this way is subjected to microwave plasma CVD using an H$_2$-rich 1% CH$_4$ feedstock gas at 40 mbar and 850° C. for 2 hours, only a few diamond grains are observed during subsequent SEM inspection, with a nucleation density below ~$10^4$ cm$^{-2}$ [163]. However, when the surface is additionally exposed to UV irradiation from a xenon arc lamp for 24 hours prior to CVD, photochemical double hydrosilylation occurs, fixing the seed molecule via two —C—C— tethers to two adjacent silicon atoms on the Si(111) surface with minimal steric strain. With the seed molecule thus tethered to the silicon surface, the CVD process is then run again as previously described, this time resulting in a diamond nucleation density that rises to ~$10^9$ cm$^{-2}$ and producing a very homogeneous diamond size of ~2 microns [163] (indicating essentially all adamantane-based nucleations), as shown in FIG. 15.

Giraud et al [163] notes that although the treatment should densely cover the surface with covalently bound adamantane seed molecules, "the subsequent CVD plasma conditions will remove all the singly and presumably a few doubly attached molecules. The fact that nucleated diamonds were effectively obtained . . . shows the stability of grafted DVA in the nucleation conditions. All the samples treated without . . . UV . . . suffered no nucleation. This nucleation method therefore offers, on top of the advantage of flexibility and mildness, the possibility of photolithographic nucleation: diamonds adopt a homogeneous spatial repartition in the center of the irradiated region, with a well-faceted shape due to their cubic structure, while nucleation density sharply decreases to ~$5 \times 10^6$ cm$^{-2}$ on the brink of the irradiated region without even using a light mask." In sum, doubly bonded adamantane seed molecules nucleate the growth diamond "handle" crystals, whereas singly bonded or unbonded seed molecules are removed by the hot CVD process and thus produce no crystal growth.

Even though the core of the tooltip molecule is iceane (the unit cell of hexagonal diamond or lonsdaleite) and not pure adamantane as in conventional cubic diamond crystal, lonsdaleite can also be grown experimentally [73-76]. The Raman spectra of lonsdaleite has been reported [182] and detected in localized stacking defect domains in textured CVD films [183]. Crystals of hexagonal diamond have been prepared in both static and shock high-pressure laboratory experiments [184, 185], and directly from cubic diamond [186]. Lonsdaleite can also be reliably synthesized [187] using rf-assisted plasma CVD and pure acetylene gas as the carbon source with no hydrogen—Roul et al [188] reports that crystallites grown on Si(100) substrates consisted mainly of polytypes of hexagonal diamond with a little cubic diamond and a few higher-order hydrocarbon phases, and others have found diamond polytypes in CVD diamond films [189]. Both cis and trans boat-boat bicyclodecane and related multiply-twinned compounds have been suggested as possible lonsdaleite nucleators based on the presence of both boat and chair hexagonal carbon rings [190, 191]. Twinning—the stacking of alternating (as in lonsdaleite) or arbitrarily-ordered re-entrant and intersecting chair and boat planes—is commonly seen in CVD diamond [191-195]. A semi-empirical theoretical analysis of the lonsdaleite structure by Burgos et al [196] gives results in reasonable accord with the limited experimental data. L. V. Zhigilei et al [197] note that intermediate states during the reconstruction of the C(111) surface of cubic diamond can lead to growth processes which result in the formation of a stacking fault, or twin plane [198-200], which could in turn produce lonsdaleite [201], and other transition mechanisms have been proposed [202].

As noted by Battaile et al [203], experimentally grown CVD diamond crystallites can exhibit C(100) and C(111) facets [204-206]. The C(110) surfaces are not usually observed (except in (110)-oriented homoepitaxy [207, 208]) because they grow much faster than the C(111) and C(100) faces [204, 210], hence are normally terminated by (100) and (111) facets. Diamond deposition rates in a hot-filament CVD reactor at 1200 K from methyl radical are typically 1.3-2.0 μm/hr for C(110) [209, 210] but only 0.5 μm/hr for C(111) and just 0.4-0.5 μm/hr for C(100) [209-212]. With the tooltip molecule bound to the deposition surface in a preferred orientation (i.e., tip-down), the C(110) plane is angled at 45° from vertical, leaning away from the vertical centerline; the C(100) plane is also angled at 45° from vertical, but leans toward the vertical centerline; the C(111) plane goes straight up along the centerline. So under CVD deposition, the tool handle structure will grow fastest outward at 45°. The C(100) plane will be buried inside the tool, and the tool handle crystal will exhibit C(110) facets on the sides and a C(111) facet on the top. (Plasma CVD diamond crystallites grown on Si(100) wafers also display a combination of C(111) and C(110) facets [6].) Note that while lonsdaleite has a repeating structure, here we should expect only a single twinning fault at the centerplane, not a series of repeating twinnings.

Diamond films have been formed by immersing a substrate in a fluid medium comprising a carbon-containing precursor and irradiating the substrate with a laser to pyrolyze the precursor, a technique that could also be adapted to grow diamond handle structures onto isolated surface-bound tooltip molecules. For example, Hacker et al [213] describe a process in which gas containing an aliphatic acid or an aromatic carboxylic anhydride that vaporizes without decomposition is passed over a substrate and irradiated with a focused high-powered pulsed laser, depositing a diamond film. In the process disclosed by Neifeld [214], the substrate is immersed in a liquid containing carbon and hydrogen, e.g. methanol, and a laser pulse is then directed through the liquid coating to heat the substrate. The liquid is pyrolyzed and carbon material from the pyrolyzed liquid grows on the substrate to form a diamond coating on the substrate. Yu [130] applies a hydrocarbon layer to a substrate by the Langmuir—Blodgett technique, then irradiates the surface with a laser (or e-beam, x-rays, etc.) to decompose the layer of molecules at the surface without influencing the substrate; after decomposition, the carbon atoms rearrange on the surface of the substrate to form a DLC film. Bovenkerk et al [4] proposes using an unusual dual gas approach to CVD in which, for example, a hydrogen ($H_2$) or methane ($CH_4$) feedstock gas is alternated with a carbon tetraiodide ($CI_4$) feedstock gas, with each exposure resulting in the deposition of a new diamond monolayer on an existing diamond substrate, and alternative lower-temperature CVD gas chemistries are being investigated such as use of $CO_2$-based [215] or halogen-containing [216] gas mixtures. Finally, laser heating of solid $CO_2$ at 30-80 GPa pressure causes the molecule to decompose into oxygen and diamond, revealing a new region of the $CO_2$ phase diagram with a boundary having a negative P-T slope [217].

There are several other lesser-known alternatives to CVD, ion beam deposition, and laser pyrolysis which might also be adapted for growing the handle structure onto the surface-bound tooltip molecule. Diamond film prepared by physical vapor deposition has been described by Namba et al [218]. Liquid-phase diamond synthesis in boiling benzene or in molten lead was reported as early as 1905 [219], and more recently, a 2% yield of diamond from carbon tetrachloride in liquid sodium at 700° C. [220], the electrochemical growth of diamond films below 50° C. in liquid ethanol [157] and in solutions of ammonium acetate in liquid acetic acid [158], and also the hydrothermal synthesis of diamond [221].

A final consideration is the overall temperature stability of the bound tooltip molecule under the conditions of CVD growth and related processes. One concern is that the tooltip molecule might destabilize if heated to CVD temperatures. Pure adamantane graphitizes at >480° C. [60], and early thermodynamic equilibrium calculations [222, 223] showed that these and similar low molecular weight hydrocarbons are not stable at high temperatures (>600° C.) in the harsh CVD environment. Another concern is that at elevated temperatures, the tooltip molecule might debond from the deposition surface. However, the work of the Giraud group [161-164] with the 2,2-divinyladamantane nucleation molecule for diamond CVD confirms experimentally that adamantane molecules having two tethers to a silicon deposition surface can survive at least 2 hours of CVD conditions at 850° C. without destabilizing or detaching from the surface, although adamantanes with only one or no bonds to the surface evidently may be detached or destroyed at these temperatures. Table 8 gives the release energy ($E_J$-$E_{DoT}$) for a decapped tooltip molecule bound to a Ge deposition surface as ~4.7 eV. If the activation energy (reaction barrier) is of similar magnitude, then from the Arrhenius equation (Section 2.2.2) the mean detachment time for a decapped tooltip molecule bound to a Ge deposition surface at 850° C. is ~5×10$^7$ sec (>1 year). For some deposition surface materials the tooltip release energy (and reaction barrier) can be considerably lower, so it may be necessary to employ a lower-temperature CVD process to obtain an acceptably long thermal detachment time for some substrates. Successful low-temperature CVD of diamond crystallites or DLC films has been reported at temperatures as low as 250-750° C. [224], 280-350° C. [175, 176], 300-500° C. [116], 350-600° C. [128], >400° C. [110], and <500° C. [10].

2.3.2 Handle Attachment Method B: Direct Handle Bonding

In Method B, an SPM-manipulated dehydrogenated diamond shard having a flat or convex tip is brought down vertically onto a surface upon which tooltip molecules are attached. Retraction of the tip pulls the tooltip molecule off the surface, yielding a finished tool for diamond mechanosynthesis consisting of a tooltip molecule mounted on the diamond shard with an active $C_2$ dimer exposed at the tip, as illustrated in FIG. 16.

The specific sequence of events is as follows:

(1) Prepare tooltip molecules. Bond tooltip molecules to the deposition surface in the preferred orientation, as described in Step 2 (Section 2.2).

(2) Mount diamond AFM tip. Mount a diamond shard as the working tip of an AFM. The apex of the shard should be flat or convex in cross-section, and the apical tip surface of the shard should expose the diamond C(110) crystal face.

(3) Depassivate AFM tip. The AFM tip is baked in vacuo at >1300 K to completely dehydrogenate the entire diamond shard, including most importantly its C(110) apical tip surface. The C(110) surface does not reconstruct during thermal depassivation [225].

(4) Lower tip onto surface. The depassivated diamond shard tip is positioned perpendicular to the deposition surface upon which the tooltip molecules are affixed in the preferred orientation. The shard tip is then lowered toward the deposition surface (FIG. 16A), in vacuo at room temperature.

(5) Bind shard to tooltip molecule. As the apical tip surface of the diamond shard reaches and contacts the deposition surface, the many dangling bonds at the C(110) crystal face of the apical tip surface bond with several carbon atoms in the base of a tooltip molecule, displacing several passivating hydrogen atoms which migrate to nearby dangling bonds on the diamond shard apical tip surface (FIG. 16B).

(6) Retract tip from surface. The diamond shard is retracted from the deposition surface in the vertical direction. The tooltip molecule is more strongly bonded to the shard, so the vertical retraction of the shard causes the two bonds to the deposition surface through the $C_2$ dimer to break (FIG. 16C), creating an active $C_2$ dimer radical exposed at the apical tip surface of the shard. The diamond shard is now an active tool that can be employed in diamond mechanosynthesis.

The process for manufacturing a mechanosynthetic tool via Method B is preferred when ease of manufacturing process is a primary concern, while Method A is preferred when accuracy and predictability are primary concerns.

2.4 Step 4: Separate Finished Tool from Deposition Surface

STEP 4. Mechanically grasp and break away the diamond crystal-handled tool from the deposition surface, in vacuo. The covalent bond between the tooltip (through the $C_2$ dimer) and the surface will mechanically break (Table 8), yielding either a tool with a naked carbon dimer attached (i.e., a charged, active mechanosynthetic tool; FIG. 17A) or a tool with no dimer attached (i.e., a "discharged" tool needing recharge, e.g., with acetylene; FIG. 17B). Ideally, the tooltip forms only weak van der Waals bonds to the deposition surface, so tool breakaway produces few or no unwanted dangling bonds near the active tip. If deemed necessary, each tool can be further machined or shaped via laser-, e-beam-, or ion-beam-ablation to provide any desired aspect ratio for the finished tool, or to provide any necessary larger-scale features on the handle surface such as slots, grooves, or ridges, prior to separation of the tool from the surface. This toolbuilding process should work for any carbon dimer deposition tooltip of similar type, as long as the capping group and the deposition surface are judiciously chosen for each case. Note also that the discharged dimer deposition tool can often be employed as a dimer removal tool [38], at least in the case of isolated dimers on a mechanosynthetic workpiece, permitting limited rework capability during subsequent mechanosynthetic operations using the tools produced by the present invention.

Following the completion of Step 3 but prior to the commencement of Step 4, the mechanosynthetic tools grown on the deposition surface in Step 3 may be stably stored indefinitely at room temperature under an inert atmosphere. Prior to the commencement of Step 4, the deposition surface containing the bound tools should be baked in vacuo at a temperature high enough to drive off any physisorbed impurities that may have accumulated on the surface or handle structure during storage, but at a temperature low enough to avoid significant dehydrogenation of the diamond handle crystal. Hydrogen desorption becomes measurable at 800-1100 K for the C(111) diamond surface [226], 1400 K for the C(110) surface [227], and possibly as low as 623 K for the C(100) surface [228]. Taking $T_{bake}$=600 K and the dimer-to-surface C—C bond energy $E_{bond}$=556 zJ [32], then the minimum thermal detachment time is given by the Arrhenius equation as $t_{detach}$~$[(k_B T_{bake}/h)\exp(-E_{bond}/k_B T_{bake})]^{-1}$=1.1×10$^{16}$ sec, where h=6.63×10$^{-34}$ J-sec (Planck's constant) and $k_B$=1.381×10$^{-23}$ J/K (Boltzmann's constant).

The minimum force required to break a C—C bond in a characteristic bond cleavage time of ~0.1 ns at 300 K is estimated as ~4.4 nN and ~4.0 nN for a C—Si bond, and the threshold stress for breaking two C—C bonds "mechanically constrained to cleave in a concerted process" is ~6 nN per bond [32]. Hence the force required to simultaneously break both of the bonds between the two tooltip dimer carbon atoms and the two deposition surface atoms to which they are attached, during tool separation in Step 4, is likely on the order of 8-12 nN. However, a much larger van der Waals attraction may exist between the diamond tool handle crystal and the deposition surface. For example, two opposed hydrogenated diamond C(111) surfaces equilibrate at ~2.3 Å separation, according to a simple molecular mechanics (MM+) simulation. Assuming no additional covalent bonds have formed between tool and deposition surface except through the $C_2$ dimer at the tooltip, two planar surfaces of area A~1 µm$^2$ with Hamaker constant H~300 zJ (i.e., diamond, Si, Ge, graphite, metal surfaces) separated by a distance s~2.3 Å experience an attractive force [32, 93] of F~HA/12πs$^3$~650,000 nN. Even if the contact interface is only 100 nm$^2$ the attractive force is still F~65 nN, an order of magnitude larger than the force required to break each of the two covalent bonds between deposition surface and $C_2$ dimer. The separation force required to snaphthe finished tool free from the deposition surface, assuming no rogue covalent bonds, is therefore on the order of 10$^2$-10$^6$ nN. For comparison, the force of gravity on a 1 µm$^3$ diamond crystal is ~0.00003 nN and the force from a 10,000-g shock impact acceleration (e.g., dropping object on concrete floor) produces a lateral accelerative force of only 0.3 nN.

Additionally, the flexural strength of diamond is 23 times greater than that of silicon, permitting much greater forces to be applied to the tool handle element without breakage; if the diamond handle crystal should contact the substrate which it overhangs, its low coefficient of static friction ensures that the diamond crystal will not adhere to the substrate [18]. Note that in one combustion CVD experiment with adamantane-seeded diamond growth on Mo (a carbide-forming surface; Table 7) [181], it was observed that "the diamond crystals show a low adhesion on the molybdenum substrate." Differential thermal expansion during post-CVD cooling causes the built tool and the deposition surface to shrink differently, creating stresses and possibly prematurely breaking off the tool; a similar technique allows a grown diamond film to separate as an integral diamond sheet on cooling.

The need to securely grip and apply forces against mechanical resistance during the tool separation process, while retaining precise positional knowledge in all coordinate and rotational axes, imposes specific operational requirements for the gripper and manipulator system. Since the bondlength between $C_2$ dimer and deposition surface is ~1.5 Å, and since these bonds cannot tolerate excessive stretching before breaking, the manipulator system should have a repeatable positioning resolution of at least $\Delta R_{min}$~2 Å. Subsequent mechanosynthetic operations on diamond surfaces will likely require repeatable positional accuracies of at least 0.5 Å, and in some cases as little as 0.2 Å [38], or about tenfold better than for mere tool separation alone. Since handle crystals are of slightly different size, shape, and orientation, it is also important to avoid excessively rotating the handle as it is being grasped in preparation for tool separation from the deposition surface. A handle crystal of radius $R_{handle}$=1 µm and a minimum allowable displacement of $\Delta R_{min}=2$ Å implies a minimum allowable rotation of $\Delta\theta_{min}=\sin^{-1}(\Delta R_{min}/R_{handle}) \sim 200$ μrad, or 20 μrad for mechanosynthesis operations where $\Delta R=0.2$ Å. A further requirement is the ability of the manipulator to apply incremental forces along various translational or rotational vectors of $\Delta F_{min}=10^2\text{-}10^6$ nN.

A preferred device for separation of the tool from the deposition surface has one or more of the following characteristics: capable of achieving a rotational accuracy of $\Delta\theta_{s100}=2$ grad $<<\Delta\theta_{min}=20\text{-}200$ grad, repeatable positional accuracy of ~2 Å for controlled tool separation and ~0.2-0.5 Å for accurate mechanosynthesis. Exemplary devices having one or more of these characteristics include the S100 Nanomanipulator™ [229] commercially available from Zyvex Corporation and the Klocke Nanotechnik Nanomanipulator. Further, the grippers of the S100 Nanomanipulator™ provide a maximum gripping force of 550,000 nN~$\Delta F_{min}$, which should be adequate in most cases. In a somewhat different context, scanning with AFM tips may be undertaken with a ~0.1 Å accuracy. By premeasuring the exact positions of all viable tooltip molecules attached to the deposition surface, and then carefully tracking all positional and rotational motions that are subsequently applied to the tool, the exact 3D spatial position of the active tool dimer may be continuously estimated with sufficient accuracy.

Once the completed mechanosynthetic tool has been detached from the deposition surface, the exposed $C_2$ dimer radical is extremely chemically active. According to an AM1 simulation, an activated DCB6-Ge tooltip is energetically preferred to combine with incident $O_2$ molecules by 6.7 eV and with incident $N_2$ molecules by 2.8 eV, the principal constituents of air, the most likely environmental contaminant. Since any laboratory vacuum is imperfect, stray atoms, ions, and molecules will populate the vacuum chamber at some low concentration and will eventually impinge upon an unused active tooltip, reacting with it and rendering it useless for further mechanosynthetic work.

Using the standard formula for molecular incident rate [231], the mean lifetime $\tau_{tool}$ of an active DCB6-Ge tooltip exposed to vacuum with a partial pressure $P_{atm}$ of contaminant molecules having molar mass $M_{molar}$ (kg/mole) at temperature T, is given by: $\tau_{tool}=(N_{hits}V_{molar}/A_{target}P_{atm}N_A)$ $(\pi M_{molar}/2k_B T N_A)^{1/2}$(seconds), where the number of encounters between an active tooltip and a contaminant molecule that are required to deactivate the tooltip is taken as $N_{hits}=1$, the molar gas volume $V_{molar}=22.4141\times10^{-3}$ m³-atm/mole, $A_{target}\sim 2$ Å² is the cross-sectional area of the exposed $C_2$ dimer impact target (analogous to the room temperature dimer atom positional uncertainty footprint described in [38]), T=77 K ($LN_2$ temperatures), $N_A=6.023\times10^{23}$ molecules/mole (Avogadro's number), and $k_B=1.381\times10^{-23}$ J/K (Boltzmann's constant). Expressing pressure as $P_{torr}=760$ $P_{atm}$ in torr and rearranging terms, then $P_{torr}=(2.2\times10^{-6})/\tau_{tool}$ (torr) for hydrogen atoms (H) having molar mass $M_{molar}=1\times10^{-3}$ kg/mole; also, $P_{torr}=(1.2\times10^{-5})/\tau_{tool}$(torr) for nitrogen molecules ($N_2$) having molar mass $M_{molar}=28\times10^{-3}$ kg/mole and $P_{torr}=(1.3\times10^{-5})/\tau_{tool}$(torr) for oxygen molecules ($O_2$) having molar mass $M_{molar}=32\times10^{-3}$ kg/mole, the two most likely contaminant molecules from the ambient environment. To ensure a mean tooltip lifetime of $\tau_{tool}=1000$ sec requires maintaining a partial pressure $P_{torr}\leq 2.2\times10^{-9}$ torr for H atoms, $P_{toor}<1.2\times10^{-8}$ torr for $N_2$ and $P_{torr}\leq 1.3\times10^{-8}$ torr for $O_2$. Ultrahigh vacuums (UHV) of $10^{-7}\text{-}10^{-10}$ torr have been commonly accessible experimentally for many decades [232], and vacuums as high as $10^{-15}$ torr have been created in the laboratory [233].

Example 1

Stability of $C_2$ Mediated Growth of Nanocrystalline Diamond C(110) Surface

The present example provides an investigation of the gas-phase chemical vapor deposition growth and mechanosynthesis of clean diamond C(110) surfaces from carbon dimer precursors. A detailed atomic picture of the dimer-mediated surface chemistry during the gas-phase growth of diamond C(110) from $C_2$ plasmas is provided, and some of the stabilized defects that can form early in the dimer-mediated diamond growth process are deduced. These results provide information regarding outcomes of the misplacement of a carbon dimer and establish constraints on the required dimer-placement positional precision that would be needed to avoid the formation of stable defects during surface growth.

Computational Methods: All calculations were performed using plane wave-based density functional theory (DFT). The software for computation was the Vienna ab initio Simulation Package (VASP) (Kresse, G., et al., *Vienna Ab-initio Simulation Package (VASP): The Guide*, VASP group, Institut fur Materialphysik, Universitat Wien, Vienna, Austria (2003)). The generalized gradient approximation (GGA) using Perdew-Wang 91 (PW91) pseudopotentials generated with conventional local density approximation (LDA) reference configurations was utilized in the calculations. The energy cutoff of 211.29 eV for pseudopotential was adopted throughout. The criterion of energy convergence for SCF loop (optimizing wavefunction) was $1\times10^{-5}$ eV, and the criterion for geometry optimization was $1\times10^{-3}$ eV.

The clean diamond C(110) surface was modeled as a 4-layer carbon atom slab consisting of 96 carbon atoms and 24 hydrogen atoms (just fitting the unit cell of the computational system), with the bottom carbon layer saturated with a layer of hydrogen atoms. The surface is a flat symmetric (1×1) structure with 2 troughs. The flat surface of the model was placed parallel to the xy (z=0) plane with the minimum z coordinate set to zero. The dimensions of the unit cell of the system (box dimensions) are 10.6840 Å in the x direction, 10.0835 Å in the y direction and 15.0000 Å in the z direction. Before calculating the stationary points of surface growth, the geometry of the surface model was fully optimized. The stationary points were found by placing one or more carbon dimers on several selected initial positions within a trough on the dehydrogenated diamond C(110) surface model, then relaxing the system to the minimum energy structure. During the geometry optimization, the bottom layer of the four carbon layers and all terminating hydrogen atoms, a total of 48 atoms, were frozen. To estimate the barriers from a local minimum to the global minimum, the following approaches were used depending on the individual situation. Most often, the pertinent dimer of a local minimum was raised or lowered with a step size of 0.05 or 0.1 Å along the z axis (vertically). At each step, the z coordinate of both ends or one end of the relevant dimer was fixed and the system was then relaxed. If a climax occurred along the path, then the fixed z coordinate of the dimer of the relaxed structure just past the climax in the raising/lowering series was released and that structure was further optimized. If the geometry optimization led to either the global minimum or an intermediate local minimum, then the energy difference between the climax and the local minimum is taken as the barrier from this local minimum to either the global minimum or the intermediate local minimum. In some cases, the same procedure was used, but the fixed coordinate and scanning axis was x or y instead of z. In rare situations, linear interpolation of coordinates between a carbon atom of reactant structure and a carbon atom of product structure that are separated most significantly was used. In this approach, the carbon atom of reactant structure was moved along the corresponding virtual line with one coordinate (x, y or z) fixed during the geometry optimization of the series of interpolating points. If a climax was found and the point just past the climax relaxed to the product or to an intermediate local minimum after releasing the fixed coordinate, then the barrier was estimated as the energy difference between the climax and the reactant structure.

Results: Results are presented from computational studies of carbon dimer adsorption onto the clean diamond C(110) surface. Global and local minima, as well as the transition states connecting them, are determined for the sequential adsorption of one, two or three carbon dimers onto the clean C(110) surface. As many of the local minimum energy states as possible were identified, with a primary focus on low-lying local minima and stabilized defect states. A defect is identified as any configuration separated from the global minima by thermally inaccessible kinetic barriers (or one that requires the traversal of a high energy pathway to reach the global minimum). This study assumes a thermally equilibrated room temperature environment, so kinetic barriers on the order of 0.5 eV or higher can be assumed to be inaccessible at temperatures at or near 300 K.

1-Dimer Stationary Points (1-Dimer GM1): The computation shows that if a carbon dimer is positionally deposited within a trough of a clean diamond C(110) surface, it relaxes to the global minimum structure easily. A single 1-dimer local minimum (LM1) structure was found which is 0.34 eV higher than the 1-dimer global minimum (GM1) in total energy. The energy barrier (E†) from the local minimum to the global one is only 0.01 eV:

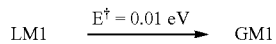

The geometries of global and local minima shown in FIG. 18A and FIG. 18B are in good agreement with the work of Sternberg et al. (*Phys. Rev.* B63:165414 (2001)). However, the Sternberg et al. local minimum is 2.0 eV higher than the global minimum and has a barrier of 0.1 eV.

2-Dimer Stationary Points (1-Dimer GM1+1 Dimer): By positioning a second dimer around a 1-dimer global minimum and relaxing the structure, a global minimum (GM2) and 19 local minima (LM2) of 2-dimer carbon clusters were found. The potential energy of each structure is given in Table 11.

TABLE 11

Potential energy of 2-dimer structures formed around GM1 on bare diamond C(110).

| Stationary Point | Potential Energy (eV) |
|---|---|
| GM2 | 0.00 |
| LM2-1 | 0.96 |
| LM2-2 | 1.78 |
| LM2-3 | 2.51 |
| LM2-4 | 2.65 |

TABLE 11-continued

Potential energy of 2-dimer structures formed around GM1 on bare diamond C(110).

| Stationary Point | Potential Energy (eV) |
|---|---|
| LM2-5 | 2.87 |
| LM2-6 | 2.97 |
| LM2-7 | 3.00 |
| LM2-8 | 3.06 |
| LM2-9 | 3.09 |
| LM2-10 | 3.10 |
| LM2-11 | 3.27 |
| LM2-12 | 3.44 |
| LM2-13 | 3.48 |
| LM2-14 | 3.10 |
| LM2-15 | 3.39 |
| LM2-16 | 4.04 |
| LM2-17 | 4.45 |
| LM2-18 | 4.68 |
| LM2-19 | 5.51 |

Important pathways and barriers are summarized in FIG. 19, and the structures of the global minimum and some local minima which are involved in high barriers are presented in FIG. 20A-FIG. 20F. The most important high barriers between LM2s and GM2 include:

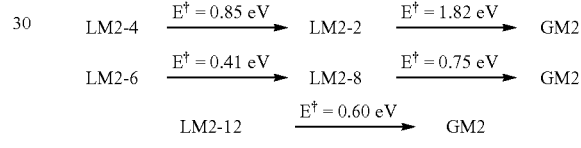

Among the local minima, LM24 is the most intractable defect structure. In order to convert LM24 to the global minimum GM2, the structure must pass through two high barriers, 0.85 eV and 1.82 eV, respectively. LM2-6 and LM2-12 are also major defect structures to be avoided if GM2 is the desired target structure for C(110) surface growth.

3-Dimer Stationary Points (2-Dimer GM2+1 Dimer): By positioning a third dimer around a 2-dimer global minimum and relaxing the structure, a 3-dimer global minimum (GM3) and 17 local minima (LM3A) of 3-dimer carbon clusters were found. The potential energy of each structure is given in Table 12.

TABLE 12

Potential energy of 3-dimer structures formed around GM2 on bare diamond C(110).

| Stationary Point | Potential Energy (eV) |
|---|---|
| GM3 | 0.00 |
| LM3A-1 | 0.19 |
| LM3A-2 | 1.47 |
| LM3A-3 | 2.19 |
| LM3A-4 | 2.34 |
| LM3A-5 | 3.06 |
| LM3A-6 | 3.22 |
| LM3A-7 | 3.32 |
| LM3A-8 | 4.30 |
| LM3A-9 | 4.49 |
| LM3A-10 | 4.81 |
| LM3A-11 | 4.83 |
| LM3A-12 | 4.84 |

TABLE 12-continued

Potential energy of 3-dimer structures formed around GM2 on bare diamond C(110).

| Stationary Point | Potential Energy (eV) |
|---|---|
| LM3A-13 | 5.04 |
| LM3A-14 | 5.13 |
| LM3A-15 | 5.37 |
| LM3A-16 | 5.52 |
| LM3A-17 | 7.71 |

Important pathways and barriers are summarized in FIG. 21, and the structures of the global minimum and some local minima which are involved in high barriers are presented in FIG. 22A-FIG. 22H. The most important high barriers between LM3A's and GM3 include:

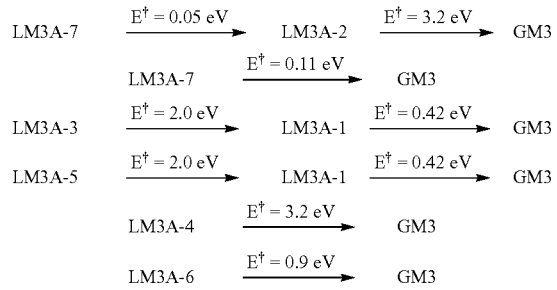

There is one defect structure (LM3A-1) among the found local minima that could be converted to the 3-dimer global minimum (GM3) with a moderate barrier of 0.42 eV. Another local minimum (LMA-7) has only a small barrier of 0.11 eV to the 3-dimer global minimum. However, an even smaller barrier of 0.05 eV exists for the same local minimum to an intermediate local minimum (LM3A-2), a defect structure that has a very large barrier of 3.2 eV against transition to the 3-dimer global minimum. LM3A-3, LM3A-4 and LM3A-5 are major defect structures to be avoided if GM3 is the desired target structure for C(110) surface growth.

3-Dimer Stationary Points (2-Dimer LM2-4+1 Dimer): Since the potential energy of the 2-dimer major defect structure LM24 is 2.65 eV, most of the 3-dimer local minima which were found by positioning a third carbon dimer around the LM24 local minimum are of higher potential. By positioning the third dimer around the 2-dimer LM24 local minimum and relaxing the structure, 18 local minima (LM3B) of 3-dimer carbon clusters were found. The potential energy of each structure is given in Table 13.

TABLE 13

Potential energy of 3-dimer structures formed around LM2-4 on bare diamond C(110).

| Stationary Point | Potential Energy (eV) |
|---|---|
| GM3 | 0.00 |
| LM3B-1 | 0.19 |
| LM3B-2 | 1.49 |
| LM3B-3 | 2.60 |
| LM3B-4 | 3.73 |
| LM3B-5 | 4.00 |

TABLE 13-continued

Potential energy of 3-dimer structures formed around LM2-4 on bare diamond C(110).

| Stationary Point | Potential Energy (eV) |
|---|---|
| LM3B-6 | 4.36 |
| LM3B-7 | 4.51 |
| LM3B-8 | 4.71 |
| LM3B-9 | 4.87 |
| LM3B-10 | 5.12 |
| LM3B-11 | 5.48 |
| LM3B-12 | 6.74 |
| LM3B-13 | 4.66 |
| LM3B-14 | 6.19 |
| LM3B-15 | 6.55 |
| LM3B-16 | 8.19 |
| LM3B-17 | 8.51 |
| LM3B-18 | 8.56 |

Important pathways and barriers are summarized in FIG. 23, and the structures of the global minimum and some local minima which are involved in high barriers are presented in FIG. 24A-FIG. 24H. The most important high barriers between LM3Bs and GM3 include:

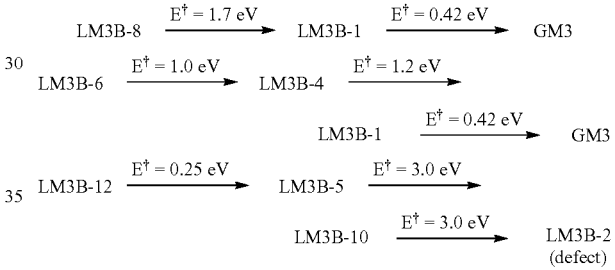

Transition State between GM2 and High Barrier Local Minimum in Positional Placement Path: In order to simulate the positional placement of a C2 dimer, the transition state structure was searched by moving up the x coordinate of the near end of the second dimer, which is close to the 1-dimer global minimum, and moving down the x coordinate of the far end of the second dimer with steps of 0.05 Å from the LM24 defect structure. Geometry optimization was performed at each point with x and z coordinates fixed, and full relaxations on some structures along the path were done. The scanned potential curve is shown in FIG. 25 along with top views (xy plane) of relevant structures. This curve indicates that the first peak on the path from GM2 is the transition state (TS') to LM2-2. The distances projected on the xy plane of the far end and the near end between those structures are as follows.

Distances Projected on XY Plane of Far and Near Carbons of the Second Dimer:

| Structure to Structure | Far C to Far C (Å) | Near C to Near C (Å) |
|---|---|---|
| GM2 → TS' | 0.6587 | 0.5377 |
| LM2-2 → TS' | 1.0134 | 0.2024 |
| GM2 → LM2-2 | 1.6700 | 0.8096 |

These data show that the required positional placement accuracy for inserting a dimer at the desired global minimum (GM2)—avoiding the nearest transition state (TS') leading to an undesired defect—is 0.6587 Å and 0.5377 Å, measured from the first ("far") or second ("near") carbon atom, respectively, in the second added dimer.

Dimer Thermal Desorption and Surface Migration: The Arrhenius equation for the one-step thermal desorption rate $k_1 = \nu \exp(-E_d/k_B T)$ may be used to crudely approximate the canonical residence time for a $C_2$ dimer attached to a diamond surface heated to temperature T (Merkle R. C., et al., *J. Nanosci. Nanotechnol.* 3, 319 (2003)). Taking T=300 K, $k_B = 1.381 \times 10^{-23}$ J/K (Boltzmann's constant), desorption energy $E_d > 8.0$ eV for diamond-bound dimers (Sternberg et al., *Phys. Rev.* B63:165414 (2001); Merkle R. C., et al., *J. Nanosci. Nanotechnol.* 3, 319 (2003)) and the pre-exponential constant $\nu \sim k_B T/h \sim 6 \times 10^{12}$ sec$^{-1}$ (h=6.63×10$^{-34}$ J-sec) typically used for thermally-migrating chemisorbed hydrocarbon atoms on diamond surface (Merkle R. C., et al., *J. Nanosci. Nanotechnol.* 3, 319 (2003)) (the precise value of which does not sensitively influence the conclusion), the lifetime of the $C_2$ dimer against spontaneous dissociation from diamond surface is $k_1^{-1} > 10^{121}$ sec at 300 K. The diffusion barriers to migration of $C_2$ on clean C(110) diamond surface were calculated by Sternberg et al. (*Phys. Rev.* B63:165414 (2001)) as 3.3-3.8 eV ($k_1^{-1} = 10^{42}$-$10^{51}$ sec at 300 K) along different crystallographic routes.

These results on the dimer-mediated growth chemistry of diamond C(110) relate to the diamond positional mechanosynthesis of Example 2 below. In summary:

1. The adsorption of one $C_2$ dimer onto a hydrogen depassivated diamond C(110) substrate leads to one of two local minima, one being the global minimum. The very low barrier of 0.01 eV separating the local from global minimum energy configuration is lower than kBT at room temperature, thereby lacking the ability to form stabilized surface defects from the adsorption of a single dimer. Thus, isolated dimers deposited on clean diamond C(110) at room temperature appear to be quite stable.

2. For the subsequent adsorption of a second carbon dimer in the close vicinity of the first, 19 local minima were identified in addition to the 2-dimer global minimum. Five of these local minimum energy structures require barriers greater than 0.5 eV to reach the global minimum, thereby constituting stabilized defects.

3. For the system involving three chemisorbed $C_2$ dimers, 35 local minimum energy structures were identified, ten of which are located in deep potential energy wells. The larger number of stable high-energy local minima suggests that the number of potential defects increases with system size (i.e., increases with the number of deposited carbon dimers) assuming the absence of long range stabilizing factors.

4. Random clustering of carbon dimers onto the diamond substrate can produce many stable surface defects, ultimately forming graphitic or amorphitic regions. This suggests an isolated rather than clustered growth mechanism in conventional CVD, which is consistent with the low pressures required for gasphase growth and with results from ab initio molecular dynamics (AIMD) simulations cited in Example 2 below.

Example 2

$C_2$ Mediated Growth of Diamond C(110) Surface Via Si/Ge-Triadamantane Dimer Placement Tools The present example provides a computational and theoretical investigation of the vacuum mechanosynthesis of diamond on the clean C(110) surface from carbon dimer ($C_2$) precursors positionally constrained throughout the reaction pathway by silicon- or germanium-doped triadamantane derivatives mounted on a scanning probe tip. Interactions between the dimer placement tools and the bare diamond C(110) surface are investigated using Density Functional Theory (DFT) with generalized gradient approximation (GGA) by constructing the reaction path potential energy profiles and analyzing ab initio molecular dynamics simulations. Similar methods are applied to study the energetics and kinetics of recharging the tool with acetylene. Molecular mechanics simulations on extended tool tips are carried out to elucidate the positional uncertainty of the carbon dimer due to thermal fluctuations, and the possibility of intermolecular dimerization and dehydrogenation of the dimer placement tools is explored.

Computational Methods: The model for the diamond surface required to study the tool-substrate chemistry must be slightly larger than the model previously employed in Example 1 to study the dimer-mediated surface growth chemistry. FIG. 26 shows a periodic clean diamond C(110) surface slab terminated with hydrogen atoms below the bottommost carbon plane. Attempted dimer depositions occur on the topmost carbon plane. The model consists of 160 carbon atoms and 40 hydrogen atoms, for a total of 200 atoms, and is confined to a periodic box with supercell dimensions of 14.245 Å and 12.604 Å along the edges surrounding the surface plane. Table 14 lists the values of the relevant internal coordinates of the DFT/GGA optimized surface slab.

TABLE 14

Internal coordinates for the relaxed clean (dehydrogenated) diamond C(110) surface.
Clean Diamond C(110) Surface

| Coordinate | Value |
| --- | --- |
| $C_s$—$C_s$ | 1.436 Å |
| $C_s$—C | 1.487 Å |
| C—C | 1.536 Å |
| $C_s$—$C_s$—$C_s$ | 122.7° |
| $C_s$—$C_s$—C | 109.3° |
| $C_s$—C—C | 100.8°/112.2° |
| C—C—C | 109.5° |

Subsurface carbon atoms are simply identified with the label C, while the exposed surface carbon atoms are labeled as $C_s$.

Merkle et al. (*J. Nanosci. Nanotechnol.* 3:319 (2003)) proposed that silane and germanium derivatives of the diamondoid molecule triadamantane might be useful end effectors (placement tools) for diamond mechanosynthesis. With a carbon dimer covalently attached to two terminal Si or Ge atoms and the triadamantane either attached to a scanning probe or integrated into an extended diamond lattice, the carbon dimer can be positioned and deposited onto a growing diamond substrate. The success of this process is based on the premise that a typical C—Si or C—Ge bond is weaker than a typical C—C bond and will dissociate first, leaving the carbon dimer covalently attached to the diamond surface.

FIG. 27A and FIG. 27B show DFT/GGA optimized structures of the Si-triadamantane and Ge-triadamantane molecules, each containing a carbon dimer attached at the terminal end. The 1.276 Å bond length of the attached carbon dimers and the approximate bond order of 3 are characteristic of a C≡C triple bond found in alkynes and terminal acetylenes. For clarity, the carbon atoms of the terminal carbon dimer are labeled as $C_{ad}$, those in the remaining portion of the triadamantane tool as $C_t$, and those on the diamond surface as $C_s$. The relevant internal coordinates for the Si- and Ge-triadamantane tools are summarized in Table 15.

TABLE 15

Internal coordinates for optimized Si/Ge-triadamantane dimer placement tools.

| Si Placement Tool | | Ge Placement Tool | |
|---|---|---|---|
| Coordinate | Value | Coordinate | Value |
| $C_{ad}$—$C_{ad}$ | 1.276 Å | $C_{ad}$—$C_{ad}$ | 1.275 Å |
| $C_{ad}$—Si | 1.828 Å | $C_{ad}$—Ge | 1.904 Å |
| $C_t$—Si(4) | 1.907 Å | $C_t$—Ge(4) | 2.002 Å |
| $C_t$—Si(2) | 1.860 Å | $C_t$—Ge(2) | 1.941 Å |
| $C_{ad}$—$C_{ad}$—Si | 119.2° | $C_{ad}$—$C_{ad}$—Ge | 119.4° |
| $C_{ad}$—Si—$C_t$(4) | 106.0° | $C_{ad}$—Ge—$C_t$(4) | 106.4° |
| $C_{ad}$—Si—$C_t$(2) | 127.2° | $C_{ad}$—Ge—$C_t$(2) | 128.2° |

Consistent with a bond-energy bond-order (BEBO) model, the shorter Si—$C_{ad}$ bond, compared with the two bonds to the adamantane carbons, is indicative of a stronger bond. That is, the carbon atoms in the $C_2$ dimer are covalently bound more strongly to the Si atoms than with the adamantane carbon atoms. The same applies to the Ge-triadamantane molecule.

A set of additional simulations were carried out to predict the positional uncertainty of the carbon atoms in the $C_2$ dimer. There are two ways in which the triadamantane tool could be attached at the end of a probe: either noncovalently affixed to the scanning probe tip, or covalently integrated into the scanning probe tip. In the former case, the tool piece would be prone to diffusion and rotation along the surface of the probe tip. These undesirable effects are eliminated in the latter case. The most ideal probe—one that is least subject to distortion due to lateral vibrations—would be a rigid rod, such as one fabricated from diamond. FIG. 28 shows a simplified model of an extended diamondoid scanning probe composed of two Ge atoms protruding from the tip.

Application of the most sophisticated atomistic modeling methods available are required to achieve the highest accuracy in predictions of the chemical stability of the proposed dimer placement tools, tool-substrate chemical affinity and reactivity, and the acetylene recharging of the end effectors. Traditional local-orbital-based electronic structure theories—such as Hartree-Fock, perturbation theory, configuration interaction, coupled cluster theory, etc.—are only applicable for systems ranging in size from a few atoms to a little more than 100 atoms. Density Functional Theory (DFT), coupled with non-local plane-wave basis functions, has allowed the study of systems exceeding a few hundred atoms with unprecedented accuracy. Given the large size of the model required to study the tool-substrate chemistry (~250 atoms), the vast majority of the calculations performed during this study made use of plane-wave-based DFT.

All of the electronic structure calculations reported in this section were carried out using the Vienna Ab initio Simulation Package (VASP) as cited in Example 1. The wavefunctions are expanded in a basis consisting of plane waves with norm-conserving Vanderbilt ultra-soft pseudopotentials for the inner core electrons. The generalized gradient approximation (GGA) is used throughout. Stationary point calculations and ab initio molecular dynamics (AIMD) simulations were run in parallel on an in-house built PC cluster using MPI (message passing interface) for inter-node communication. Typical structural optimizations took approximately one day to run on 8 nodes, with transition state calculations involving between 10 and 20 constrained structural optimizations each. AIMD simulations were performed for a total time of 1 ps using an integration time-step of 1 fs. The hundreds of ab initio calculations and simulations presented in this study accounted for more than 50,000 CPU-hours, or 5.7 CPU-years, of computer time on the in-house PC cluster. In addition to the electronic structure calculations described above, a few long-time molecular dynamics (MD) simulations were performed on extended diamond tool tips to deduce the thermal fluctuations in the normal modes of the attached carbon dimer, and their resulting positional uncertainties as projected onto the plane of the diamond surface. These simulations were carried out at room temperature (298 K) for 1 ns using the MM3 empirical force field.

Chemical Stability and Recharging of Dimer Placement Tools: Diamondoid molecules, including adamantane, diamantane, triamantane, pentamantane, heptamantane, and up to at least undecamantane (11 face-fused adamantane cages) can be isolated from natural petroleum, the direct chemical synthesis of adamantane, diadamantanes including [4]-diadamantane (diamantane), triamantane, and tetramantane, has been reported; and the molecular geometries of diamantane, triamantane, and isotetramantane have been investigated theoretically using molecular mechanics, semiempirical and ab initio approaches. Since the field of organosilane chemistry is fairly well developed, constructing a synthetic route to the silo-triadamantane tool should be feasible. Although less is known of organic germanium chemistry, reports indicate the successful synthesis of a wide variety of organogermanium compounds as well.

Previous semiempirical and ab initio calculations Merkle et al. (*J. Nanosci. Nanotechnol.* 3:319 (2003)) predict that the proposed Si- and Ge-triadamantane molecules are structurally stable (i.e., they are not susceptible to room temperature intramolecular isomerization or decomposition).

Dimerization of Si- and Ge-Triadamantane Tools: FIG. 29A and FIG. 29B show the fully relaxed structures of the dimerized Si- and Ge-triadamantane molecules; Table 16 lists the relevant internal coordinates for both of the dimerized molecules.

TABLE 16

Internal coordinates for optimized dimerized Si/Ge-triadamantane molecules.

| Dimerized Si-triadamantane | | Dimerized Ge-triadamantane | |
|---|---|---|---|
| Coordinate | Value | Coordinate | Value |
| $C_{ad}$—$C_{ad}$ (joining tools) | 1.580 Å | $C_{ad}$—$C_{ad}$ (joining tools) | 1.584 Å |
| $C_{ad}$—$C_{ad}$ (same tool) | 1.400 Å | $C_{ad}$—$C_{ad}$ (same tool) | 1.392 Å |
| $C_{ad}$—Si | 1.828 Å | $C_{ad}$—Ge | 1.910 Å |
| Si—$C_t$ | 1.907 Å | Ge—$C_t$ | 2.004 Å |
| $C_{ad}$—Si—$C_t$ | 107.7° | $C_{ad}$—Ge—$C_t$ | 108.0° |

In order to determine the likelihood that two molecules will dimerize via a 2π+2π cycloaddition, the dimerization reaction pathway must be known. A symmetric reaction path potential energy surface was calculated by retracting the two tools through a series of constrained geometry optimizations. Each constrained optimization was carried out using a spin-unrestricted Kohn-Sham wavefunction to ensure an accurate population of the electronic orbitals and to attempt to avoid problems of spin contamination near the transition state. However, it has already been shown that cycloaddition reactions require the use of multi-determinant wavefunctions and that single-determinant methods, such as those used here, overestimate transition state energy barriers considerably. FIG. 30 shows the potential energy curves representing the dimerization pathways along a symmetric reaction coordinate. The endpoint at far left for each curve corresponds to a dimerized tool, while the endpoint at far right corresponds to a separated tool, and the energy peak corresponds to the dimerization transition state (reaction path barrier).

The potential energy curves in FIG. 30 are very similar and show an exothermic reaction for tool dimerization via a 2π+2π cycloaddition between the terminal acetylenic carbon dimers. The dimerization reaction enthalpies $\Delta H_{rxn}$ are −1.64 eV and −1.84 eV for the Si- and Ge-triadamantane molecules, and the dimerization barriers $H^{\ddagger}$ are 1.93 eV and 1.86 eV for the Si- and Ge-triadamantane molecules, respectively. It is clear that the dimerization of both tools is thermodynamically favored but not kinetically favored. Due to the fact that the electron correlation errors in DFT, these barrier heights may be considerably overestimated, therefore both reactions may be kinetically accessible at room temperature. Thus if allowed to interact without individual positional restraint, free triadamantane tools would be prone to dimerization—establishing an important constraint on the manner in which these tools may initially be synthesized, and later recharged.

Intermolecular Dehydrogenation: The removal of molecular hydrogen ($H_2$) from one triadamantane tool by another is an example of an intermolecular dehydrogenation reaction. For the dimer placement tools considered here, this reaction can be represented schematically as

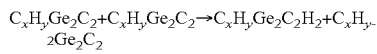

$$C_xH_yGe_2C_2 + C_xH_yGe_2C_2 \rightarrow C_xH_yGe_2C_2H_2 + C_xH_{y-2}Ge_2C_2$$

where $C_xH_y$ corresponds to the hydrocarbon backbone of the dimer placement tool and $C_2$ to the terminal carbon dimer attached to the two Si/Ge atoms. The active site would presumably involve the terminal carbon dimer of one triadamantane molecule and any of two vicinal hydrogen atoms on another triadamantane molecule. Only one dehydrogenation pathway was investigated in this study, using the Ge-triadamantane molecule as a model system.

Representative structures of the reactants, transition state, and products for the intermolecular dehydrogenation of Ge-triadamantane molecules are shown in FIG. 31, and a plot of the reaction path potential energy for this reaction is shown in FIG. 32. The overall reaction is exothermic with a reaction enthalpy of $\Delta H_{rxn}$=−0.76 eV and a reaction barrier of $H^{\ddagger}$=0.48 eV. Exothermic reactions with an activation energy of 0.48 eV are accessible at room temperature. Therefore, the Si/Ge-doped triadamantane molecules as shown in FIG. 27A and FIG. 27B, allowed to freely interact without individual positional restraint, would be prone to intermolecular dehydrogenation—illustrating their relatively low conventional chemical stability in the recharged state and establishing an important constraint on the manner in which they may initially be synthesized, and later recharged.

Acetylene Addition (Energetics and Kinetics): A similar set of constrained optimizations were carried out to determine the minimum energy pathways for the addition of an acetylene molecule to Si/Ge-triadamantane molecules lacking a terminal carbon dimer. Since covalent π-π interactions are non-existent for these systems, errors due to single-determinant electron-correlation are non-existent and the calculated results should be quantitative. Fully optimized structures of the Si- and Ge-triadamantane molecules with and without a covalently attached terminal acetylene (occupying the $C_2$ dimer position) were created and relevant internal coordinates established for the Si- and Ge-triadamantane molecules lacking or possessing a terminal acetylene molecule. Minimum energy reaction path potentials versus reaction coordinate for addition of acetylene to the Si/Ge substituted triadamantane molecules were calculated. The potential energy curves shown in FIG. 33 possess similar shapes, with reaction enthalpies of 4.15 eV and −3.10 eV and barrier heights of 1.37 eV and 1.49 eV for acetylene addition to the Si- and Ge-triadamantane molecules, respectively.

Rate constants for acetylene addition were estimated from transition state theory using the aforementioned activation energies and the general relation $k_{rxn}$=($k_B$T/h) ($Q^{\ddagger}/Q_AQ_B$)exp($-E_a/k_B$T). The molar rate constant expressions are $k_{rxn}$(Si)≈$10^{11}$ $M^{-1}$ $sec^{-1}$ exp(−15900/T) and $k_{rxn}$(Ge)≈$10^{11}$ $M^{-1}$ $sec^{-1}$ exp(−17300/T), therefore the room temperature (T=298 K) rate constants become $k_{rxn}$(Si)≈6.7×$10^{-13}$ $M^{-1}$ $sec^{-1}$ and $k_{rxn}$(Ge)≈6.1×$10^{-15}$ $M^{-1}$ $sec^{-1}$. The overall reaction exhibits second order kinetics with the rate law expression R=$k_{rxn}$[triadamantane][acetylene]. At room temperature, pure acetylene gas decomposes by deflagration (a slow-moving decomposition to the elements) above 2 atm and can detonate above 3.2 atm; assuming a 1 liter container occupied by 0.08 M concentration of acetylene (corresponding to a pressure of 1.96 atm), the rate expressions reduce to R(Si)≈5.4×$10^{-14}$ $N_{triadamantane}$($sec^{-1}$) and R(Ge)≈4.9×$10^{-16}$ $N_{triadamantane}$ ($sec^{-1}$), where $N_{triadamantane}$ is the number density of the dimer placement tools (triadamantane tools/liter) in the recharging container. At room temperature a population of 1.9×$10^{13}$ Si tools or 2.0×$10^{15}$ Ge tools in a 1 liter container yields one recharged tool per sec, in principle allowing 1 Hz operation of the mechanosynthetic cycle. A more practical approach is to recharge tools at elevated temperatures. For example, at 600 K and 0.08 M concentration of acetylene, the rate expressions reduce to R(Si)≈2.5×$10^{-2}$ $N_{triadamantane}$ ($sec^{-1}$) and R(Ge)≈2.4×$10^{-3}$ $N_{triadamatane}$($sec^{-1}$), requiring only a population of 40 Si tools or 420 Ge tools in a 1 liter container to obtain one recharged tool per sec, again allowing 1 Hz operation of the mechanosynthetic cycle.

After acetylene addition, two hydrogens must be removed to complete the tool recharge cycle (FIG. 34), using abstraction tools that have been studied (C. B. Musgrave et al. *Nanotechnology* 2, 187 (1991); M. Page et al., *J. Am. Chem. Soc.* 113, 3270 (1991); X. Y. Chang, et al. *J. Chem. Phys.* 99, 4748 (1993); S. B. Sinnott, et al. *Surf. Sci.* 316, L1055 (1994); D. W. Brenner, et al., *Nanotechnology* 7, 161 (1996); A. Ricca, et al. *Surf Sci.* 429, 199 (1999)).

Thermal Fluctuations and Dimer Placement Accuracy: In order to explore the room temperature limits in the positional uncertainty and control of the terminal carbon dimer, a series of MD simulations of the Si/Ge-doped extended diamondoid probe structure (FIG. 28) were carried out for a total time of 10 ns each. This is an adequate amount of time to compute the phase space distribution of the positions and momenta of the terminal carbon atoms in the extended Si/Ge diamondoid tools. FIG. 35 shows plots of sampled xy coordinates of the two dimer carbon atoms attached to the Si- and Ge-doped diamondoid probes, taking T=298 K. This corresponds to the dimer coordinate plane parallel to the plane of the diamond surface. The simulation for the Si and Ge diamondoid probes are very similar, both predicting a vibrationally active $C_2$ dimer.

The uncertainties in the positions of the terminal carbon atoms attached to the Si probe, relative to their equilibrium positions, are approximately $\Delta x$=±0.25 Å and $\Delta y$=+0.19 Å, for a total positional uncertainty of $\Delta q$=+0.31 Å (0.62 Å full range). Likewise for the Ge probe the positional uncertainties are $\Delta x$=+0.34 Å and $\Delta y$=+0.31 Å, for a total positional uncertainty of $\Delta q$=+0.46 Å (0.92 Å full range). The larger deviations in the atomic positions of the terminal carbon atoms in the Ge diamondoid probe are due to the differences between the Ge—C and Si—C vibrational frequencies. The symmetric and asymmetric Si—C stretching frequencies are 809 and 824 cm$^{-1}$, respectively. The symmetric and asymmetric Ge—C stretching frequencies are 558 and 629 cm$^{-1}$, respectively. A larger vibrational stretching frequency is characteristic of a stiffer bond which is less subject to large amplitude thermal fluctuations (and vice versa for lower frequency molecular vibrations).

Dimer Placement on Bare Diamond C(110) Surface: This section reports results from both stationary point calculations and ab initio molecular dynamics simulations of the Si/Ge-triadamantane placement of carbon dimers onto the bare (dehydrogenated) diamond C(110) surface. FIG. 36A and FIG. 36B show the minimum energy reaction path potential energy surfaces for tool adsorption and retraction, for the silicon tool (FIG. 36A) and the germanium tool (FIG. 36B). There are three stationary points of primary importance for the analysis of tool adsorption and retraction. These are the separated dimerized tool+substrate (inset images at left), the tool/substrate complex (inset images at center), and the separated tool+dimerized surface (inset images at right). Table 17 lists the relevant internal coordinates of the tool/substrate complexes for the Si- and Ge-triadamantane tools.

TABLE 17

Internal coordinates for optimized Si/Ge-triadamantane/diamond substrate complex.

| Si Tool/Diamond Substrate | | Ge Tool/Diamond Substrate | |
|---|---|---|---|
| Coordinate | Value | Coordinate | Value |
| $C_{ad}$—$C_{ad}$ | 1.607 Å | $C_{ad}$—$C_{ad}$ | 1.604 Å |
| $C_{ad}$—$C_s$ | 1.529 Å | $C_{ad}$—$C_s$ | 1.527 Å |
| $C_{ad}$—$C_s$ | 1.913 Å | $C_{ad}$—$C_s$ | 1.913 Å |
| Si—$C_{ad}$ | 1.893 Å | Ge—$C_{ad}$ | 1.977 Å |

As may be deduced from FIG. 36A and FIG. 36B, the anticipated sequence of events is as follows: (1) approach of the dimerized tool tip towards a predefined location on the C(110) surface of the diamond substrate→(2) adsorption of the dimerized tool tip onto the substrate surface (deposition of the $C_2$ dimer)→(3) retraction of the tool tip leaving behind the deposited $C_2$ dimer. In order for these events to occur as predicted, the energy of the products (tool+dimerized surface) should be lower than the energy of the reactants (dimerized tool+surface)—that is, ideally the reaction should be exothermic. However, this is not a strict requirement because the dimer deposition may still be kinetically favored. Identifying the potential energy surface connecting reactants from products allows prediction of events during and after the approach and retraction of the dimer placement tool.

A potential energy curve along the minimum energy pathway separating reactants from products can be constructed by computing the energies of the optimized reactants (FIG. 36A) and products (FIG. 36B). This was accomplished using a similar approach as for previous reaction path curves via a series of constrained optimizations, with the results for both the Si- and Ge-triadamantane tools shown in FIG. 36A and FIG. 36B. As expected, the adsorption of both dimerized tools is exothermic, with surface adsorption energies of −3.53 eV and −3.69 eV for the Si- and Ge-triadamantane tools, respectively. However, an unexpected result is that the overall reaction (as illustrated from the two endpoints in FIG. 36A and FIG. 36B) is endothermic, with reaction enthalpies of 1.85 eV and 0.66 eV for $C_2$ placement from the Si- and Ge-triadamantane molecules, respectively, making the tools more efficient at removing dimers than depositing them.

Following adsorption of the dimer placement tool onto the bare C(110) surface of the diamond substrate, a force is applied to retract the triadamantane tool from the surface, and during retraction there are two pathways that can be taken. The system will always attempt to follow the lowest energy reaction path. In the two cases outlined in FIG. 36A and FIG. 36B, the lowest energy pathway is to retain the carbon dimer to the triadamantane tool as opposed to leaving the terminal carbon dimer bound to the diamond substrate surface.

Since every reaction channel of a branched chemical reaction has a finite probability of being sampled, depositing a $C_2$ dimer onto the diamond surface may occur a finite percentage of the time. A small number of AIMD simulations (5 for each tool) were performed to investigate the effects of internal energy on the tool retraction event. Each simulation was performed for a total time of 1 ps and the tool was retracted by pulling the six outermost carbon atoms in the direction away from the diamond surface. All five of the simulations for retraction of Si-triadamantane failed to deposit the carbon dimer to the diamond surface. But for the Ge-triadamantane retraction simulations, one of the five simulations left the carbon dimer deposited onto the substrate surface as desired. Since the additional energy penalty of ~1 eV for depositing the carbon dimer from the Ge-triadamantane is small compared to the ~17 eV of internal energy, $C_2$ deposition will occur using the Ge tool a small percentage of the time (~20%). (The Si-triadamantane has a larger additional energy penalty of ~3 eV for dimer deposition, so the desired placement of the $C_2$ dimer using the Si tool will occur a correspondingly smaller percentage of the time.)

Achieving the desired dimer placement in 1 of every 5 attempts (with no deleterious changes in either tool or diamond surface during the other 4 of 5 attempts) is an acceptable level of success for early experimental proof-of-concept demonstrations, but is inefficient from the standpoint of future high-speed, high-reliability molecularly precise materials fabrication.

Conclusions: Dicarbon ($C_2$) terminated Si/Ge-triadamantane molecules are not predicted to be susceptible to intermolecular dimerization. If allowed to interact without individual positional restraint, free dimer-loaded triadamantane molecules would be prone to intermolecular dehydrogenation which can proceed with barriers that are thermally accessible at room temperature. Similarly, the removal of molecular hydrogen ($H_2$) from one triadamantane tool by another is an example of an intermolecular dehydrogenation reaction. If Si/Ge-doped triadamantane molecules were bulk synthesized and allowed to freely interact without individual positional restraint, they would be prone to intermolecular dehydrogenation. These factors establish an important constraint on the manner in which $C_2$-loaded triadamantane molecules and tools may initially be synthesized, and later recharged—that is, activated tools must be positionally restrained during and prior to use.

Recharging of the dimer placement tools with acetylene requires large activation energies. Kinetics studies indicate that the rate of recharging is slow but can in principle be compensated by simultaneously recharging large numbers of tools or by recharging tools at elevated temperatures, plausibly allowing 1 Hz operation of the mechanosynthetic cycle.

Molecular dynamics simulations of extended diamond probes predict a minimal room temperature positional uncertainty of ±0.31 Å and ±0.46 Å for Si and Ge dimer placement tools respectively. From Example 1, the minimum required positional placement accuracy for inserting a dimer onto the clean diamond C(110) surface at the desired global minimum (GM2) instead of the nearest transition state (TS') to an undesired defect (LM2-2) is +0.6587 Å and +0.5377 Å measured from the first or second carbon atom, respectively, in the second added dimer. However, purposeful construction of "defect" structures (e.g., LM2-2) could demand placement accuracies as small as +0.2024 Å (Example 1). Thus when compared with distances of a carbon atom in a local minima to that of the same atom at the transition state leading to another stable minima, dimer placement accuracy appears only marginally adequate at room temperature and dimer misplacement remains a significant concern.

The overall deposition reactions are endothermic and therefore thermodynamically unfavorable for both Si and Ge tools. Retraction of the tool from the diamond substrate will retain the carbon dimer to the placement tool the vast majority of the time, so the proposed tools are inefficient at their designated task. However, depositing a $C_2$ dimer onto the diamond surface is expected to occur a finite percentage of the time which might be an adequate performance for early experimental proof-of-concept demonstrations. The ability of the Ge tool to deposit the dimer in ~20% of all attempts despite its thermodynamic unfavorability suggests that alternative dimer-loaded molecules, other tool variants, or colder operating temperatures might provide improved deposition efficiency.

Other embodiments of the present invention will be apparent to those skilled in the art from a consideration of this specification or practice of the embodiments disclosed herein. However, the foregoing specification is considered merely exemplary of the present invention with the true scope and spirit of the invention being indicated by the following claims.

The content of each document cited within the present patent application is hereby incorporated by reference herein, in its entirety, for all jurisdictions in which such incorporation is permitted.

As used herein and unless otherwise indicated, the terms "a" and "an" are taken to mean "one", "at least one" or "one or more".

3. REFERENCES

1. Tohru Inoue, Masaya Kadono, Akiharu Miyanaga, "Method for forming diamond and apparatus for forming the same," U.S. Pat. No. 5,360,477, 1 Nov. 1994.
2. Nobuo Setaka, "Process for producing diamond powder by shock compression," U.S. Pat. No. 4,377,565, 22 Mar. 1983.
3. Robert C. McCune, Ronald J. Baird, "Making diamond composite coated cutting tools," U.S. Pat. No. 4,919,974, 24 Apr. 1990.
4. Harold P. Bovenkerk, Thomas R. Anthony, James F. Fleischer, William F. Banholzer, "CVD diamond by alternating chemical reactions," U.S. Pat. No. 5,302,231, 12 Apr. 1994.
5. Thomas R. Anthony, James F. Fleischer, "Smooth surface CVD diamond films and method for producing same," U.S. Pat. No. 5,523,121, 4 Jun. 1996.
6. Dieter M. Gruen, Thomas G. McCauley, Dan Zhou, Alan R. Krauss, "Tailoring nanocrystalline diamond film properties," U.S. Pat. No. 6,592,839, 15 Jul. 2003.
7. Y. Matsui, A. Yuuki, M. Sahara, Y. Hirose, "Flame structure and diamond growth mechanism of acetylene torch," Jpn. J. Appl. Phys. Part 1 28 (1989):1718-1724.
8. D. M. Gruen, S. Liu, A. R. Krauss, J. Luo, X. Pan, "Fullerenes as Precursors for Diamond Film Growth Without Hydrogen or Oxygen Additions," Appl. Phys. Lett. 64 (1994):1502-1504.
9. Dieter M. Gruen, Shengzhong Liu, Alan R. Krauss, Xianzheng Pan, "Diamond film growth from fullerene precursors," U.S. Pat. No. 5,620,512, 15 Apr. 1997.
10. Dieter M. Gruen, Alan R. Krauss, "Method for the preparation of nanocrystalline diamond thin films," U.S. Pat. No. 5,772,760, 30 Jun. 1998.
11. Dieter M. Gruen, "Conversion of fullerenes to diamond," U.S. Pat. No. 5,209,916, 11 May 1993.
12. Dieter M. Gruen, "Conversion of fullerenes to diamond," U.S. Pat. No. 5,328,676, 12 Jul. 1994.
13. Dieter M. Gruen, "Conversion of fullerenes to diamond," U.S. Pat. No. 5,370,855, 6 Dec. 1994.
14. Dieter M. Gruen, "Conversion of fullerenes to diamonds," U.S. Pat. No. 5,462,776, 31 Oct. 1995.
15. Dieter M. Gruen, Alan R. Krauss, Shengzhong Liu, Xianzheng Pan, Christopher D. Zuiker, "Diamond film growth argon-carbon plasmas," U.S. Pat. No. 5,849,079, 15 Dec. 1998.
16. Dieter M. Gruen, Alan R. Krauss, Ali Erdemir, Cuma Bindal, Christopher D. Zuiker, "Smooth diamond films as low friction, long wear surfaces," U.S. Pat. No. 5,989,511, 23 Nov. 1999.
17. "Directed Energy Interactions with Surfaces: Fullerenes As Precursors for Diamond Film Growth," Chemistry Division, Argonne National Laboratory, accessed 29 Dec. 2003; http://chemistry.anl.gov/surfaces/fullerenes.html
18. Alan R. Krauss, Dieter M. Gruen, Michael J. Pellin, Orlando Auciello, "Ultrananocrystalline diamond cantilever wide dynamic range acceleration/vibration/pressure sensor," U.S. Pat. No. 6,422,077, 23 Jul. 2002.
19. R. J. H. Klein-Douwel, J. J. ter Meulen, "Spatial distributions of atomic hydrogen and $C_2$ in an oxyacetylene flame in relation to diamond growth," J. Appl. Phys. 83(1 May 1998):4734-4745; http://www.mlf.sci.kun.nl/publ/1998/H_C2.pdf
20. S. Matsumoto, Y. Matsui, "Electron microscopic observation of diamond particles grown from the vapour phase," J. Mater. Sci. 18 (1983):1785-1793.
21. Y. Sato, Japan Review in New Diamond (English version), Japan New Diamond Forum, 1990, p. 5.
22. Jeremy E. Dahl, Robert M. Carlson, Shenggao Liu, "Diamondoid-containing materials in microelectronics," U.S. Patent Application 20020130407, 19 Sep. 2002.
23. Thomas A. Plaisted, Susan B. Sinnott "Hydrocarbon thin films produced from adamantane-diamond surface deposition: Molecular dynamics simulations," J. Vac. Sci. Technol. A 19(January/February 2001):262-266; http://dx.doi.org/10.1116/1.1335683
24. M. Matsuura, K. Murakami, Y. Inaki, T. Yamamoto, "Diamond-like-carbon thin films deposited from adamantane," Bull. Res. Inst. Electronics Shizuoka Univ. 23 (1988):47-56. In Japanese.
25. Charles B. Musgrave, Jason K. Perry, Ralph C. Merkle, William A. Goddard III, "Theoretical studies of a hydrogen abstraction tool for nanotechnology," Nanotechnology 2 (1991):187-195; http://www.zyvex.com/nanotech/Habs/Habs.html
26. Michael Page, Donald W. Brenner, "Hydrogen abstraction from a diamond surface: Ab initio quantum chemical study using constrained isobutane as a model," J. Am. Chem. Soc. 113 (1991):3270-3274.
27. Michael Page, Donald W. Brenner, "Ab initio quantum chemical study of hydrogen abstraction from isobutane constrained to model a diamond surface," in Russell Messier, Jeffrey T. Glass, James E. Butler, Rustum Roy, eds., Proceedings of the Second International Conference, New Diamond Science and Technology, Materials Research Society, Pittsburgh, Pa., 1991, pp. 45-50.
28. Xiao Yan Chang, Martin Perry, James Peploski, Donald L. Thompson, Lionel M. Raff, "Theoretical studies of hydrogen-abstraction reactions from diamond and diamond-like surfaces," J. Chem. Phys. 99(15 Sep. 1993):4748-4758.
29. Susan B. Sinnott, Richard J. Colton, Carter T. White, Donald W. Brenner, "Surface patterning by atomically-controlled chemical forces: molecular dynamics simulations," Surf. Sci. 316 (1994):L1055-L1060.
30. D. W. Brenner, S. B. Sinnott, J. A. Harrison, O. A. Shenderova, "Simulated engineering of nanostructures," Nanotechnology 7 (1996):161-167; http://www.zyvex.com/nanotech/nano4/brennerAbstract.html and http://www.zyvex.com/nanotech/nano4/brennerPaper.pdf
31. A. Ricca, C. W. Bauschlicher Jr., J. K. Kang, C. B. Musgrave, "Hydrogen abstraction from a diamond (111) surface in a uniform electric field," Surf. Sci. 429 (1999):199-205.
32. K. Eric Drexler, Nanosystems: Molecular Machinery, Manufacturing, and Computation, John Wiley & Sons, New York, 1992; http://www.zyvex.com/nanotech/nanosystems.html
33. Ralph C. Merkle, "A proposed 'metabolism' for a hydrocarbon assembler," Nanotechnology 8 (1997): 149-162; http://www.zyvex.com/nanotech/hydroCarbonMetabolism.html
34. Stephen P. Walch, Ralph C. Merkle, "Theoretical studies of diamond mechanosynthesis reactions," Nanotechnology 9 (1998):285-296;
35. Fedor N. Dzegilenko, Deepak Srivastava, Subhash Saini, "Simulations of carbon nanotube tip assisted mechanochemical reactions on a diamond surface," Nanotechnology 9(December 1998):325-330.
36. Ralph C. Merkle, Robert A. Freitas Jr., "Theoretical analysis of a carbon-carbon dimer placement tool for diamond mechanosynthesis," J. Nanosci. Nanotechnol. 3(August 2003):319-324; http://www.rfreitas.com/Nano/DimerTool.htm and http://www.rfreitas.com/Nano/JNNDimerTool.pdf
37. Jingping Peng, Robert A. Freitas Jr., Ralph C. Merkle, "Theoretical Analysis of Diamond Mechanosynthesis. Part I. Stability of $C_2$ Mediated Growth of Nanocrystalline Diamond C(110) Surface," J. Comp. Theor. Nanosci. 1(March 2004). In press.
38. David J. Mann, Jingping Peng, Robert A. Freitas Jr., Ralph C. Merkle, "Theoretical Analysis of Diamond Mechanosynthesis. Part II. $C_2$ Mediated Growth of Diamond C(110) Surface via Si/Ge-Triadamantane Dimer Placement Tools," J. Comp. Theor. Nanosci. 1(2004). In press.
39. Wilson Ho, Hyojune Lee, "Single bond formation and characterization with a scanning tunneling microscope," Science 286(26 Nov. 1999):1719-1722; http://www.physics.uci.edu/~wilsonho/stm-iets.html
40. A. Herman, "Towards mechanosynthesis of diamondoid structures: I. Quantum-chemical molecular dynamics simulations of sila-adamantane synthesis on hydrogenated Si(111) surface with the STM," Nanotechnology 8(September 1997): 132-144.
41. A. Herman, "Towards mechanosynthesis of diamondoid structures. II. Quantum-chemical molecular dynamics simulations of mechanosynthesis on an hydrogenated Si(111) surface with STM," Modelling Simul. Mater. Sci. Eng. 7(January 1999):43-58; A. Herman, "Computational nanotechnology of silicon structures: a challenge far beyond 2000," TASK Quarterly 1(July 1997):9-20.
42. Noriaki Oyabu, Oscar Custance, Insook Yi, Yasuhiro Sugawara, Seizo Morita, "Mechanical vertical manipulation of selected single atoms by soft nanoindentation using near contact Atomic Force Microscopy," Phys. Rev. Lett. 90(2 May 2003):176102; http://link.aps.org/abstract/PRL/v90/e176102
43. O. Marti, B. Drake, and P. K. Hansma, "Atomic force microscopy of liquid-covered surfaces: Atomic resolution images," Appl. Phys. Lett. 51(17 Aug. 1987):484-486; http://content.aip.org/APPLAB/v51/i7/484_1.html
44. G. Tanasa, O. Kumosikov, C. F. J. Flipse, J. G. Buijnsters, W. J. P. van Enckevort, "Diamond deposition on modified silicon substrates: Making diamond atomic force microscopy tips for nanofriction experiments," J. Appl. Phys. 94(1 Aug. 2003): 1699-1704; http://content.aip.org/JAPIAU/v94/i3/1699_1.html
45. Sacharia Albin, Jianli Zheng, John B. Cooper, Weihai Fu, Arnel C. Lavarias, "Microwave plasma chemical vapor deposited diamond tips for scanning tunneling microscopy," Appl. Phys. Lett. 71(10 Nov. 1997):2848-2850.
46. E. Oesterschulze, W. Scholz, Ch. Mihalcea, D. Albert, B. Sobisch, W. Kulisch, "Fabrication of small diamond tips for scanning probe microscopy application," Appl. Phys. Lett. 70(27 Jan. 1997):435-437; http://content.aip.org/APPLAB/v70/i4/435_1.html
47. G. J. Germann, G. M. McClelland, Y. Mitsuda, M. Buck, H. Seki, "Diamond force microscope tips fabricated by chemical vapor deposition," Rev. Sci. Instrum. 63(1 Sep. 1992):4053-4055; http://content.aip.org/RSINAK/v63/i9/4053_1.html
48. Geoffrey J. Germann, Sidney R. Cohen, Gabi Neubauer, Gary M. McClelland, Hajime Seki, D. Coulman, "Atomic scale friction of a diamond tip on diamond (100) and (111) surfaces," J. Appl. Phys. 73(1 Jan. 1993):163-167; http://content.aip.org/JAPIAU/v73/i1/163_1.html
49. Eric P. Visser, Jan W. Gerritsen, Willem J. P. van Enckevort, Herman van Kempen, "Tip for scanning tunneling microscopy made of monocrystalline, semiconducting, chemical vapor deposited diamond," Appl. Phys. Lett. 60(29 Jun. 1992):3232-3234; http://content.aip.org/APPLAB/v60/i26/3232_1.html
50. J. H. Hafner, C. L. Chueng, C. M. Lieber, "Growth of nanotubes for probe microscopy tips," Nature 398 (1999): 761-762.
51. C. L. Cheung, J. H. Hafner, C. M. Lieber, "Carbon nanotube atomic force microscopy tips: Direct growth by chemical vapor deposition and application to high-resolution imaging," Proc. Natl. Acad. Sci. (USA) 97 (2000): 3809-3813.
52. Natalya Shcherbinina, "Carbon Nanotube Tips for Atomic Force Microscopy," 28 Jun. 2001; http://cmliris.harvard.edu/html_natalya/research/probes/tip.html
53. E. W. Krahe, R. Mattes, K.-F. Tebbe, H. G. v. Schnering, G. Fritz, "Formation of organosilicons compounds. 47. The crystal and molecular structure of 1,3,5,7-tetramethyl-tetrasila-adamantane," Z. Anorg. Allg. Chem. 393 (1972): 74-80. In German.
54. R. Mattes, "Structure of organosilicon compounds. III. Vibrational spectra of 1,3,5,7-tetraethyl-silaadamantane," J. Molec. Structure 16(April 1973):53-58. In German.
55. G. Fritz, G. Marquardt, "Formation of organosilicons compounds. LIII. Novel carbosilanes by pyrolysis of $Si(CH_3)_4$ and their isolation," Z. Anorg. Allg. Chem. 404 (March 1974):1-37. In German.

56. Stephan Pawlenko, Organosilicon Chemistry, Walter de Gruyter, New York, 1986.
57. Cecil L. Frye, Jerome M. Kosowski, Donald R. Weyenberg, "1,3,5,7-tetrasilaadamantanes. A facile synthesis via catalyzed ligand redistribution," J. Am. Soc. 92(21 Oct. 1970):6379-6380.
58. M. Anthony McKervey, John J. Rooney, "Catalytic routes to adamantane and its homologues," in George A. Olah, ed., Cage Hydrocarbons, John Wiley & Sons, New York, 1990, pp. 39-64.
59. R. C. Bingham, P. v. R. Schleyer, Chemistry of Adamantanes: Recent Developments in the Chemistry of Adamantane and Related Polycyclic Hydrocarbons, Springer-Verlag, New York, 1971.
60. Raymond C. Fort, Jr., Adamantane: The Chemistry of Diamond Molecules, Marcel Dekker, New York, 1976.
61. Evgenii Ignatevich Bagrii, Adamantany: Poluchenie, Svoistva, Primenenie (Adamantanes: Preparation, Properties, and Application), Nauka Press, Moscow, 1989.
62. George A. Olah, ed., Cage Hydrocarbons, John Wiley & Sons, New York, 1990.
63. Paul von Rague Schleyer, "My thirty years in hydrocarbon cages: From adamantane to dodecahedrane," in George A. Olah, ed., Cage Hydrocarbons, John Wiley & Sons, New York, 1990, pp. 1-38.
64. W. D. Graham, P. von R. Schleyer, "Diamond lattice hydrocarbons: spiro[adamantane-2,2'-adamantane]," Tetrahedron Lett. 12 (1972): 1179-1180.
65. E. Boelema, J. Strating, Hans Wynberg, "Spiro[adamantane-2,2'-adamantane]," Tetrahedron Lett. (1972):1175-1177.
66. W. David Graham, Paul von R. Schleyer, Edward W. Hagaman, Ernest Wenkert, "[2] Diadamantane, the first member of a new class of diamondoid hydrocarbons," J. Am. Chem. Soc. 95(22 Aug. 1973):5785-5786.
67. Chris A. Cupas, Paul von R. Schleyer, David J. Trecker, "Congressane," J. Am. Chem. Soc. 87(20 Feb. 1965):917-918.
68. Van Zandt Williams, Jr., Paul von R. Schleyer, Gerald Jay Gleicher, Lynn B. Rodewald, "Triamantane," J. Am. Chem. Soc. 88(20 Aug. 1966):3862-3863.
69. O. Vogl, B. C. Anderson, D. M. Simons, "Synthesis of hexaoxadiamantanes," Tetrahedron Lett. (1966):415-418.
70. William Burns, Thomas R. B. Mitchell, M. Anthony McKervey, John J. Rooney, George Ferguson, Paul Roberts, "Gas-phase reactions on platinum. Synthesis and crystal structure of anti-tetramantane, a large diamondoid fragment," J. Chem. Soc. Chem. Commun. (1976):893-895.
71. William Burns, M. Anthony McKervey, Thomas R. B. Mitchell, John J. Rooney, "A new approach to the synthesis of diamondoid hydrocarbons: synthesis of anti-tetramantane," J. Am. Chem. Soc. 100 (1978):906-911.
72. Mingzuo Shen, Henry F. Schaefer III, Congxing Liang, Jenn-Huei Lii, Norman L. Allinger, Paul von Rague Schleyer, "Finite Td symmetry models for diamond: From adamantane to superadamantane (C35H36)," J. Am. Chem. Soc. 114 (1992):497-505.
73. A. C. Cupras, L. Hodakowski, (iceane), J. Am. Chem. Soc. 96 (1974):46684669.
74. D. P. G. Hamon, G. F. Taylor, (iceane), Tetrahedron Lett. (1975):155-158.
75. D. P. G. Hamon, C. L. Raston, G. F. Taylor, J. N. Varghese, A. H. White, Aust. J. Chem. 30 (1977): 1837-1840.
76. P. D. Ownby, "First commercial source of hexagonal diamond powder," submitted, 2004; http://www.umr.edu/~ownby/publications.html
77. S. Fahy, S. G. Louie, "High-pressure structural and electronic properties of carbon," Phys. Rev. B 36 (1987):3373-3385.
78. G. Laqua, H. Musso, W. Boland, R. Ahlrichs, J. Am. Chem. Soc. 112 (1990):7391-.
79. P. D. Ownby, X. Yang, J. Liu, "Calculated x-ray diffraction data for diamond polytypes," J. Amer. Ceramic Soc. 75 (1992):1876-1883.
80. Pierluigi Mercandelli, Massimo Moret, Angelo Sironi, "Molecular mechanics in crystalline media," Inorg. Chem. 37 (1998):2563-2569.
81. M. Nomura, P. von R. Schleyer, A. A. Arz, "Alkyladamantanes by rearrangement from diverse starting materials," J. Am. Chem. Soc. 89(5 Jul. 1967):3657-3659.
82. Zhu Feng, Marilee Brewer, Ian Brown, Kyriakos Komvopoulos, "Pretreatment process for forming a smooth surface diamond film on a carbon-coated substrate," U.S. Pat. No. 5,308,661, 3 May 1994.
83. A. A. Morrish, Pehr E. Pehrsson, "Effects of surface pretreatments on nucleation and growth of diamond films on a variety of substrates," Appl. Phys. Lett. 59(22 Jul. 1991):417-419; http://content.aip.org/APPLAB/v59/i4/417_1.html
84. Huimin Liu, David S. Dandy, "Studies on nucleation process in diamond CVD: An overview of recent developments," Diam. Relat. Mater. 4 (1995):1173-1188; http://navier.engr.colostate.edu/pubs/DRM1-Full.pdf. See also: Huimin Liu, David S. Dandy, Diamond Chemical Vapor Deposition: Nucleation and Early Growth Stages, Noyes Publications, Park Ridge, N.J., 1995; http://navier.engr.colostate.edu/pubs/BookSummary.pdf
85. Paul W. May, "Diamond thin films: a 21st-century material," Phil. Trans. R. Soc. Lond. A 358 (2000):473-495; http://www.chm.bris.ac.uk/pt/diamond/pdf/rscreview.pdf
86. Wei Zhu, Peichun Yang, Jeffrey T. Glass, "Method of fabricating oriented diamond films on nondiamond substrates and related structures," U.S. Pat. No. 5,449,531, 12 Sep. 1995.
87. Hiromu Shiomi, Naoji Fujimori, "Method for producing single crystal diamond film," U.S. Pat. No. 5,387,310, 7 Feb. 1995.
88. B. Lux, R. Haubner, "Nucleation and growth of low-pressure diamond," in R. E. Clausing, L. L. Horton, J. C. Angus, P. Koidl, eds., Diamond and Diamond-like Films and Coatings, Plenum Press, New York, 1991, p. 579-609.
89. B. V. Spitzyn, L. L. Bouilov, B. V. Dedjaguin, J. Crystal Growth 52 (1981):219.
90. J. W. Kim, Y. J. Baik, K. Y. Eun, in Y. Tzeng, M. Yoshikawa, M. Murakawa, A. Feldman, eds., Applications of Diamond Films and Related Materials, Elsevier Sci. Publ., New York 1991, p. 399.
91. Takahiro Imai, Naoji Fujimori, "Thin film single crystal diamond substrate," U.S. Pat. No. 4,863,529, 5 Sep. 1989.
92. R. Hultgren, P. D. Desai, D. T. Hawkins, M. Gleiser, K. K. Kelley, Selected Values of the Thermodynamic Properties of Binary Alloys, American Society for Metals, Metals Park, Ohio, 1973.
93. Robert A. Freitas Jr., Nanomedicine, Volume I: Basic Capabilities, Landes Bioscience, Georgetown, Tex., 1999, Appendix A.
94. H. O. Pierson, Handbook of Carbon, Graphite, Diamond and Fullerenes, Noyes Publications, Park Ridge, N.J., 1993; J. E. Field, The Properties of Diamond, Academic Press, London, 1979.
95. Michael J. Mehl, "Tight binding parameters for the elements," U.S. Naval Research Laboratory (NRL), 25 Jul. 2002; http://cst-www.nrl.navy.millbind/index.html 96. Robert C. Weast, Handbook of Chemistry and Physics, 49th Edition, CRC Press, Cleveland Ohio, 1968.
97. E. A. Brandes, Smithells Metals Reference Book, 6th edition, Butterworth & Co, London, 1983.
98. "WebElements" website, 2003; http://www.webelements.com/webelements/elements/text/<Symbol>/heat.html
99. "Sapphire Properties Table," MarkeTech International Inc., Port Townsend Wash., 21 Feb. 2002; http://www.mkt-intl.com/sapphires/sapphphotos.htm
100. S. M. Sze, Physics of Semiconductor Devices, Wiley Interscience Publications, New York, 1981, pp. 848-849; http://www.veeco.com/learning/learning_lattice.asp
101. http://www.impex-hightech.de/Quartz.html; http://www.argusinternational.com/quartz.html
102. J. Shackelford, W. Alexander, The CRC Materials Science and Engineering Handbook, CRC Press, Boca Raton Fla., 1992.
103. http://www.accuratus.com/silinit.html
104. http://www.lucasmilhaupt.com/htmdocs/brazing_support/everything_about_brazing/materials-co mp_chart.html
105. M. E. Bachlechner, A. Omeltchenko, A. Nakano, R. K. Kalia, P. Vashishta, A. Madhukar, P. Messina, "Multimillion-atom molecular dynamics simulation of atomic level stresses in Si(111)/Si3N4(0001) nanopixels," Appl. Phys. Lett. 72(20 Apr. 1998):1969-1971.
106. D. A. Papaconstantopoulos, M. J. Mehl, "First-principles study of superconductivity in high-pressure boron," 3 Jul. 2003; http://arxiv.org/pdf/cond-mat/0111385
107. G. V. Samsonov, The Oxide Handbook, IFI/Plenum Data Corporation, New York, 1973.
108. http://www.umsl.edu/~fraundor/rworld/msa99.pdf
109. A. V. Postnikov, P. Entel, "Ab initio molecular dynamics and elastic properties of TiC and TiN nanoparticles," University of Duisburg, 2003; http://www.thp.uni-duisburg.de/Paper/Postnik/tin_final.pdf
110. Toshimichi Ito, "Method for synthesis of diamond and apparatus therefor," U.S. Pat. No. 4,869,924, 26 Sep. 1989.
111. K. Kobayashi, M. Kumagai, S. Karasawa, T. Watanabe, F. Togashi, J. Cryst. Growth, 128 (1993):408.
112. S. J. Lin, S. L. Lee, J. Hwang, C. S. Chang, H. Y. Wen, "Effects of local facet and lattice damage on nucleation of diamond grown by microwave plasma chemical vapor deposition," Appl. Phys. Lett. 60(30 Mar. 1992):1559-1561; http://content.aip.org/APPLAB/v60/113/1559_1.html
113. K. Hirabayashi, Y. Taniguchi, O. Takamatsu, T. Ikeda, K. Ikoma, N. Iwasaki-Kurihara, "Selective deposition of diamond crystals by chemical vapor deposition using a tungsten-filament method," Appl. Phys. Lett. 53(7 Nov. 1988): 1815-1817; http://content.aip.org/APPLAB/v53/119/1815_1.html
114. S. Aisenberg, R. Chabot, "Ion-beam deposition of thin films of diamondlike carbon," J. Appl. Phys. 42 (1971): 2953.
115. V. E. StreInitskii, I. I. Aksenov, S. I. Vakula, V. G. Padakula, Sov. Phys. Tech. Phys. 23 (1978):222.
116. Mutsukazu Kamo, Seiichiro Matsumoto, Yoichiro Sato, Nobuo Setaka, "Method for synthesizing diamond," U.S. Pat. No. 4,434,188, 28 Feb. 1984.
117. Seiichiro Matsumoto, Mototsugu Hino, Yusuke Moriyoshi, Takashi Nagashima, Masayuki Tsutsumi, "Method for synthesizing diamond by using plasma," U.S. Pat. No. 4,767,608, 30 Aug. 1988.
118. John W. Rabalais, Srinandan R. Kasi, "Chemically bonded diamond films and method for producing same," U.S. Pat. No. 4,822,466, 18 Apr. 1989.
119. T. P. Ong, Fulin Xiong, R. P. H. Chang, C. W. White, "Nucleation and growth of diamond on carbon-implanted single crystal copper surfaces," J. Mater. Res. 7(September 1992):2429-2439; http://www.mrs.org/publications/jmr/jmra/1992/sep/P02429.PDF
120. Shuji Iino, Hideo Hotomi, Izumi Osawa, Mitsutoshi Nakamura, "Photosensitive member with hydrogen-containing carbon layer," U.S. Pat. No. 4,743,522, 10 May 1988.
121. Kiyoshi Morimoto, Toshinori Takagi, "Ion beam deposition apparatus," U.S. Pat. No. 4,559,901, 24 Dec. 1985.
122. Karin Larsson, "Migration of species on a diamond (111) surface," in J. L. Davidson, W. D. Brown, A. Gicquel, B. V. Spitsyn, J. C. Angus, eds., Proc. Fifth Intl. Symp. on Diamond Materials, The Electrochemical Society, Pennington, N.J., 1998, pp. 247-253.
123. S. P. Mehandru, Alfred B. Anderson, "Adsorption of H, $CH_3$, $CH_2$ and $C_2H_2$ on 2×1 restructured diamond (100)," Surf. Sci. 248(June 1991):369-381.
124. Michael Frenklach, Sergei Skokov, "Surface migration in diamond growth," J. Phys. Chem. 101 (1997):3025-3036.
125. E. J. Dawnkaski, D. Srivastava, B. J. Garrison, "Time dependent Monte Carlo simulations of H reactions on the diamond (001)(2×1) surface under chemical vapor deposition conditions," J. Chem. Phys. 102(15 Jun. 1995):9401-9411; http://galilei.chem.psu.edu/pdf/147bjg.pdf
126. Frank Jansen, Mary A. Machonkin, "Processes for the preparation of polycrystalline diamond films," U.S. Pat. No. 4,925,701, 15 May 1990.
127. Allen R. Kirkpatrick, "Diamond films and method of growing diamond films on nondiamond substrates," U.S. Pat. No. 5,082,359, 21 Jan. 1992.
128. Michael J. Ulczynski, Donnie K. Reinhard, Jes Asmussen, "Process for depositing adherent diamond thin films," U.S. Pat. No. 5,897,924, 27 Apr. 1999.
129. Japanese Patent Application, Abstract No. 2138395, June 1987; cited in Frank Jansen, Mary A. Machonkin, "Processes for the preparation of polycrystalline diamond films," U.S. Pat. No. 4,925,701, 15 May 1990.
130. Bing-Kun Yu, "Preparation of diamond and diamond-like thin films," U.S. Pat. No. 5,273,788, 28 Dec. 1993.
131. James Chickos, Donald Hesse, Sarah Hosseini, Gary Nichols, Paul Webb, "Sublimation enthalpies at 298.15 K using correlation gas chromatography and differential scanning calorimetry measurements," Thermochimica Acta 313 (1998): 101-110; http://www.umsl.edu/~jscumsl/JSCPUBS/seale.pdf
132. C. W. F. T. Pistorius, H. C. Snyman, Z. Physik Chem. 43 (1964):278; C. W. F. T. Pistorius, H. A. Resing, Mol. Cryst. Liq. Cryst. 5 (1969):353.
133. Ilham Mokbel, Kvetoslav Ruzicka, Vladimir Majer, Vlastimil Ruzicka, Madeleine Ribeiro, Jacques Jose, Milan Zabransky, "Phase equilibria (v-s, v-l) for three compounds of petroleum interest: 1-phenyldodecane, (5a)-cholestane, adamantane," Fluid Phase Equilibria 169 (2000):191-207.
134. Sang Tae Park, Sang Kyu Kim, Myung Soo Kim, "Observation of conformation-specific pathways in the photodissociation of 1-iodopropane ions," Nature 415(17 Jan. 2002):306-308.
135. G. Lucovsky, P. D. Richards, R. J. Markura, paper presented at Workshop of Dielectric Systems for III-V Semiconductors, San Diego Calif., 26-27 May 1984.

136. P. D. Richard, R. J. Markunas, G. Lucovsky, G. G. Fountain, A. N. Mansour, D. V. Tsu, "Remote plasma enhanced CVD deposition of silicon nitride and oxide for gate insulators in (In, Ga)AS FET devices," J. Vac. Sci. Technology A 3(May-June 1985):867-872.

137. Chandra V. Desphandey, Rointan F. Bunshah, Hans J. Doerr, "Process for making diamond, doped diamond, diamond-cubic boron nitride composite films," U.S. Pat. No. 4,816,291, 28 Mar. 1989.

138. S. W. Hla, L. Bartels, G. Meyer, K.-H. Rieder, "Inducing all steps of a chemical reaction with the scanning tunneling microscop tip: Towards single molecule engineering," Phys. Rev. Lett. 85 (2000):2777-2780; http://www.phy.ohiou.edu/~hla/7.pdf 139. Saw-Wai Hla, Gerhard Meyer, Karl-Heinz Rieder, "Inducing single-molecule chemical reactions with a UHV-STM: A new dimension for nano-science and technology," Chem. Phys. Chem. 2 (2001):361-366; http://plato.phy.ohiou.edu/~hla/HLA2001-1.pdf 140. Saw-Wai Hla, Karl-Heinz Rieder, "STM control of chemical reactions: single-molecule synthesis," Annu. Rev. Phys. Chem. 54(June 2003):307-330; http://www-.phy.ohiou.edu/~hla/HLA-annualreview.pdf 141. William L. Masterton, Emil J. Slowinski, Chemical Principles, Second Edition, W.B. Saunders Co., Philadelphia, Pa., 1969, pp. 215, 299.

142. Robert A. Freitas Jr., Nanomedicine, Volume IIA: Biocompatibility, Landes Bioscience, Georgetown, Tex., 2003, p. 64.

143. R. Taylor, D. R. M. Walton, "The chemistry of fullerenes," Nature 363 (1993):685.

144. F. Diederich, C. Thilgen, "Covalent fullerene chemistry," Science 271(19 Jan. 1996):317-323.

145. B. Ni, S. B. Sinnott, "Chemical functionalization of carbon nanotubes through energetic radical collisions," Phys. Rev. B 61 (2000):R16343—R16346.

146. Sarbajit Banerjee, Stanislaus S. Wong, "Functionalization of Carbon Nanotubes with a Metal-Containing Molecular Complex," Nano Letters 2 (2002):49-53.

147. Keun Soo Kim, Kyung Ah Park, Hyun Jin Kim, Dong Jae Bae, Seong Chu Lim, Young Hee Lee, Jae Ryong Kim, Ju-Jin Kim, Won Bong Choi, "Band Gap Modulation of a Carbon Nanotube by Hydrogen Functionalization," J. Korean Phys. Soc. 42(February 2003):S137-S142; http://nanotube.skku.ac.kr/data/paper/KSKim_JKPS.pdf 148. Sarbajit Banerjee, Michael G. C. Kahn, Stanislaus S. Wong, "Rational Chemical Strategies for Carbon Nanotube Functionalization," Chem. Eur. J. 9 (2003): 1898-1908.

149. Frank J. Owens, Zafar Iqbal, "Electrochemical Functionalization Of Carbon Nanotubes With Hydrogen," 23rd Army Science Conference, Session L Poster Summaries: Nanotechnology, LP-11, 2002; http://www.asc2002.com/summaries/1/LP-11.pdf 150. J. L. Bahr, J. P. Yang, D. V. Kosynkin, M. J. Bronikowski, R. E. Smalley, J. M. Tour, "Functionalization of carbon nanotubes by electrochemical reduction of aryl diazonium salts: A bucky paper electrode," J. Am. Chem. Soc. 123 (2001):6536-6542; http://smalley.rice.edu/rick's publications/JACS 123-6536.pdf 151. Kevin D. Ausman, Henry W. Rohrs, MinFeng Yu, Rodney S. Ruoff, "Nanostressing and mechanochemistry," Nanotechnology 110(September 1999):258-262.

152. X. Lu, X. Xu, N. Wang, Q. Zhang, "A DFT study of the 1,3-dipolar cycloadditions on the C(100)-2×1 surface," J. Org. Chem. 67(25 Jan. 2002):515-520.

153. R. W. Hoffmann, Dehydrobenzene and Cycloalkynes, Verlag Chemie-Academic Press, New York, 1967.

154. Richard Jaffe, Jie Han, Al Globus, "Formation of Carbon Nanotube Based Gears: Quantum Chemistry and Molecular Mechanics Study of the Electrophilic Addition of o—Benzyne to Fullerenes, Graphene, and Nanotubes," First Electronic Molecular Modeling & Graphics Society Conference, 1996; http://www.nas.nasa.gov/Groups/Nanotechnology/publications/MGMS_EC1/quantum/paper.html 155. Al Globus, Richard Jaffe, "NanoDesign: Concepts and Software for a Nanotechnology Based on Functionalized Fullerenes," First Electronic Molecular Modeling & Graphics Society Conference, 1996; http://www.nas.nasa.gov/GroupsINanotechnology/publications/MGM-S_EC1/NanoDesign/paper.html 156. R. J. Hamers, S. K. Coulter, M. D. Ellison, J. S. Hovis, D. F. Padowitz, M. P. Schwartz, C. M. Greenlief, J. N. Russell Jr., "Cycloaddition chemistry of organic molecules with semiconductor surfaces," Acc. Chem. Res. 33(September 2000):617-624.

157. Yoshikatsu Namba, "Attempt to grow diamond phase carbon films from an organic solution," J. Vac. Sci. Technol. A 10(September/October 1992):3368-3370.

158. P. Aublanc, V. P. Novikov, L. V. Kuznetsova, M. Mermoux, "Diamond synthesis by electrolysis of acetates," Diam. Rel. Mater. 10(March-July 2001):942-946.

159. Steven H. Hoke, Jay Molstad, Dominique Dilettato, Mary Jennifer Jay, Dean Carlson, Bart Kahr, R. Graham Cooks, "Reaction of Fullerenes and Benzyne," J. Org. Chem. 57(11 Sep. 1992):5069-5071.

160. M. S. Meier, G. W. Wang, R. C. Haddon, C. P. Brock, M. A. Lloyd, J. P. Selegue, "Benzyne adds across a closed 5-6 ring fusion in $C_{70}$: Evidence for bond delocalization in fullerenes," J. Am. Chem. Soc. 120 (1998):2337-2342

161. L. Giraud, V. Huber, T. Jenny, "2,2-Divinyladamantane: a new substrate for the modification of silicon surfaces," Tetrahedron 54 (1998):11899-11906.

162. E. Leroy, O. M. Kuttel, L. Schlapbach, L. Giraud, T. Jenny, "Chemical vapor deposition of diamond growth using chemical precursor," Appl. Phys. Lett. 73(24 Aug. 1998): 1050-1052.

163. Anne Giraud, Titus Jenny, Eric Leroy, Olivier M. Kuttel, Louis Schlapbach, Patrice Vanelle, Luc Giraud, "Chemical nucleation for CVD diamond growth," J. Am. Chem. Soc. 123 (2001):2271-2274.

164. Liliana Dumitrescu Buform, Eberhard Blank, "Diamond nucleation on chemically modified silicon using HFCVD," Paper G/P11.35, Session X: Multilayer Coatings, Symposium G, E-MRS Spring Meeting 2003, 10-13 Jun. 2003; http://www-emrs.c-strasbourg.fr/2003 SPRING/2003ABSTRACTS/2003_G_ABS.PDF 165. L. H. Sommer, E. W. Pietrusza, F. C. Whitmore, J. Am. Chem. Soc. 69 (1947):188.

166. C. Chatgilialoglu, "Organosilanes as radical-based reducing agents in synthesis," Acc. Chem. Res. 25 (1992): 188-194.

167. B. Kopping, C. Chatgilialoglu, M. Zehnder, B. Giese, J. Org. Chem. 57 (1992):3994-4000.

168. W. I. Bevan, R. N. Haszeldine, J. Middleton, A. E. Tipping, J. Chem. Soc., Perkin Trans. 1(1974):2305-2309.

169. K. Yamamoto, T. Hayashi, M. Kumada, J. Organomet. Chem. 28 (1971):C37-C38.

170. J. L. Speier, "Homogeneous Catalysis Hydrosilation by Transition Metals," in F. G. A. Stones, R. West, eds., Advances in Organometallic Chemistry, Vol. 17, Academic Press, New York, 1979, pp. 407-447.

171. K. Tamao, T. Nakajima, R. Sumiya, H. Arai, N. Higuchi, Y. Ito, J. Am. Chem. Soc. 108 (1986):6090-6093.
172. M. Tanaka, Y. Uchimari, H. J. Lautenschlager, Organometallics 10 (1991):16-18.
173. L. N. Lewis, J. Stein, R. E. Colborn, Y. Gao, J. Dong, "The chemistry of fumarate and maleate inhibitors with platinum hydrosilylation catalysts," J. Organomet. Chem. 521 (1996):221-227.
174. John C. Angus, Phillip W. Morrison, "Diamond Lab," Case Western Reserve University, 1998; http://web.archive.org/web/19981206235656/http://k2.scl.cwru.edu/cse/eche/faculty/angus/diamo nd.htm
175. K. Bando, K. Kamo, T. Ando, Y. Sato, "Deposition of diamond crystal at substrate temperature lower than 500° C.," in Russell Messier, Jeffrey T. Glass, James E. Butler, Rustum Roy, eds., Proceedings of the Second International Conference, New Diamond Science and Technology, Materials Research Society, Pittsburgh, Pa., 1991, pp. 467-472.
176. Argonne National Laboratory, "Diamond Films for Microelectromechanical Systems (MEMS)"; http://www.techtransfer.anl.gov/techtour/diamondmems.html
177. M. Tomellini, "Evidence for nonclassical nucleation at solid surfaces in diamond deposition from the gas phase," J. Mater. Res. 8(July 1993):1596-1604.
178. A. R. Badzian, R. C. DeVries, "Crystallization of diamond from the gas phase: Part I," Mater. Res. Soc. Bull. 23 (1988):385400.
179. A. R. Badzian, T. Badzian, R. Roy, R. Messier, K. E. Spear, "Crystallization of diamond crystals and films by microwave assisted CVD (Part II)," Mater. Res. Soc. Bull. 23(April 1988):531-548.
180. P. Badziag, W. S. Verwoerd, W. P. Ellis, N. R. Greiner, "Nanometre-sized diamonds are more stable than graphite," Nature 343 (1990):244-245.
181. Burak Atakan, Karsten Lummer, Katharina Kohse-Hoinghaus, "Diamond deposition in acetylene-oxygen: nucleation and early growth on molybdenum substrates for different pretreatment procedures," Phys. Chem. Chem. Phys. 1 (1999):3151-3156; http://www.rsc.org/ej/CP/1999/F9901945.PDF
182. D. S. Knight, W. B. White, "Characterization of diamond films by Raman spectroscopy," J. Mater. Res. 4(March-April 1989):385-393.
183. L. Fayette, M. Mermoux, B. Marcus, F. Brunet, P. Germi, M. Pemet, L. Abello, G. Lucazeau, J. Garden, "Analysis of the fine structure of the Raman line and x-ray reflection profiles for textured CVD diamond films," Diam. Rel. Mater. 4 (1995):1243-1250.
184. F. P. Bundy, J. S. Kasper, "Hexagonal diamond—A new form of carbon," J. Chem. Phys. 46(1 May 1967):3437-3446.
185. R. E. Hanneman, H. M. Strong, F. P. Bundy, "Hexagonal diamonds in meteorites: implications," Science (24 Feb. 1967):995-997.
186. Hongliang He, T. Sekine, T. Kobayashi, "Direct transformation of cubic diamond to hexagonal diamond," Appl. Phys. Lett. 81(22 Jul. 2002):610-612; http://content.aip.org/APPLAB/v81/i4/610_1.html
187. D. V. Fedoseev, V. L. Bukhovets, I. G. Varshavskaya, A. V. Lavrentev, B. V. Detjaguin, "Transition of graphite into diamond in a solid phase under the atmospheric pressure," Carbon 21 (1983):237-241.
188. B. K. Roul, B. B. Nayak, P. K. Mishra, B. C. Mohanty, "Diamond and diamond-like-carbon growth on Si(100) by hot filament-assisted RF plasma CVD," J. Mater. Synth. Proc. 7 (1999):281-288.
189. S. Bhargava, H. D. Bist, S. Sahli, M. Aslam, H. B. Tripathi, "Diamond polytypes in the chemical vapor deposited diamond films," Appl. Phys. Lett. 67(December 1995):1706-1708.
190. J. C. Angus, F. A. Buck, M. Sunkara, T. F. Groth, C. C. Hayman, R. Gat, "Diamond growth at low pressures," MRS Bull. 1989(October 1989):38-47.
191. John C. Angus, Cliff C. Hayman, "Low-pressure, metastable growth of diamond and 'diamondlike' phases," Science 241(19 Aug. 1988):913-921.
192. R. E. Clausing, L. Heatherly, K. L. More, G. M. Begun, "Electron microscopy of the growth features and crystal structures of filament-assisted CVD diamond films," Surf. Coatings Technol. 39/40 (1989): 199-210.
193. B. E. Williams, J. T. Glass, R. F. Davis, K. Kobashi, "The analysis of defect structures and substrate/film interfaces of diamond thin films," J. Cryst. Growth 99 (1990): 1168-1176.
194. Keiji Hirabayashi, Noriko Iwasaki Kurihara, Naoto Ohtake, Masanori Yoshikawa, "Size dependence of morphology of diamond surfaces prepared by DC arc plasma jet chemical vapor deposition," Jpn. J. Appl. Phys. 31(February 1992):355-360.
195. R. C. DeVries, "Synthesis of diamond under metastable conditions," Annu. Rev. Mater. Sci. 17 (1987):161-176.
196. E. Burgos, E. Halac, H. Bonadeo, "A semi-empirical potential for the statics and dynamics of covalent carbon systems," Chem. Phys. Lett. 298(18 Dec. 1998):273-278.
197. L. V. Zhigilei, D. Srivastava, and B. J. Garrison, "Intermediate metastable structure of the C{111}/(1×1)H—C{111}/(2×1) surface phase transition," Phys. Rev. B 55 (1997):1838-1843; http://galilei.chem.psu.edu/pdf/155bjg.pdf
198. B. E. Williams, J. T. Glass, R. F. Davis, K. Kobashi, K. L. More, in J. P. Dismukes, ed., Proc. First Intl. Symp. On Diamond and Diamond-like Films, Electrochemical Society, New York, 1989, p. 202.
199. John C. Angus, Alberto Argoitia, Roy Gat, Zhidan Li, Mahendra Sunkara, Long Wang, Yaxin Wang, "Chemical vapour deposition of diamond," in A. Lettington, J. W. Steeds, eds., Thin Film Diamond, Chapman and Hall, London, 1994, pp. 1-14; see also in: Phil. Trans. R. Soc. London A 342 (1993):195-208.
200. C. Wild, R. Kohl, N. Herres, W. Muller—Sebert, P. Koidl, "Oriented CVD diamond films: twin formation, structure and morphology," Diam. Rel. Mater. 3(April 1994):373-381.
201. K. E. Spear, M. Frenklach, in K. E. Spear, J. P. Dismukes, eds., Synthetic Diamond: Emerging CVD Science and Technology, John Wiley & Sons, New York, 1993, pp. 243-304.
202. H. Sowa, E. Koch, "A proposal for a transition mechanism from the diamond to the lonsdaleite type," Acta Crystallogr. A 57(July 2001):406-413.
203. C. C. Battaile, D. J. Srolovitz, I. I. Oleinik, D. G. Pettifor, A. P. Sutton, S. J. Harris, J. E. Butler, "Etching effects during the chemical vapor deposition of (100) diamond," J. Chem. Phys. 111(1 Sep. 1999):4291-4299; http://www-.princeton.edu/~pmi/srolgroup/publications/JCP04291.pdf
204. K. E. Spear, "Diamond, ceramic coating of the future," J. Am. Ceram. Soc. 72 (1989):171-191.
205. Andrzej Badzian, Teresa Badzian, "Diamond homoepitaxy by chemical vapor deposition," Diam. Rel. Mater. 2(31 Mar. 1993):147-157.
206. C. Wild, P. Koidl, W. Muller—Sebert, H. Walcher, R. Kohl, N. Herres, R. Locher, R. Samlenski, R. Brenn, "Chemical vapour deposition and characterization of smooth {100}-faceted diamond films," Diam. Rel. Mater. 2 (1993):158-168.

207. G. Janssen, J. J. Schermer, W. J. P. van Enckevort, L. J. Giling, "On the occurrence of (113) facets on CVD-grown diamond," J. Cryst. Growth 125(November 1992):42-50.

208. K. A. Snail, Z. P. Lu, R. Weimer, J. Heberlein, E. Pfender, L. M. Hanssen, "Confirmation of (113) facets on diamond grown by chemical vapor deposition," J. Cryst. Growth 137(April 1994):676-679.

209. C. J. Chu, M. P. D'Evelyn, R. H. Hauge, J. L. Margrave, "Mechanism of diamond growth by chemical vapor deposition on diamond (100), (111), and (110) surfaces: Carbon-13 studies," J. Appl. Phys. 70(1 Aug. 1991):1695-1705.

210. C. J. Chu, R. H. Hauge, J. L. Margrave, M. P. D'Evelyn, "Growth kinetics of (100), (110), and (111) homoepitaxial diamond films," Appl. Phys. Lett. 61(21 Sep. 1992):1393-1395.

211. S. S. Lee, D. W. Minsek, D. J. Vestyck, P. Chen, "Growth of diamond from atomic hydrogen and a supersonic freejet of methyl radicals," Science 263(18 Mar. 1994):1596-1598.

212. R. E. Rawles, W. G. Morris, M. P. D'Evelyn, in D. L. Dreifus, A. Collins, T. Humphreys, K. Das, P. E. Pehrsson, eds., Diamond for Electronic Applications, Symp. Proc. 416, Materials Research Society, Pittsburgh, Pa., 1996, pp. 13-18.

213. Nigel P. Hacker, George W. Tyndall, III, "Deposition of diamond films," U.S. Pat. No. 4,948,629, 14 Aug. 1990.

214. Richard A. Neifeld, "Method of preparing a thin diamond film," U.S. Pat. No. 4,954,365, 4 Sep. 1990.

215. T. P. Mollart, K. L. Lewis, "Optical-quality diamond growth from $CO_2$-containing gas chemistries," Diam. Relat. Mater. 8(March 1999):236-241.

216. Marcus Asmann, Joachim Heberlein, Emil Pfender, "A review of diamond CVD utilizing halogenated precursors," Diam. Relat. Mater. 8(1 Jan. 1999):1-16.

217. O. Tschauner, H. K. Mao, R. J. Hemley, "New transformations of CO(2) at high pressures and temperatures," Phys. Rev. Lett. 87(13 Aug. 2001):075701.

218. Y. Namba, Jin Wie, T. Mohri, E. A. Heidarpour, "Large grain size thin films of carbon with diamond structure," J. Vac. Sci. Technol. A 7(January-February 1989):36-39.

219. C. V. Burton, "Artificial diamonds," Nature 72(24 Aug. 1905):397.

220. Yadong Li, Yitai Qian, Hongwei Liao, Yi Ding, Li Yang, Cunyi Xu, Fangqing Li, Guien Zhou, "A reduction-pyrolysis-catalysis synthesis of diamond," Science 281(10 Jul. 1998):246-247.

221. S. Feng, R. Xu, "New materials in hydrothermal synthesis," Acc. Chem. Res. 34(March 2001):239-247.

222. Stephen A. Godleski, Paul von Rague Schleyer, Eiji Osawa, Todd Wipke, "The systematic prediction of the most stable neutral hydrocarbon isomer," Prog. Phys. Org. Chem. 13 (1981):63-117.

223. Stephen E. Stein, "Diamond and graphite precursors," Nature 346(9 Aug. 1990):517.

224. Donald E. Patterson, Robert H. Hauge, C. Judith Chu, John L. Margrave, "Halogen-assisted chemical vapor deposition of diamond," U.S. Pat. No. 5,071,677, 10 Dec. 1991.

225. P. G. Lurie, J. M. Wilson, "The diamond surface. I. The structure of the clean surface and the interaction with gases and metals," Surf. Sci. 65 (1977):453-475.

226. K. Bobrov, B. Fisgeer, H. Shechter, M. Folman, A. Hoffman, "Thermally-programmed desorption (TPD) of deuterium from Di(111) surface: presence of two adsorption states," Diam. Rel. Mater. 6(April 1997):736-742.

227. B. B. Pate, "The diamond surface: Atomic and electronic structure," Surf. Sci. 165 (1986):83-142.

228. G. R. Brandes, A. P. Mills, Jr., "Work function and affinity changes associated with the structure of hydrogen-terminated diamond (100) surfaces," Phys. Rev. B 58(15 Aug. 1998):4952-4962.

229. "Zyvex's S100 Nanomanipulator System," http://www-.zyvex.com/Products/S100_Faq.html; "Zyvex Microgrippers," http://www.zyvex.com/Products/Grippers.html 230. Klocke Nanotechnik, "Manipulators: Univeral Tools with 1 Nanometer Resolution," http://www.nanomotor.de/p_nanomanipulator.htm; "SEM-Manipulators," http://www.nanomotor.de/pdf/Compare e_lo.PDF; "Processing Material in Electron Microscopes: Nanomanipulation With Several D.O.F." http://www.nanomotor.de/aa_processing.htm 231. W. C. Gardiner Jr., Rates and Mechanisms of Chemical Reactions, Benjamin, New York, 1969.

232. W. F. Brunner Jr., T. H. Batzer, Practical Vacuum Techniques, Reinhold Publishing, New York, 1965, p. 124.

233. "Vacuum Pumps," McGraw Hill Encyclopedia of Science and Technology, Vol. 19, 1992, p. 128.

234. Robert A. Freitas Jr., Ralph C. Merkle, Diamond Surfaces and Diamond Mechanosynthesis, Landes Bioscience, Georgetown, Tex., 2005. In preparation.

What is claimed is:

1. A capped tooltip molecule having a tip end and a nucleation-site handle end distal to the tip end, wherein the capped tooltip molecule comprises:

one or more adamantane molecules arranged in a polymantane or lonsdaleite configuration to form a base molecule, the base molecule having at least one bridgehead carbon substituted with a dimerholder atom X, wherein the dimerholder atom X is selected from the group consisting of a Group III element, a Group IV element other than carbon, and a Group V element, to form a tip end of the tooltip molecule; and a capped carbon dimer covalently bonded to the dimerholder atom X wherein the capped carbon dimer has a structure selected from the group consisting of =C-cap and =C-cap-C=;

wherein when the capped carbon dimer has the structure =C-cap, the -cap is selected from the group consisting of: —H, —F, —Cl, —Br, —I, —Li, —Na, —K, —Rb, —Cs, —OH, —OF, —OCl, —OBr, —OI, —OLi, —ONa, —OK, —ORb, —OCs, —SH, —SF, —SCl, —SBr, —SI, —SLi, —SNa, —SK, —SRb, —SCs, —SeH, —SeF, —SeCl, —SeBr, —SeI, —SeLi, —SeNa, —SeK, —SeRb, —SeCs, —TeH, —TeF, —TeCl, —TeBr, —TeI, —TeLi, —TeNa, —TeK, —TeRb, —TeCs, —BeH, —BeF, —BeCl, —BeBr, —BeI, —MgH, —MgF, —MgCl, —MgBr, —MgI, —CaH, —CaF, —CaCl, —CaBr, —CaI, —SrH, —SrF, —SrCl, —SrBr, —SrI, —BaH, —BaF, —BaCl, —BaBr, —BaI, —$NH_2$, —$PH_2$, —$AsH_2$, —$SbH_2$, —$BiH_2$, —$NLi_2$, —$PLi_2$, —$AsLi_2$, —$SbLi_2$, —$BiLi_2$, —$BH_2$, —$AlH_2$, —$GaH_2$, —$InH_2$, —$TlH_2$, —$BLi_2$, —$AlLi_2$, —$GaLi_2$, —$InLi_2$, —$TlLi_2$ —$NF_2$, —$PF_2$, —$AsF_2$, —$SbF_2$, —$BiF_2$, —$NNa_2$, —$PNa_2$, —$AsNa_2$, —$SbNa_2$, —$BiNa_2$, —$BF_2$, —$AlF_2$, —$GaF_2$, —$InF_2$, —$TlF_2$, —$BNa_2$, —$AlNa_2$, —$GaNa_2$, —$InNa_2$, —$TlNa_2$, —$NCl_2$, —$PCl_2$, —$AsCl_2$, —$SbCl_2$, —$BiCl_2$, —$NK_2$, —$PK_2$, —$AsK_2$, —$SbK_2$, —$BiK_2$, —$BCl_2$, —$AlCl_2$, —$GaCl_2$, —$InCl_2$, —$TlCl_2$, —$BK_2$, —$AlK_2$, —$GaK_2$, —$InK_2$, —$TlK_2$, —$NBr_2$, —$PBr_2$, —AsBr₂, —SbBr₂, —BiBr₂, —NRb₂, —PRb₂, —AsRb₂, —SbRb₂, —BiRb₂, —BBr₂, —AlBr₂, —GaBr₂, —InBr₂, —TlBr₂, —BRb₂, —AlRb₂, —GaRb₂, —InRb₂, —TlRb₂, —NI₂, —PI₂, —AsI₂, —SbI₂, —BiI₂, —NCs₂, —PCs₂, —AsCs₂, —SbCs₂, —BiCs₂, —BI₂, —AlI₂, —GaI₂, —InI₂, —TlI2, —BCs₂, —AlCs₂, —GaCs₂, —InCs₂, —TlCs₂, methyl, vinyl, ethyl, carboxyl, methoxy, formyl, acetyl, and phenyl; and wherein when the capped carbon dimer has the structure =C-cap-C=, the -cap- is selected from the group consisting of: —O—, —O-O—, —S—, —S—S—, —Se—, —Se—Se—, —Te—, —Te—Te—, —Be—, —Be—Be—, —Mg—, —Mg—Mg—, —Ca—, —Ca—Ca—, —Sr—, —Sr—Sr—, —Ba—, —Ba—Ba—, —NH—, —NHHN—, —PH—, —PHHP—, —AsH—, —AsHHAs—, —SbH—, —SbHHSb—, —BiH—, —BiHHBi—, —BH—, —BHHB—, —AlH—, —AlHHAl—, —GaH—, —GaHHGa—, —InH—, —InHHIn—, —TlH—, —TlHHTl—, —NLi—, —NLiLiN—, —PLi—, —PLiLiP—, —AsLi—, —AsLiLiAs—, —SbLi—, —SbLiLiSb—, —BiLi—, —BiLiLiBi—, —BLi—, —BLiLiB—, —AlLi—, —AlLiLiAl—, —GaLi—, —GaLiLiGa—, —InLi—, —InLiLiIn—, —TlLi—, —TlLiLiTl—, —NF—, —NFFN—, —PF—, —PFFP—, —AsF—, —AsFFAs—, —SbF—, —SbFFSb—, —BiF—, —BiFFBi—, —BF—, —BFFB—, —AlF—, —AlFFAl—, —GaF—, —GaFFGa—, —InF—, —InFFIn—, —TlF—, —TlFFTl—, —NNa—, —NNaNaN—, —PNa—, —PNaNaP—, —AsNa—, —AsNaNaAs—, —SbNa—, —SbNaNaSb—, —BiNa—, —BiNaNaBi—, —BNa—, —BNaNaB—, —AlNa—, —AlNaNaAl—, —GaNa—, —GaNaNaGa—, —InNa—, —InNaNaIn—, —TlNa—, —TlNaNaTl—, —NCl—, —NClClN—, —PCl—, —PClClP—, —AsCl—, —AsClClAs—, —SbCl—, —SbClClSb—, —BiCl—, —BiClClBi—, —BCl—, —BClClB—, —AlCl—, —AlClClAl—, —GaCl—, —GaClClGa—, —InCl—, —InClClIn—, —TlCl—, —TlClClTl—, —NK—, —NKKN—, —PK—, —PKKP—, —AsK—, —AsKKAs—, —SbK—, —SbKKSb—, —BiK—, —BiKKBi—, —BK—, —BKKB—, —AlK—, —AlKKAl—, —GaK—, —GaKKGa—, —InK—, —InKKIn—, —TlK—, —TlKKTl—, —NBr—, —NBrBrN—, —PBr—, —PBrBrP—, —AsBr—, —AsBrBrAs—, —SbBr—, —SbBrBrSb—, —BiBr—, —BiBrBrBi—, —BBr—, —BBrBrB—, —AlBr—, —AlBrBrAl—, —GaBr—, —GaBrBrGa—, —InBr—, —InBrBrIn—, —TlBr—, —TlBrBrTl—, —NRb—, —NRbRbN—, —PRb—, —PRbRbP—, —AsRb—, —AsRbRbAs—, —SbRb—, —SbRbRbSb—, —BiRb—, —BiRbRbBi—, —BRb—, —BRbRbB—, —AlRb—, —AlRbRbAl—, —GaRb—, —GaRbRbGa—, —InRb—, —InRbRbIn—, —TlRb—, —TlRbRbTl—, —NI—, —NIIN—, —PI—, —PIIP—, —AsI—, —AsIIAs—, —SbI—, —SbIISb—, —BiI—, —BiIIBi—, —BI—, —BIIB—, —AlI—, —AlIIAl—, —GaI—, —GaIIGa—, —InI—, —InIIIn—, —TlI—, —TlIITl—, —NCs—, —NCsCsN—, —PCs—, —PCsCsP—, —AsCs—, —AsCsCsAs—, —SbCs—, —SbCsCsSb—, —BiCs—, —BiCsCsBi—, —BCs—, —BCsCsB—, —AlCs—, —AlCsCsAl—, —GaCs—, —GaCsCsGa—, —InCs—, —InCsCsIn—, —TlCs—, and —TlCsCsTl—.

2. The capped tooltip molecule of claim 1 wherein the capped carbon dimer has the structure =C-cap.

3. The capped tooltip molecule of claim 2 wherein the -cap is selected from the group consisting of methoxy, —H, —F, —Cl, —Br, —I, and —OH.

4. The capped tooltip molecule of claim 3 wherein the -cap is —I.

5. The capped tooltip molecule of claim 1 wherein the capped carbon dimer has the structure =C-cap-C=.

6. The capped tooltip molecule of claim 5 wherein the -cap- is selected from the group consisting of —O—, and —S—.

7. The capped tooltip molecule of claim 5 wherein the -cap- is —O—.

8. The capped tooltip molecule of claim 1 wherein the dimerholder atom is selected from the group consisting of Si, Ge, Sn and Pb.

9. The capped tooltip molecule of claim 1 wherein the dimerholder atom is selected from the group consisting of N, P, As, Sb, Bi, B, Al, Ga, In, and Tl.

10. The capped tooltip molecule of claim 1 comprising a structure:

11. A device for diamond handle attachment to a tooltip molecule, comprising:
    a tooltip molecule having a tip end and a nucleation-site, handle end distal to the tip end, wherein the tooltip molecule comprises:
        one or more adamantane molecules arranged in a polymantane or lonsdaleite configuration to form a base molecule, the base molecule having at least one carbon substituted with a dimerholder atom X, wherein the dimerholder atom X is selected from the group consisting of a Group III element, a Group IV element other than carbon, and a Group V element, to form a tip end of the tooltip molecule; and
        a carbon dimer covalently bonded to the dimerholder atom X; and
    deposition surface material covalently bonded to the carbon dimer, wherein the deposition surface material is selected from the group consisting of a metal, an alloy and an element having:
    a melting point of at least 300° C.,
    a thermal expansion coefficient maximally different than that of diamond,
    a mismatch in crystal lattice constant as compared to that of diamond,
    resistance to carbide formation,
    less bonding strength to the carbon dimer as compared to bonding strength between the dimerholder atom X and the carbon dimer, and
    little or no solubility or reaction with carbon.

12. The device for diamond handle attachment of claim 11 wherein the dimerholder atom is selected from the group consisting of Si, Ge, Sn and Pb.

13. The device for diamond handle attachment of claim 11 wherein the dimerholder atom is selected from the group consisting of N, P, As, Sb, and Bi.

14. The device for diamond handle attachment of claim 11 wherein the dimerholder atom is selected from the group consisting of B, Al, Ga, In, and Tl.

15. The device for diamond handle attachment of claim 11 wherein the carbon dimer is a double bonded carbon dimer.

16. The device for diamond handle attachment of claim 11 wherein the deposition surface material is selected from the group consisting of graphite, $Al_2O_3$, Pb, Sn, Ge, Cu, Au, and Ag.

17. The device for diamond handle attachment of claim 16 wherein the deposition surface material is selected from the group consisting of graphite, $Al_2O_3$, Pb, Sn, Ge, and Cu.

18. The device for diamond handle attachment of claim 16 wherein the deposition surface material is selected from the group consisting of graphite, $Al_2O_3$, and Ge.

19. A mechanosynthesis tool comprising the device of claim 11 and further comprising a handle covalently bonded to the nucleation-site handle end of the tooltip molecule, wherein the handle is selected from the group consisting of:
- a diamond shard having an apical tip C(110) crystal face covalently bonded to the nucleation-site handle end of the tooltip molecule;
and
- a diamond crystal, rod, or cone having a base and an apex distal to the base, wherein the base has a diameter such that the base is grippable by a microscale manipulator device, and wherein the apex is covalently bonded to the nucleation-site handle end of the tooltip molecule.

20. The mechanosynthesis tool of claim 19 wherein the dimerholder atom is selected from the group consisting of Si, Ge, Sn and Pb.

21. The mechanosynthesis tool of claim 19 wherein the dimerholder atom is selected from the group consisting of N, P, As, Sb, and Bi.

22. The mechanosynthesis tool of claim 19 wherein the dimerholder atom is selected from the group consisting of B, Al, Ga, In, and Tl.

23. The mechanosynthesis tool of claim 19 wherein the carbon dimer is a double bonded carbon dimer.

24. The mechanosynthesis tool of claim 19 wherein the base of the handle is 0.1-10 microns in diameter.

25. The mechanosynthesis tool of claim 19 wherein the microscale manipulator device is selected from the group consisting of an SPM tip, and a MEMS robotic end-effector.

26. The mechanosynthesis tool of claim 19 wherein the deposition surface material is selected from the group consisting of graphite, $Al_2O_3$, Pb, Sn, Ge, Cu, Au, and Ag.

27. The mechanosynthesis tool of claim 26 wherein the deposition surface material is selected from the group consisting of graphite, $Al_2O_3$, Pb, Sn, Ge, and Cu.

28. The mechanosynthesis tool of claim 19 wherein the handle comprises a diamond crystal, rod, or cone having a base and an apex distal to the base, wherein the base has a diameter such that the base is grippable by a microscale manipulator device, and wherein the apex is covalently bonded to the nucleation-site, handle end of the tooltip molecule.

29. An activated mechanosynthesis tool for positional diamond mechanosynthesis, comprising:
- a tooltip molecule having a tip end and a nucleation-site, handle end distal to the tip end, wherein the tooltip molecule comprises:
  - one or more adamantane molecules arranged in a polymantane or lonsdaleite configuration to form a base molecule, the base molecule having at least one carbon substituted with a dimerholder atom X, wherein the dimerholder atom X is selected from the group consisting of a Group III element, a Group IV element other than carbon, and a Group V element, to form a tip end of the tooltip molecule;
  - a carbon dimer radical covalently bonded to the dimerholder atom X; and a handle, wherein the handle is selected from the group consisting of:
    - a diamond shard having an apical tip C(110) crystal face covalently bonded to the nucleation-site; handle end of the tooltip molecule;
    and
    - a diamond crystal, rod, or cone having a base and an apex distal to the base, wherein the base has a diameter such that the base is grippable by a microscale manipulator device, and wherein the apex is covalently bonded to the nucleation-site, handle end of the tooltip molecule;
- wherein the tool is positionally restrained in vacuo.

30. The activated mechanosynthesis tool of claim 29 wherein the dimerholder atom is selected from the group consisting of Si, Ge, Sn and Pb.

31. The activated mechanosynthesis tool of claim 29 the dimerholder atom is selected from the group consisting of N, P, As, Sb, and Bi.

32. The activated mechanosynthesis tool of claim 29 wherein the dimerholder atom is selected from the group consisting of B, Al, Ga, In, and Tl.

33. The activated mechanosynthesis tool of claim 29 wherein the base of the handle is 0.1-10 microns in diameter.

34. The activated mechanosynthesis tool of claim 29 wherein the microscale manipulator device is selected from the group consisting of an SPM tip, and a MEMS robotic end-effector.

35. The activated mechanosynthesis tool of claim 29 wherein the handle comprises a diamond crystal, rod, or cone having a base and an apex distal to the base, wherein the base has a diameter such that the base is grippable by a microscale manipulator device, and wherein the apex is covalently bonded to the tooltip molecule.

36. A discharged mechanosynthesis tool for positional diamond mechanosynthesis, comprising:
- a tooltip molecule having a tip end and a nucleation-site handle end distal to the tip end, wherein the tooltip molecule comprises:
  - one or more adamantane molecules arranged in a polymantane or lonsdaleite configuration to form a base molecule, the base molecule having at least one carbon substituted with a dimerholder atom X, wherein dimerholder atom X is selected from the group consisting of a Group III element, a Group IV element other than carbon, and a Group V element, to form a tip end of the tooltip molecule; and
- a handle, wherein the handle is selected from the group consisting of:
  - a diamond shard having an apical tip C(110) crystal face covalently bonded to the nucleation-site, handle end of the tooltip molecule;
  and
  - a diamond crystal, rod, or cone having a base and an apex distal to the base, wherein the base has a diameter such that the base is grippable by a microscale manipulator device, and wherein the apex is covalently bonded to the nucleation-site, handle end of the tooltip molecule;
- wherein the tool is held in vacuo.

* * * * *

UNITED STATES PATENT AND TRADEMARK OFFICE
CERTIFICATE OF CORRECTION

PATENT NO. : 7,687,146 B1  Page 1 of 2
APPLICATION NO. : 11/056567
DATED : March 30, 2010
INVENTOR(S) : Robert A. Freitas, Jr.

It is certified that error appears in the above-identified patent and that said Letters Patent is hereby corrected as shown below:

Column 50, Line 28, change "snaphthe" to -- snap the --

Column 51, Line 11, change "2 grad" to -- 2 μrad --

Column 51, Line 11, change "20-200 grad" to -- 20-200 μrad --

Column 54, Line 37, change "LM24" to -- LM 2-4 --

Column 54, Line 38, change "LM24" to -- LM 2-4 --

Column 55, Line 48, change "LM24" to -- LM 2-4 --

Column 55, Line 50, change "LM24" to -- LM 2-4 --

Column 55, Line 51, change "LM24" to -- LM 2-4 --

Column 62, Line 61, change "+0.19" to -- ±0.19 --

Column 62, Line 62, change "+0.31" to -- ±0.31 --

Column 62, Line 64, change "+0.34" to -- ±0.34 --

Column 62, Line 64, change "+0.31" to -- ±0.31 --

Column 62, Line 65, change "+0.46" to -- ±0.46 --

Column 65, Line 3, change "+0.6587" to -- ±0.6587 --

Column 65, Line 3, change "+0.5377" to -- ±0.5377 --

Column 65, Line 7, change "+0.2024" to -- ±0.2024 --

Signed and Sealed this

Twenty-second Day of June, 2010

David J. Kappos
*Director of the United States Patent and Trademark Office*

Column 68, Line 14, change "Kumosikov" to -- Kurnosikov --

Column 69, Line 60, change "46684669" to -- 4668-4669 --

Column 70, Line 46, change "Dedjaguin" to -- Derjaguin --

Column 70, Line 67, change "http://cst-www.nrl.navy.millbind/index.html" to -- http://cst-www.nrl.navy.mil/bind/index.html --

Column 71, beginning in Line 21, change "http://www.lucasmilhaupt.com/htmdocs/brazing_support/everything_about_brazing/materials-comp_chart. html" to -- http://www.lucasmilhaupt.com/htmdocs/brazing_support/everything_about_brazing/materials_comp_chart. html --

Column 71, beginning in Line 48, change "http://content.aip.org/APPLAB/v60/113/1559_1.html" to -- http://content.aip.org/APPLAB/v60/i13/1559_1.html --

Column 71, beginning in Line 54, change "http://content.aip.org/APPLAB/v53/119/1815_1.html" to -- http://content.aip.org/APPLAB/v53/i19/1815_1.html --

Column 71, Line 59, change "StreInitskii" to -- Strelnitskii --

Column 73, Line 64, change "110" to -- 10 --

Column 74, beginning in Line 14, change "http://www.nas.nasa.gov/GroupsINanotechnology/publications/MGMS_EC1/NanoDesign/paper.html" to -- http://www.nas.nasa.gov/Groups/Nanotechnology/publications/MGMS_EC1/NanoDesign/paper.html --

Column 74, Line 47, change "Buform" to -- Buforn --

Column 74, Line 49, change "G/P11.35" to -- G/PII.35 --

Column 75, beginning in Line 10, change "http://web.archive.org/web/19981206235656/http://k2.scl.cwru.edu/cse/eche/faculty/angus/diamond.htm" to -- http://web.archive.org/web/19981206235656/http://k2.scl.cwru.edu/cse/eche/faculty/angus/diamond.htm --

Column 75, Line 28, change "385400" to -- 385-400 --

Column 75, Line 46, change "Pemet" to -- Pernet --

Column 75, Line 61, change "Detjaguin" to -- Derjaguin --

Column 77, Line 21, change "freejet" to -- free jet --